United States Patent
Kisoda et al.

(10) Patent No.: US 8,483,189 B2
(45) Date of Patent: Jul. 9, 2013

(54) OFDM SIGNAL TRANSMISSION METHOD, TRANSMISSION APPARATUS, AND RECEPTION APPARATUS

(75) Inventors: Akira Kisoda, Moriguchi (JP); Sadashi Kageyama, Sanda (JP); Tomohiro Kimura, Hirakata (JP); Hiroki Furukawa, Osaka (JP); Kenichiro Hayashi, Kyotanabe (JP); Yuji Nakai, Suita (JP)

(73) Assignee: Panasonic Corporation, Osaka (JP)

( * ) Notice: Subject to any disclaimer, the term of this patent is extended or adjusted under 35 U.S.C. 154(b) by 1534 days.

(21) Appl. No.: 10/548,377

(22) PCT Filed: Mar. 8, 2004

(86) PCT No.: PCT/JP2004/002957
§ 371 (c)(1),
(2), (4) Date: Aug. 2, 2006

(87) PCT Pub. No.: WO2004/082181
PCT Pub. Date: Sep. 23, 2004

(65) Prior Publication Data
US 2007/0064588 A1    Mar. 22, 2007

(30) Foreign Application Priority Data

Mar. 10, 2003 (JP) ................. 2003-063085
Mar. 25, 2003 (JP) ................. 2003-082392
May 20, 2003 (JP) ................. 2003-142334
Sep. 19, 2003 (JP) ................. 2003-327940

(51) Int. Cl.
*H04B 7/212* (2006.01)
*H04B 7/26* (2006.01)

(52) U.S. Cl.
CPC .................. *H04B 7/2643* (2013.01)
USPC ........................... 370/337; 370/208

(58) Field of Classification Search
USPC ............. 370/203–208, 321, 324, 326, 329, 370/330, 335–337, 345–347; 375/260–265
See application file for complete search history.

(56) References Cited

U.S. PATENT DOCUMENTS 5,761,207 A    6/1998  Kimura
6,385,190 B1   5/2002  Malkamaki et al.
(Continued)

FOREIGN PATENT DOCUMENTS

EP   0 837 609     4/1998
EP   1 069 711     1/2001
(Continued)

OTHER PUBLICATIONS

Supplementary Partial European Search Report issued Mar. 25, 2010 in Application No. EP 04 71 8411.
(Continued)

*Primary Examiner* — Kan Yuen
(74) *Attorney, Agent, or Firm* — Wenderoth Lind & Ponack, L.L.P.

(57) ABSTRACT

A transmission method of a digital broadcast, which is compatible with a DVB-T terrestrial digital broadcast system in Europe, saves a battery in a mobile terminal. Superframes in DVB-T are divided into units each including plural symbols so that an integer number of TS packets can be carried in each slot. At least one slot is used to transmit one service. Energy dispersion, Reed-Solomon coding, byte interleaving, convolutional coding, and time interleaving are applied to each service. When services for mobile terminal reception and services for fixed terminals are transmitted as the provided services, null packets may be transmitted before and after the slot carrying the mobile receiver service so that the fixed reception service and the mobile reception services are not mixed.

7 Claims, 65 Drawing Sheets

U.S. PATENT DOCUMENTS

| | | |
|---|---|---|
| 6,574,202 B1 | 6/2003 | Himayat et al. |
| 2001/0032027 A1* | 10/2001 | Fukami ............................ 700/94 |
| 2002/0086691 A1 | 7/2002 | Kostic et al. |
| 2003/0133514 A1 | 7/2003 | Lais et al. |
| 2004/0037214 A1 | 2/2004 | Blasco Claret et al. |
| 2004/0136352 A1* | 7/2004 | Fu et al. ......................... 370/341 |
| 2004/0162080 A1 | 8/2004 | Kostic et al. |
| 2009/0060076 A1* | 3/2009 | Ma et al. ........................ 375/260 |
| 2009/0135756 A1 | 5/2009 | Kostic et al. |

FOREIGN PATENT DOCUMENTS

| | | |
|---|---|---|
| EP | 1 207 663 | 5/2002 |
| GB | 2 315 388 | 1/1998 |
| JP | 8-237213 | 9/1996 |
| JP | 10-322306 | 12/1998 |
| JP | 2000-101542 | 4/2000 |
| JP | 2001-60929 | 3/2001 |
| JP | 2002-374467 | 12/2002 |
| JP | 2003-60610 | 2/2003 |
| JP | 2003-60615 | 2/2003 |
| WO | 99/30385 | 6/1999 |
| WO | 02/03678 | 1/2002 |
| WO | 02/03728 | 1/2002 |
| WO | 02/05506 | 1/2002 |
| WO | 02/09383 | 1/2002 |
| WO | 02/17615 | 2/2002 |

OTHER PUBLICATIONS

Extended European Search Report issued Sep. 26, 2012 in European Application No. 10 17 2329.

European Office Communication (in the English language) issued Mar. 8, 2013 in European Application 04 718 411.4.

Officer Action dated Feb. 25, 2013 in U.S. Appl. No. 13/616,258.

* cited by examiner

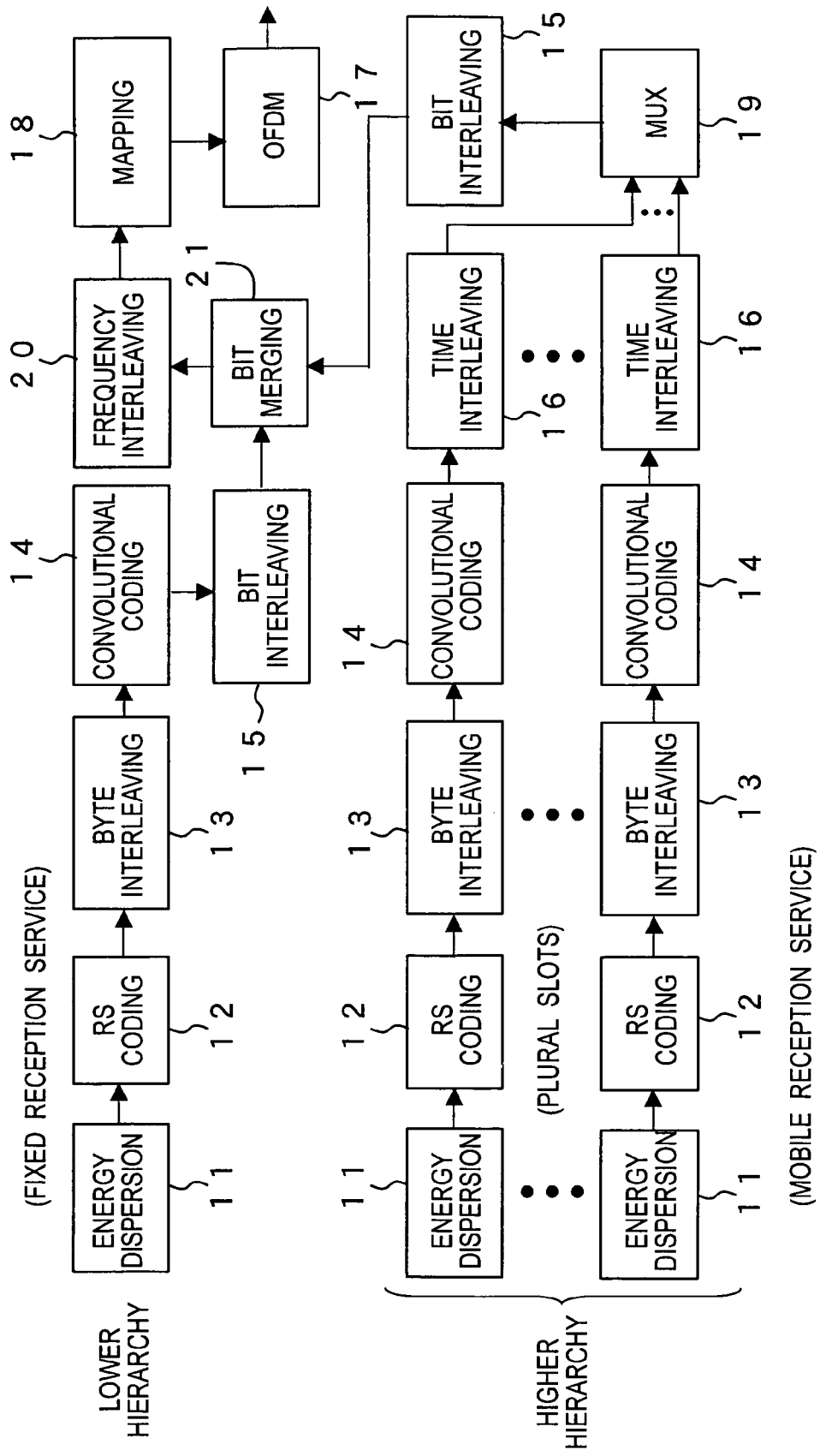

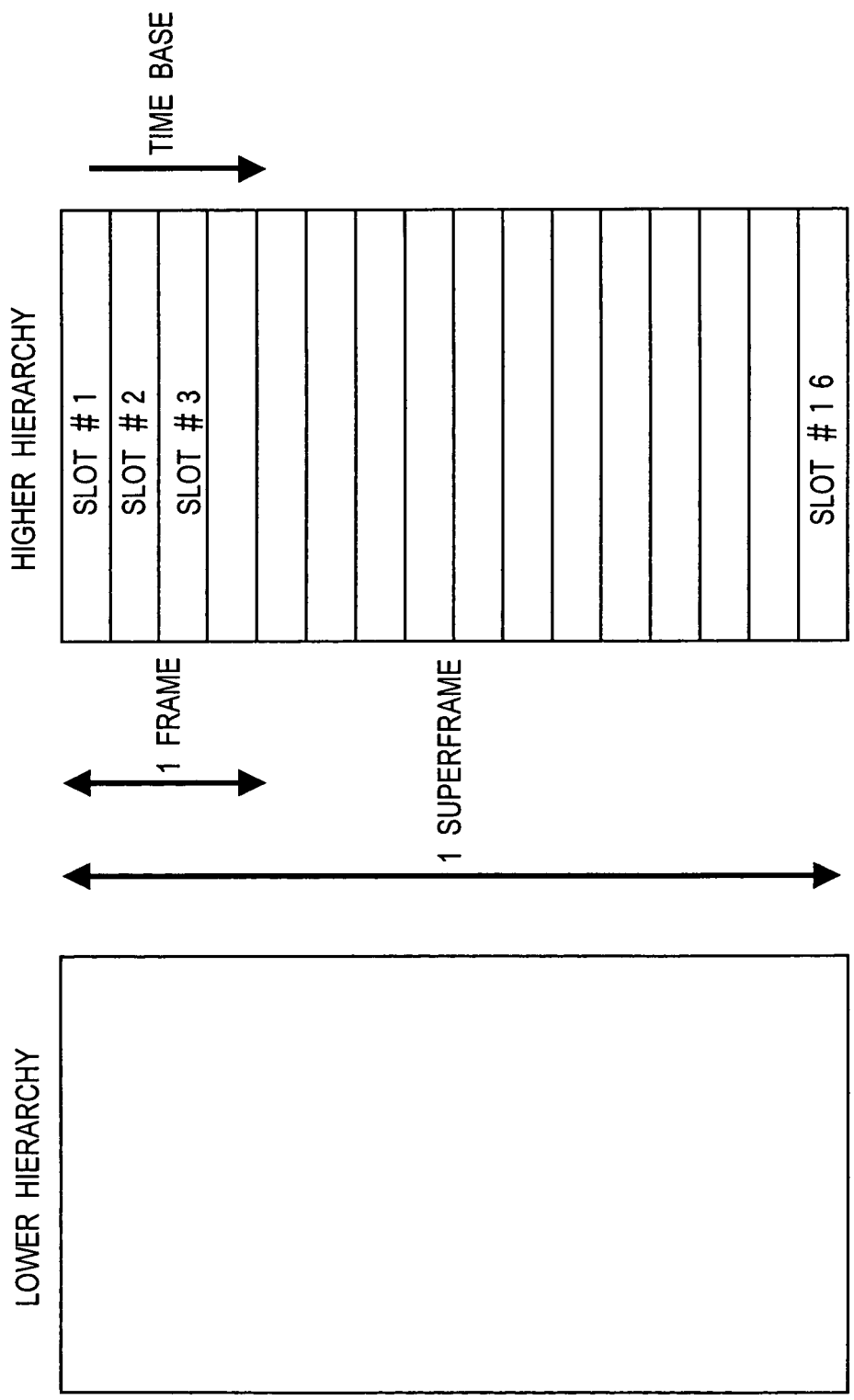

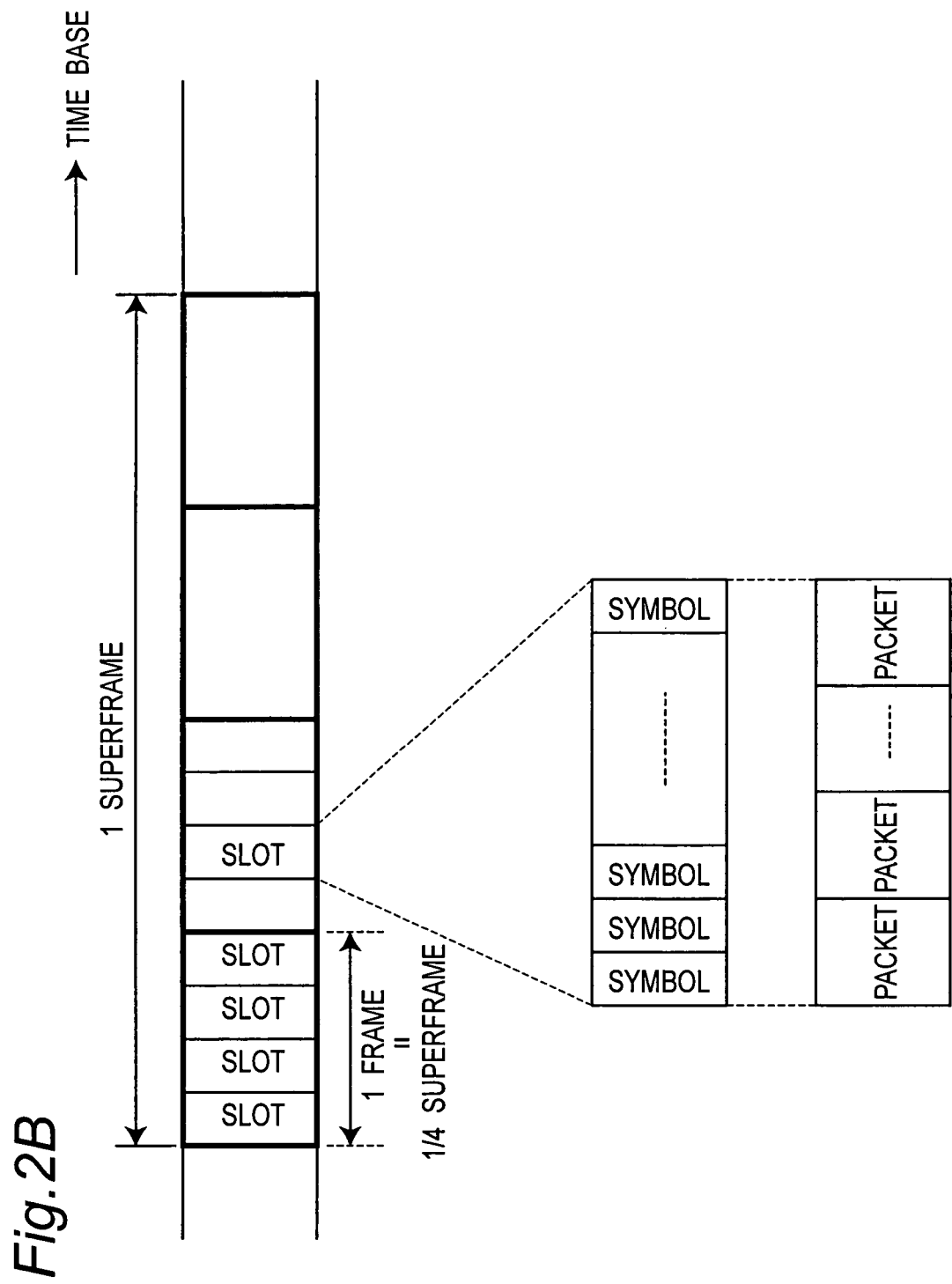

Fig.5

| BIT INTERLEAVING |
|---|
| I0: H0 (w) = W |
| I1: H1 (W) = (w+63) mod (126) |
| I2: H2 (W) = (w+105) mod (126) |
| I3: H2 (W) = (w+42) mod (126) |
| I4: H2 (W) = (w+21) mod (126) |
| I5: H2 (W) = (w+84) mod (126) |

Fig.9

```
LOWER HIERARCHY (FIXED RECEPTION SERVICE)

ENERGY DISPERSION (11) → RS CODING (12) → BYTE INTERLEAVING (13) → CONVOLUTIONAL CODING (14) → BIT INTERLEAVING (15) → MUX (22) → FREQUENCY INTERLEAVING (20) → MAPPING (18) → OFDM (17)

HIGHER HIERARCHY (MOBILE RECEPTION SERVICE) (8 SLOTS)

ENERGY DISPERSION (11) → RS CODING (12) → BYTE INTERLEAVING (13) → CONVOLUTIONAL CODING (14) → TIME INTERLEAVING (16) → MUX (19)

ENERGY DISPERSION (11) → RS CODING (12) → BYTE INTERLEAVING (13) → CONVOLUTIONAL CODING (14) → TIME INTERLEAVING (16) → MUX (19)

BIT INTERLEAVING (15) → MUX (22)
```

*Fig.12*

| B8 | PACKET #1 | 47 | PACKET #2 | 47 | PACKET #3 | 47 | PACKET #4 |
| 47 | PACKET #5 | 47 | PACKET #6 | 47 | PACKET #7 | 47 | PACKET #8 |
| B8 | PACKET #9 | 47 | PACKET #10 | 47 | PACKET #11 | 47 | PACKET #12 |
| 47 | PACKET #13 | 47 | PACKET #14 | 47 | PACKET #15 | 47 | PACKET #16 |
| B8 | PACKET #17 | 47 | PACKET #18 | 47 | PACKET #19 | 47 | PACKET #20 |
| 47 | PACKET #21 | 47 | PACKET #22 | 47 | PACKET #23 | 47 | PACKET #24 |

*Fig.15*

| Bit number | Purpose / Content |
|---|---|
| S0 | Initialization |
| S1-S16 | Synchronization word |
| S17-S22 | Length Indicator |
| S23,S24 | Frame number |
| S25,S26 | Constellation |
| S27,S28,S29 | Hierarchy information |
| S30,S31,S32 | Code rate, HP stream |
| S33,S34,S35 | Code rate, LP stream |
| S36,S37 | Guard interval |
| S38,S39 | Transmission mode |
| S40-S47 | Cell identifier |
| S48-S53 | Reserved for future use |
| S54-S67 | Error protection |

64QAM

| Code Rate | 2k mode | (4k mode) | 8k mode |
|---|---|---|---|
| 1/2 | 756 | 1512 | 3024 |
| 2/3 | 1008 | 2016 | 4032 |
| 3/4 | 1134 | 2268 | 4536 |
| 5/6 | 1260 | 2520 | 5040 |
| 7/8 | 1323 | 2646 | 5292 |

SUPERFRAME PACKET COUNT

▨ INTEGER NUMBER OF PACKETS IN 1/16 SUPERFRAME
▨ INTEGER NUMBER OF PACKETS IN 1/8 SUPERFRAME
▨ INTEGER NUMBER OF PACKETS IN 1/4 SUPERFRAME

Fig.54

| Bit number | Purpose / Content |
|---|---|
| s40 – s42 | REPEAT INTERVAL (MEGAFRAME UNIT) |
| s43 – s44 | BURST INTERVAL (FRAME UNIT) |
| s45 – s46 | BURST INTERVAL (SLOT UNIT) |
| s47 – s50 | NUMBER OF SERVICE |

Fig.55

| s40-s42 | BURST INTERVAL (MEGAFRAME UNIT) |
|---|---|
| 00 | 6 |
| 01 | 8 |
| 10 | 10 |
| 11 | 12 |

Fig.56

| s43-s44 | BURST INTERVAL (FRAME UNIT) |
|---|---|
| 00 | 0 |
| 01 | 1 |
| 10 | 2 |
| 11 | 3 |

Fig.57

| s45-s46 | BURST INTERVAL (SLOT UNIT) |
|---------|----------------------------|
| 00      | 0                          |
| 01      | 1                          |
| 10      | 2                          |
| 11      | 3                          |

Fig.58

| s47-s50 | NUMBER OF SERVICE |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

Fig.60

(8K Mode 16QAM 2/3)

| symbol No. | | | | | 1 | 2 | 3 | 4 | 5 | 6 | 7 | 8 |
|---|---|---|---|---|---|---|---|---|---|---|---|---|
| 34 | 102 | 170 | 238 | start | 126 | 756 | 1386 | 2016 | 2520 | 3150 | 3780 | 4410 |
| | | | | stop | 503 | 1133 | 1763 | 2393 | 2897 | 3527 | 4157 | 4787 |
| 35 | 103 | 171 | 239 | start | 252 | 756 | 1386 | 2016 | 2646 | 3276 | 3906 | 4536 |
| | | | | stop | 629 | 1133 | 1763 | 2393 | 3023 | 3653 | 4283 | 4913 |
| 36 | 104 | 172 | 240 | start | 252 | 882 | 1512 | 2142 | 2772 | 3276 | 3906 | 4536 |
| | | | | stop | 629 | 1259 | 1889 | 2519 | 3149 | 3653 | 4283 | 4913 |
| 37 | 105 | 173 | 241 | start | 378 | 1008 | 1512 | 2142 | 2772 | 3402 | 4032 | 4662 |
| | | | | stop | 755 | 1385 | 1889 | 2519 | 3149 | 3779 | 4409 | 5039 |
| 38 | 106 | 174 | 242 | start | 378 | 1008 | 1638 | 2268 | 2898 | 3528 | 4032 | 4662 |
| | | | | stop | 755 | 1385 | 2015 | 2645 | 3275 | 3905 | 4409 | 5039 |
| 39 | 107 | 175 | 243 | start | 504 | 1134 | 1764 | 2268 | 2898 | 3528 | 4158 | 4788 |
| | | | | stop | 881 | 1511 | 2141 | 2645 | 3275 | 3905 | 4535 | 5165 |
| 40 | 108 | 176 | 244 | start | 0 | 504 | 1134 | 1764 | 2394 | 3024 | 3654 | 4284 |
| | | | | stop | 377 | 881 | 1511 | 2141 | 2771 | 3401 | 4031 | 4661 |
| 41 | 109 | 177 | 245 | start | 0 | 630 | 1260 | 1890 | 2520 | 3024 | 3654 | 4284 |
| | | | | stop | 377 | 1007 | 1637 | 2267 | 2897 | 3401 | 4031 | 4661 |
| 42 | 110 | 178 | 246 | start | 126 | 756 | 1260 | 1890 | 2520 | 3150 | 3780 | 4410 |
| | | | | stop | 503 | 1133 | 1637 | 2267 | 2897 | 3527 | 4157 | 4787 |
| 43 | 111 | 179 | 247 | start | 126 | 756 | 1386 | 2016 | 2646 | 3276 | 3780 | 4410 |
| | | | | stop | 503 | 1133 | 1763 | 2393 | 3023 | 3653 | 4157 | 4787 |
| 44 | 112 | 180 | 248 | start | 252 | 882 | 1512 | 2016 | 2646 | 3276 | 3906 | 4536 |
| | | | | stop | 629 | 1259 | 1889 | 2393 | 3023 | 3653 | 4283 | 4913 |
| 45 | 113 | 181 | 249 | start | 252 | 882 | 1512 | 2142 | 2772 | 3402 | 4032 | 4536 |
| | | | | stop | 629 | 1259 | 1889 | 2519 | 3149 | 3779 | 4409 | 4913 |
| 46 | 114 | 182 | 250 | start | 378 | 1008 | 1638 | 2268 | 2772 | 3402 | 4032 | 4662 |
| | | | | stop | 755 | 1385 | 2015 | 2645 | 3149 | 3779 | 4409 | 5039 |
| 47 | 115 | 183 | 251 | start | 504 | 1008 | 1638 | 2268 | 2898 | 3528 | 4158 | 4788 |
| | | | | stop | 881 | 1385 | 2015 | 2645 | 3275 | 3905 | 4535 | 5165 |
| 48 | 116 | 184 | 252 | start | 0 | 504 | 1134 | 1764 | 2394 | 3024 | 3528 | 4158 |
| | | | | stop | 377 | 881 | 1511 | 2141 | 2771 | 3401 | 3905 | 4535 |
| 49 | 117 | 185 | 253 | start | 0 | 630 | 1260 | 1764 | 2394 | 3024 | 3654 | 4284 |
| | | | | stop | 377 | 1007 | 1637 | 2141 | 2771 | 3401 | 4031 | 4661 |
| 50 | 118 | 186 | 254 | start | 0 | 630 | 1260 | 1890 | 2520 | 3150 | 3780 | 4284 |
| | | | | stop | 377 | 1007 | 1637 | 2267 | 2897 | 3527 | 4157 | 4661 |

Fig.61

(ADDITIONAL REFERENCE SIGNAL)

| | | | | symbol No. | | | | | | | |
|---|---|---|---|---|---|---|---|---|---|---|---|
| 34 | 102 | 170 | 238 | 525~543 1959~1973 4809~4827 | 588~606 1980~2015 4872~4890 | 1155 2898~3023 5040~5417 | 1218 3528~3653 5439 | 1305~1322 4158~4173 5502 | 1368~1385 4179~4215 5589~5606 | 1896~1910 4221~4236 5652~6047 | 1917~1952 4242~4278 |
| 35 | 103 | 171 | 239 | 132~146 2457~2472 4416~4430 | 153~188 2478~2514 4437~4472 | 195~209 3045~3063 4479~4493 | 216~251 3108~3126 4500~4535 | 1134~1259 3675 5040~5543 | 1764~1889 3738 5670~6047 | 2394~2409 3825~3842 | 2415~2451 3888~3905 |
| 36 | 104 | 172 | 240 | 0~125 1974 4284~4409 5796~6047 | 630~645 2061~2078 4914~4929 | 651~687 2124~2141 4935~4971 | 693~708 2652~2666 4977~4992 | 714~750 2673~2708 4998~5034 | 1281~1299 2715~2729 5166~5543 | 1344~1362 2736~2771 5565~5583 | 1911 3654~3779 5628~5646 |
| 37 | 105 | 173 | 241 | 0~125 972~1007 3864~3882 5256~5669 | 147 1890~2015 4431 5796~6047 | 210 2520~2645 4494 | 297~314 3150~3165 4581~4598 | 360~377 3171~3207 4644~4661 | 888~902 3213~3228 5172~5186 | 909~944 3234~3270 5193~5228 | 951~965 3801~3819 5235~5249 |
| 38 | 106 | 174 | 242 | 0~251 2667 4410~4535 | 756~881 2730 5040~5165 | 1386~1401 2817~2834 5292~5685 | 1407~1443 2880~2897 5691~5727 | 1449~1464 3408~3422 5733~5748 | 1470~1506 3429~3464 5754~5790 | 2037~2055 3471~3485 5922~6047 | 2100~2118 3492~3527 |
| 39 | 107 | 175 | 243 | 0~251 1665~1700 3990~4026 5949~5984 | 273~291 1707~1721 4557~4575 5991~6005 | 336~354 1728~1763 4620~4638 6012~6047 | 903 2646~2771 5187 | 966 3276~3401 5250 | 1053~1070 3906~3921 5337~5354 | 1116~1133 3927~3963 5400~5795 | 1644~1658 3969~3984 5928~5942 |
| 40 | 108 | 176 | 244 | 882~1007 3423 4788~5291 | 1512~1637 3486 5418~5921 | 2142~2157 3573~3590 | 2163~2199 3636~3653 | 2205~2220 4164~4178 | 2226~2262 4185~4220 | 2793~2811 4227~4241 | 2856~2874 4248~4283 |
| 41 | 109 | 177 | 245 | 378~393 1809~1826 4662~4677 5943 | 399~435 1872~1889 4683~4719 6006 | 441~456 2400~2414 4725~4740 | 462~498 2421~2456 4746~4782 | 1029~1047 2463~2477 4914~5291 | 1092~1110 2484~2519 5313~5331 | 1659 3402~3527 5376~5394 | 1722 4032~4157 5544~5921 |
| 42 | 110 | 178 | 246 | 45~62 2898~2913 4329~4346 | 108~125 2919~2955 4392~4409 | 636~650 2961~2976 4920~4934 | 657~692 2982~3018 4941~4976 | 699~713 3549~3567 4983~4997 | 720~755 3612~3630 5004~5417 | 1638~1763 4179 5544~6047 | 2268~2393 4242 |
| 43 | 111 | 179 | 247 | 504~629 2478 4788~4913 | 1134~1149 2565~2582 5040~5433 | 1155~1191 2628~2645 5439~5475 | 1197~1212 3156~3170 5481~5496 | 1218~1254 3177~3212 5502~5538 | 1785~1803 3219~3233 5670~6047 | 1848~1866 3240~3275 | 2415 4158~4283 |
| 44 | 112 | 180 | 248 | 21~39 1455~1469 4305~4323 5739~5753 | 84~102 1476~1511 4368~4386 5760~6047 | 651 2394~2519 4935 | 714 3024~3149 4998 | 801~818 3654~3669 5085~5102 | 864~881 3675~3711 5148~5543 | 1392~1406 3717~3732 5676~5690 | 1413~1448 3738~3774 5697~5732 |
| 45 | 113 | 181 | 249 | 0~125 2604~2622 3996~4031 | 630~755 3171 4914~5039 | 1260~1385 3234 5166~5669 | 1890~1905 3321~3338 5796~6047 | 1911~1947 3384~3401 | 1953~1968 3912~3926 | 1974~2010 3933~3968 | 2541~2559 3975~3989 |
| 46 | 114 | 182 | 250 | 0~141 1557~1574 4410~4425 5754 | 147~183 1620~1637 4431~4467 5841~5858 | 189~204 2148~2162 4473~4488 5904~6047 | 210~246 2169~2204 4494~4530 | 777~795 2211~2225 5061~5079 | 840~858 2232~2267 5124~5142 | 1407 3150~3275 5292~5669 | 1470 3780~3905 5691 |
| 47 | 115 | 183 | 251 | 0~251 2667~2703 4140~4157 | 384~398 2709~2724 4668~4682 | 405~440 2730~2766 4689~4724 | 447~461 3297~3315 4731~4745 | 468~503 3360~3378 4752~4787 | 1386~1511 3927 5292~5795 | 2016~2141 3990 5922~6047 | 2646~2661 4077~4094 |
| 48 | 116 | 184 | 252 | 882~897 2313~2330 4788~5181 | 903~939 2376~2393 5187~5223 | 945~960 2904~2918 5229~5244 | 966~1002 2925~2960 5250~5286 | 1533~1551 2967~2981 5418~5795 | 1596~1614 2988~3023 5817~5835 | 2163 3906~4031 5880~5898 | 2226 4536~4661 |
| 49 | 117 | 185 | 253 | 399 2142~2267 4683 | 462 2772~2897 4746 | 549~566 3402~3417 4833~4850 | 612~629 3423~3459 4896~5291 | 1140~1154 3465~3480 5424~5438 | 1161~1196 3486~3522 5445~5480 | 1203~1217 4053~4071 5487~5501 | 1224~1259 4116~4134 5508~5921 |
| 50 | 118 | 186 | 254 | 378~503 2919 4662~4787 | 1008~1133 2982 4914~5417 | 1638~1653 3069~3086 5544~5937 | 1659~1695 3132~3149 5943~5979 | 1701~1716 3660~3674 5985~6000 | 1722~1758 3681~3716 6006~6042 | 2289~2307 3723~3737 | 2352~2370 3744~3779 |

Fig.62 (DVB-T SYNCHRONIZATION BYTE)

| symbol No. | | | | | | | | | | |
|---|---|---|---|---|---|---|---|---|---|---|
| 34 | 102 | 170 | 238 | 0~125<br>1764~1895<br>4216~4220<br>5503~5588 | 504~524<br>1911~1916<br>4237~4241<br>5607~5651 | 544~587<br>1953~1958<br>4279~4409 | 607~755<br>1974~1979<br>4788~4808 | 1134~1154<br>2394~2519<br>4828~4871 | 1156~1217<br>3024~3149<br>4891~5039 | 1219~1304<br>3654~3779<br>5418~5438 | 1323~1367<br>4174~4178<br>5440~5501 |
| 35 | 103 | 171 | 239 | 0~131<br>2452~2456<br>3739~3824 | 147~152<br>2473~2477<br>3843~3887 | 189~194<br>2515~2645<br>4284~4415 | 210~215<br>3024~3044<br>4431~4436 | 630~755<br>3064~3107<br>4473~4478 | 1260~1385<br>3127~3275<br>4494~4499 | 1890~2015<br>3654~3674<br>4914~5039 | 2410~2414<br>3676~3737<br>5544~5669 |
| 36 | 104 | 172 | 240 | 126~251<br>1890~1910<br>3150~3275<br>5584~5627 | 646~650<br>1912~1973<br>3780~3905<br>5647~5795 | 688~692<br>1975~2060<br>4410~4535 | 709~713<br>2079~2123<br>4930~4934 | 751~881<br>2520~2651<br>4972~4976 | 1260~1280<br>2667~2672<br>4993~4997 | 1300~1343<br>2709~2714<br>5035~5165 | 1363~1511<br>2730~2735<br>5544~5564 |
| 37 | 105 | 173 | 241 | 126~146<br>1386~1511<br>3820~3863<br>5229~5234 | 148~209<br>2016~2141<br>3883~4031<br>5250~5255 | 211~296<br>2646~2771<br>4410~4430<br>5670~5795 | 315~359<br>3166~3170<br>4432~4493 | 756~887<br>3208~3212<br>4495~4580 | 903~908<br>3229~3233<br>4599~4643 | 945~950<br>3271~3401<br>5040~5171 | 966~971<br>3780~3800<br>5187~5192 |
| 38 | 106 | 174 | 242 | 252~377<br>2056~2099<br>3465~3470<br>5791~5921 | 882~1007<br>2119~2267<br>3486~3491 | 1402~1406<br>2646~2666<br>3906~4031 | 1444~1448<br>2668~2729<br>4536~4661 | 1465~1469<br>2731~2816<br>5166~5291 | 1507~1637<br>2835~2879<br>5686~5690 | 2016~2036<br>3276~3407<br>5728~5732 | 3423~3428<br>5749~5753 |
| 39 | 107 | 175 | 243 | 252~272<br>1512~1643<br>3964~3968<br>5251~5336 | 292~335<br>1659~1664<br>3985~3989<br>5355~5399 | 355~503<br>1701~1706<br>4027~4157<br>5796~5927 | 882~902<br>1722~1727<br>4536~4556<br>5943~5948 | 904~965<br>2142~2267<br>4576~4619<br>5985~5990 | 967~1052<br>2772~2897<br>4639~4787<br>6006~6011 | 1071~1115<br>3402~3527<br>5166~5186 | 3922~3926<br>5188~5249 |
| 40 | 108 | 176 | 244 | 378~503<br>2772~2792<br>4179~4184 | 1008~1133<br>2812~2855<br>4221~4226 | 1638~1763<br>2875~3023<br>4242~4247 | 2158~2162<br>3402~3422<br>4662~4787 | 2200~2204<br>3424~3485<br>5292~5417 | 2221~2225<br>3487~3572<br>5922~6047 | 2263~2393<br>3591~3635 | 4032~4163 |
| 41 | 109 | 177 | 245 | 394~398<br>1638~1658<br>2898~3023<br>5332~5375 | 436~440<br>1660~1721<br>3528~3653<br>5395~5543 | 457~461<br>1723~1808<br>4158~4283<br>5922~5942 | 499~629<br>1827~1871<br>4678~4682<br>5944~6005 | 1008~1028<br>2268~2399<br>4720~4724<br>6007~6047 | 1048~1091<br>2415~2420<br>4741~4745 | 1111~1259<br>2457~2462<br>4783~4913 | 2478~2483<br>5292~5312 |
| 42 | 110 | 178 | 246 | 0~44<br>2394~2519<br>4158~4178<br>5418~5543 | 63~107<br>2914~2918<br>4180~4241 | 504~635<br>2956~2960<br>4243~4328 | 651~656<br>2977~2981<br>4347~4391 | 693~698<br>3019~3149<br>4788~4919 | 714~719<br>3528~3548<br>4935~4940 | 1134~1259<br>3568~3611<br>4977~4982 | 1764~1889<br>3631~3779<br>4998~5003 |
| 43 | 111 | 179 | 247 | 0~125<br>1867~2015<br>3234~3239 | 630~755<br>2394~2414<br>3654~3779 | 1150~1154<br>2416~2477<br>4284~4409 | 1192~1196<br>2479~2564<br>4914~5039 | 1213~1217<br>2583~2627<br>5434~5438 | 1255~1385<br>3024~3155<br>5476~5480 | 1764~1784<br>3171~3176<br>5497~5501 | 1804~1847<br>3213~3218<br>5539~5669 |
| 44 | 112 | 180 | 248 | 0~20<br>1407~1412<br>3733~3737<br>5103~5147 | 40~83<br>1449~1454<br>3775~3905<br>5544~5675 | 103~251<br>1470~1475<br>4284~4304<br>5691~5696 | 630~650<br>1890~2015<br>4324~4367<br>5733~5738 | 652~713<br>2520~2645<br>4387~4535<br>5754~5759 | 715~800<br>3150~3275<br>4914~4934 | 819~863<br>3670~3674<br>4936~4997 | 1260~1391<br>3712~3716<br>4999~5084 |
| 45 | 113 | 181 | 249 | 126~251<br>2520~2540<br>3927~3932 | 756~881<br>2560~2603<br>3969~3974 | 1386~1511<br>2623~2771<br>3990~3995 | 1906~1910<br>3150~3170<br>4410~4535 | 1948~1952<br>3172~3233<br>5040~5165 | 1969~1973<br>3235~3320<br>5670~5795 | 2011~2141<br>3339~3383 | 3780~3911 |
| 46 | 114 | 182 | 250 | 142~146<br>1386~1406<br>2646~2771<br>5080~5123 | 184~188<br>1408~1469<br>3276~3401<br>5143~5291 | 205~209<br>1471~1556<br>3906~4031<br>5670~5690 | 247~377<br>1575~1619<br>4426~4430<br>5692~5753 | 756~776<br>2016~2147<br>4468~4472<br>5755~5840 | 796~839<br>2163~2168<br>4489~4493<br>5859~5903 | 859~1007<br>2205~2210<br>4531~4661 | 2226~2231<br>5040~5060 |
| 47 | 115 | 183 | 251 | 252~383<br>2662~2666<br>3928~3989<br>5796~5921 | 399~404<br>2704~2708<br>3991~4076 | 441~446<br>2725~2729<br>4095~4139 | 462~467<br>2767~2897<br>4536~4667 | 882~1007<br>3276~3296<br>4683~4688 | 1512~1637<br>3316~3359<br>4725~4730 | 2142~2267<br>3379~3527<br>4746~4751 | 3906~3926<br>5166~5291 |
| 48 | 116 | 184 | 252 | 378~503<br>1615~1763<br>2982~2987<br>5796~5816 | 898~902<br>2142~2162<br>3402~3527<br>5836~5879 | 940~944<br>2164~2225<br>4032~4157<br>5899~6047 | 961~965<br>2227~2312<br>4662~4787 | 1003~1133<br>2331~2375<br>5182~5186 | 1512~1532<br>2772~2903<br>5224~5228 | 1552~1595<br>2919~2924<br>5245~5249 | 2961~2966<br>5287~5417 |
| 49 | 117 | 185 | 253 | 378~398<br>1218~1223<br>4032~4052<br>5439~5444 | 400~461<br>1638~1763<br>4072~4115<br>5481~5486 | 463~548<br>2268~2393<br>4135~4283<br>5502~5507 | 567~611<br>2898~3023<br>4662~4682<br>5922~6047 | 1008~1139<br>3418~3422<br>4684~4745 | 1155~1160<br>3460~3464<br>4747~4832 | 1197~1202<br>3481~3485<br>4851~4895 | 3523~3653<br>5292~5423 |
| 50 | 118 | 186 | 254 | 504~629<br>2308~2351<br>3717~3722<br>6043~6047 | 1134~1259<br>2371~2519<br>3738~3743 | 1654~1658<br>2898~2918<br>4158~4283 | 1696~1700<br>2920~2981<br>4788~4913 | 1717~1721<br>2983~3068<br>5418~5543 | 1759~1889<br>3087~3131<br>5938~5942 | 2268~2288<br>3528~3659<br>5980~5984 | 3675~3680<br>6001~6005 |

OFDM SIGNAL TRANSMISSION METHOD, TRANSMISSION APPARATUS, AND RECEPTION APPARATUS

BACKGROUND OF THE INVENTION

1. Technical Field

The present invention relates to a method and apparatus for transmitting data for reception by a mobile information device using an orthogonal frequency division multiplexing (OFDM) transmission method, and to an apparatus for receiving signals transmitted by the same method.

2. Background Art

Terrestrial digital broadcasting systems using OFDM modulation are deployed in Europe as DVB-T system and in Japan as ISDB-T system. The European DVB-T system targets primarily fixed receivers, was first deployed as a commercial service in Great Britain in 1998, and is currently used primarily in Europe for commercial service or trial broadcasting services in numerous countries.

This OFDM modulation system is a type of multicarrier modulation. An OFDM signal is generated by dividing and allocating transmission data to multiple mutually orthogonal carriers at the valid symbol period length, using amplitude and phase to add information to each symbol by means of QAM or other multivalued modulation of each carrier, and then applying an inverse Fourier transform to generate the OFDM signal.

Symbol length can be increased in an OFDM signal as a result of using a large number of carriers. A guard interval, which is a period in which a copy of a portion of the signal is cyclically transmitted, can therefore be provided. If a delay wave is in this guard interval, it is removed during FFT processing on the receiver side, and intersymbol interference is thus prevented. This characteristic can be used to construct a SFN (Symbol Frequency Network) in the relay station for relaying signals on the same frequency, and frequencies can thus be used effectively.

Terrestrial transmission channels are significantly inferior to satellite and cable transmission channels, and sequence coding combining convolutional coding and Reed-Solomon coding for error correction is therefore used in the DVB-T system. Byte interleave, bit interleave, and frequency interleave are used for interleaving. FIG. 24 describes DVB-T channel coding.

A hierarchical transmission format is also used in the DVB-T system, and different streams can be assigned to the high bits and low bits of the mapping data. This hierarchical transmission is called mapped hierarchical modulation. The high bits are called high priority (HP) data and the low bits are called low priority (LP) data, and energy dispersion 11, Reed-Solomon coding 12, byte interleaving 13, and convolutional coding 14 are applied to all HP data and LP data. A bit interleave 15 process is then applied bitwise for hierarchical modulation, followed by frequency interleaving 20 and mapping 18. A TPS signal 23 etc. is then inserted and OFDM 17 is applied. Commercial services using hierarchical transmission are not currently offered, however. Only a single channel is used.

DVB-T systems have a 2 k mode and an 8 k mode with 1705 carriers (including 1512 data carriers) and 6817 carriers (including 6048 data carriers), respectively. Frequency interleaving is spread across all valid carriers. The ISDB-T system, however, is not limited to Reed-Solomon coding and convolutional coding, and affords additionally dividing the bandwidth into 13 segments and separately applies frequency interleaving to only the middle segment. ISDB-T can also interleave in the time axis direction.

The ISDB-T system also enables extracting and receiving only the middle segment. Compared with receiving all thirteen segments, this enables lowering the clock speed for the reception process, and as a result enables operating with lower power consumption.

Reference Document: ETSI EN 300 744 V1.4.1 (2001-01)
  Digital Video Broadcasting (DVB); Framing structure, channel coding and modulation for digital terrestrial television Because frequency interleaving is applied to the entire frequency band in DVB-T systems, extracting a part of the bandwidth as is possible with ISDB-T is difficult with DVB-T. As a result, instead of segmenting the bandwidth, the necessary data can be transmitted with a mobile terminal only for a specific time in the symbol time direction. In this case it is sufficient to receive only the data transmitted at a specific time, and low power consumption can be achieved. However, data for normal fixed receivers is broadcast in the time band that is not transmitted for mobile terminals. The reception process is thus complicated because data for mobile terminals and data for fixed receivers is intermixed by byte interleaving.

If data for mobile terminals and data for fixed receivers is transmitted without hierarchical modulation in the DVB-T system; both data are necessarily modulated using the same modulation method. However, 64 QAM or other modulation method with a high data transfer rate is used for transmission to fixed receivers due to the large screen size and picture quality demanded. On the contrary, mobile terminals have a small monitor, and MPEG-4 compressed images with a QVGA, CIF, QCIF, or other similarly small size can thus be transmitted to mobile terminals, and a transfer rate of only 250 Kbps to 600 Kbps is required. Fixed receivers can receive signals transmitted with 64 QAM modulation because a rooftop antenna is used for reception. Mobile terminals, however, have a very simple antenna carried at a very low elevation, an 64 QAM reception is thus difficult.

Transmission to mobile terminals and fixed receivers using the same modulation method is therefore not desirable because of the different requirements of mobile terminals and fixed receivers. The present invention relates to a transmission format for sending data for mobile terminal reception without affecting conventional DVB-T receivers.

SUMMARY OF THE INVENTION

The present invention proposes a new transmission channel coding method particularly for high hierarchical levels complementary to conventional transmission channel coding. The present invention uses DVB-T hierarchical modulation and adds thereto the concept of time-division multiplex (TDM) coding.

A first OFDM transmission method according to the invention is a transmission method of an OFDM signal with a frame structure in which a frame contains an integer number of transport stream packets and each frame contains a specific number of symbols. The transmission method includes: dividing in time base the frame into slots, each slot including a specific number of symbols; transmitting a specific service using at least one of the divided slots; applying transmission channel coding to each specific service to transmit the specific service.

A second OFDM transmission method according to the invention is a transmission method of an OFDM signal with a frame structure in which a frame contains a specific number of symbols, and a plurality of the frames form one superframe. The transmission method includes dividing in time base the superframe into slots, each slot including a specific number of symbols; transmitting a specific service using at least one of the divided slots; applying transmission channel coding to each specific service to transmit the specific service.

A third OFDM transmission method according to the invention is a transmission method of an OFDM signal which is composed of superframes transmitted in DVB-T format, a high priority stream of DVB-T being transmitted repeatedly. The transmission method includes: dividing in time base the superframe into slots, each slot including a specific number of symbols; transmitting a specific service using at least one of the divided slots; and applying transmission channel coding to each specific service to transmit the specific service.

In the first to third transmission methods, the slot may include an integer number of transport stream packets.

Further the transmission channel coding may include mapping, time interleaving, and error correction processes.

In the first to third transmission methods, before and after a boundary between slots transmitting different services, at least twelve null packets or at least twelve PID packets which is not related to the service may be transmitted.

In the second or third transmission method, a specific service may be transmitted repeatedly using M (M is an integer) slots every N (N: is an integer) superframes.

In the second or third transmission method, the slot may be segmented into a plurality of subslots for transmission in one superframe.

In the third transmission method, the specific service may be a service for mobile terminal reception, and slots other than the slot carrying the specific service may transmit a service for fixed terminal reception. The service for mobile terminal reception may have more robust error resistance than the service for fixed terminal reception. A cycle for transmitting the specific service may be a megaframe unit containing a plurality of superframes. Block time interleaving may be applied to data transmitted in bursts.

A transmission apparatus according to the invention is an apparatus for transmitting an OFDM signal using the transmission method described above. The transmission apparatus includes: a section operable to input a frame synchronization signal, a symbol synchronization signal, and a FFT sampling clock from an OFDM modulator; a section operable to specifically positioning null packets in a specific slot and before and after the specific slot; and a section operable to divide and output a transport stream according to the number of transmitted services.

A reception apparatus according to the invention is an apparatus for receiving an OFDM signal transmitting data in bursts for each service by time division. The reception apparatus includes a tuner operable to select a specific channel; a demodulator operable to demodulate the OFDM signal to convert the OFDM signal to a baseband signal; a symbol synchronization section operable to extract symbol synchronization from the demodulated signal; an FFT section operable to convert a signal in time domain to a signal in frequency domain by FFT processing; an equalization section operable to equalize the signal in frequency domain output from the FFT section; a frame synchronization section operable to extract frame synchronization; a TPS signal acquisition section operable to acquire a TPS signal, which is control information; and an error correction section operable to apply error correction to the data from the equalization section. During a normal reception process after the service to be received is determined, when the determined service is received, transmission channel decoding is applied to the received data, the transmission channel decoding including each process applied by the FFT section, the equalization section, and the error correction section, and transmission channel decoding is not applied to data not containing the determined service.

The tuner may change a gain of the amplifier of the tuning portion in a signal region carrying the specific service in bursts and the other signal regions by varying a voltage or current supplied to the amplifier. Alternatively, the tuner may change the bandwidth of a filter to be used in a signal region carrying the specific service in bursts and the other signal regions.

The present invention enables introducing services for mobile terminal reception while maintaining compatibility with existing DVB-T services. This invention enables conventional services for fixed receiver reception to be received by conventional DVB-T receivers, and enables newly introduced services for mobile terminal reception to be received by terminals for mobile terminal reception.

Furthermore, because the services for mobile terminal reception are transmission channel coded in each slot carrying the service, the present invention enables a mobile reception terminal to extract and receive only the portion of the broadcast carrying the services for mobile terminal reception, and thus enables low power consumption.

Yet further, the present invention enables transmitting services for fixed receiver reception using a modulation method appropriate to fixed services, and transmitting services for mobile terminal reception using a modulation method appropriate to services for mobile terminal reception.

The present invention is also not limited to services for mobile terminal reception, enables introducing time interleave transmission to fixed receiver reception services in the future, and offers stronger error resistance than conventional DVB-T systems.

Yet further, the present invention provides a transmission method and reception apparatus which can access services for mobile terminal reception in addition to services for fixed terminal reception while maintaining compatibility with the DVB-T system.

BRIEF DESCRIPTION OF DRAWINGS

FIG. 1 is a block diagram showing a first embodiment of a digital broadcast transmission method according to the present invention.

FIG. 2A and FIG. 2B show the frame structure used in a preferred embodiment of the invention.

FIG. 5 describes bit interleaving used in DVB-T (a digital broadcast standard in Europe).

FIG. 9 is a function block diagram of a preferred embodiment of a digital broadcast transmission method according to the present invention.

FIG. 12 describes the DVB packet transmission method used in a preferred embodiment of the invention.

FIG. 15 shows the TPS allocation.

FIG. 54 describes allocation of the TPS signal used in a preferred embodiment of the invention.

FIG. 55 describes allocation of the TPS signal used in a preferred embodiment of the invention.

FIG. 56 describes allocation of the TPS signal used in a preferred embodiment of the invention.

FIG. 57 describes allocation of the TPS signal used in a preferred embodiment of the invention.

FIG. 58 describes allocation of the TPS signal used in a preferred embodiment of the invention.

FIG. 60 shows the location of the carrier used in a preferred embodiment of the invention.

FIG. 61 shows the location of the carrier used in a preferred embodiment of the invention.

FIG. 62 shows the location of the carrier used in a preferred embodiment of the invention.

DETAILED DESCRIPTION OF THE INVENTION

Preferred embodiments of the present invention are described below with reference to the accompanying drawings.

Embodiment 1

FIG. 1 describes a channel coding method of an OFDM signal according to the present invention. The present invention focuses on the higher hierarchy level in a transmission hierarchy that is not used in DVB-T. Note that in FIG. 1 each block is a function block wherein a predetermined process is executed.

Figure 3:
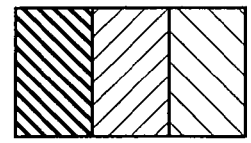
FIG. 3 shows a combination of high 2 bit (QPSK) parameters used in a preferred embodiment of the invention.

FIG. 2A shows a superframe structure in the higher hierarchy in this embodiment. FIG. 2B shows a superframe structure transmitted by the transmission method of the present invention in further detail. As shown in these figures, OFDM superframes in the higher hierarchy are segmented along the time base into slots each containing a specific number of symbols. All slots have the same length, and each slot contains an integer number of TS (transport stream) packets. FIG. 3 shows the number of TS packets contained in each slot considering the modulation method and convolutional coding used in each mode. For example, in the 2 k mode using a code rate of 2/3, a superframe is divided into 16 slots, and each slot (that is, 1/16 superframe) contains 336 TS packets.

A transmission channel coding process including energy dispersion 11, Reed-Solomon coding 12, byte interleaving 13, convolutional coding 14, and time interleaving 16 is applied to each slot.

In hierarchical transmission a higher hierarchy is composed of 2 bits, and lower hierarchy is composed of 2 bits or 4 bits depending on whether 16 QAM or 64 QAM mapping is used.

FIG. 2A and FIG. 2B show an example using a 1/4 guard interval in 2 k mode. This embodiment uses 64 QAM mapping for hierarchical transmission. If a 2/3 code rate is used, the 2 bits of higher hierarchy can include an integer number of packets using 17 symbols. Because these 17 symbols equal 1/16 superframe, one superframe is composed of 16 slots. The 4 bits of lower hierarchy are used to transmit services for fixed receiver reception, and the same transmission channel coding used for DVB-T is used.

As shown in FIG. 1, energy dispersion 11, Reed-Solomon coding 12, byte interleaving 13, convolutional coding 14, and bit interleaving 15 are applied to the lower hierarchy. In the higher hierarchy, energy dispersion 11, Reed-Solomon coding 12, byte interleaving 13, and convolutional coding 14 are applied to each slot, and signals from one of plural slots are selected (19) for bit interleaving 15. Signals respectively processed for lower hierarchy and higher hierarchy transmission are then bit merged (21), frequency interleaved 20. Then the signals are applied with mapping 18 and OFDM 17 process to be transmitted.

In this embodiment of the invention, channel coding of the data in higher hierarchy has 16 channels corresponding to the number of slots, and transmission data in higher hierarchy is switched from one slot to the next slot by the multiplexer (MUX) 19. After the time interleaved data is multiplexed into a single signal by multiplexer 19, the signal is combined with data in lower hierarchy after bit interleaving 15, converted to carrier symbols by bit merging 21, and output to frequency interleaving 20. Mapping 18 and OFDM 17 are then applied to the signal, and the signal is output.

In this embodiment different services for mobile terminal reception are output in each slot. The transmission frequency is once per superframe for each service. Regarding the frequency of transmitting services for mobile terminal reception, one or M (where M is an integer of 2 or more) mobile reception services can be transmitted every N (where N is an integer) superframes.

Figure 4:
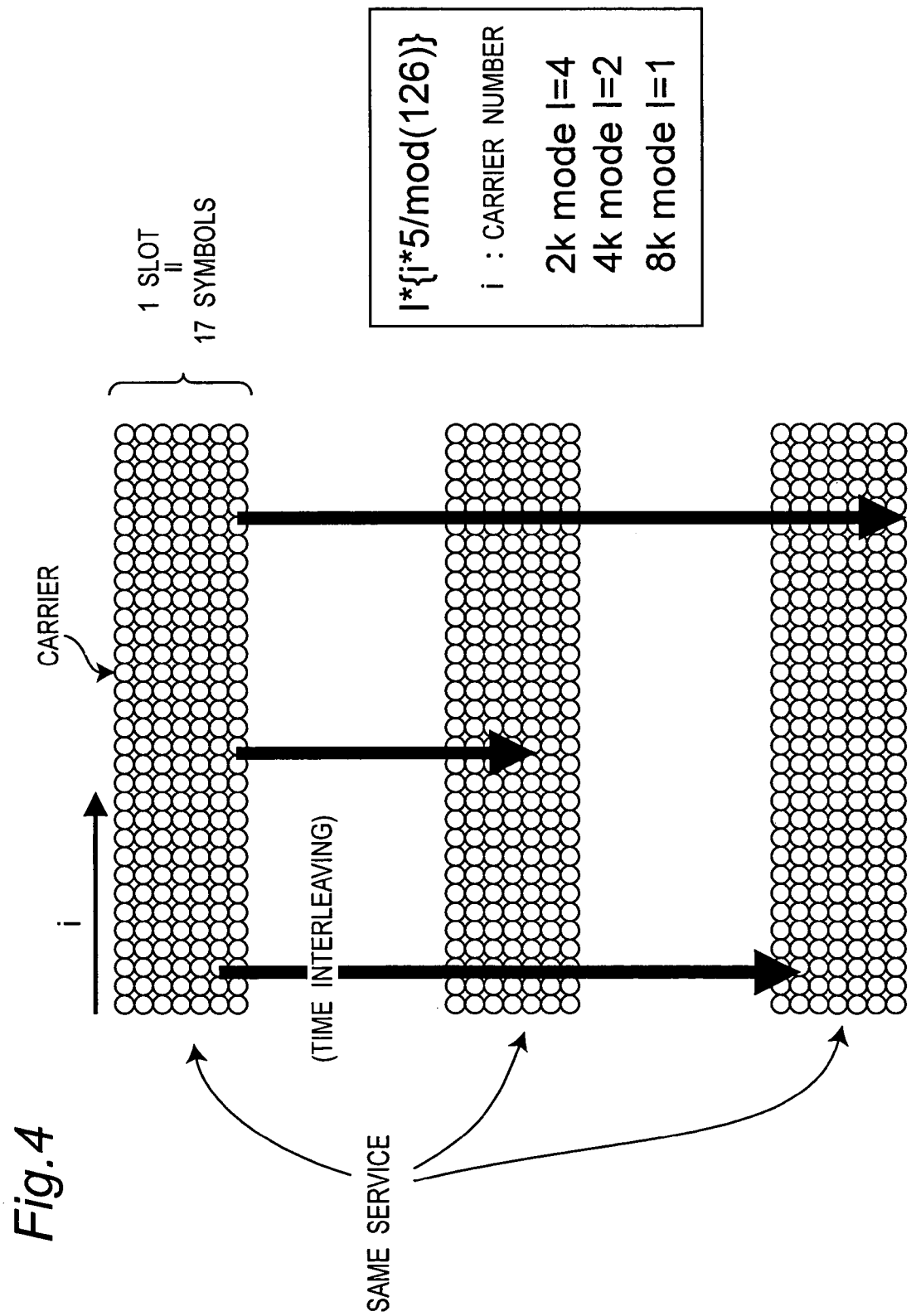
FIG. 4 describes time interleaving used in a preferred embodiment of the invention.

FIG. 4 shows the time interleaving concept. This embodiment of the invention uses time interleaving defined with (i×5)mod(126). That is, time interleaving repeats the same pattern every 126 carriers. Furthermore, time interleaving in this embodiment applies convolutional interleaving in the symbol direction to each carrier. Other time interleaving methods could use the other equation. However, the value of A in (i×B)mod(A) is preferably an aliquot part of the data carrier-count 1512, and B is a prime number that is not an aliquot part of A. Time interleaving could also be applied using a table rather than the above equation.

If the above equation is used, the bit interleave unit and time interleave unit can be aligned. FIG. 5 shows bit interleaving in DVB-T. As will be known from FIG. 5, each bit is block interleaved using a block of 126 carriers as the interleave unit. A mobile receiver detects the TPS (transmission parameter signaling) bit, and detects the code rate of the mobile reception service, and so on.

As described above, a specific service is assigned to a specific slot in one superframe to transmit data for a specific service. Because superframes are repeatedly transmitted during transport stream transmission, data for a particular service will be received at a constant period. By assigning a different service to slots at a specific interval, data is burst transmitted for each service in the time domain. A desired service can therefore be received and reproduced by receiving and decoding data at this constant period.

Embodiment 2

Figure 6:
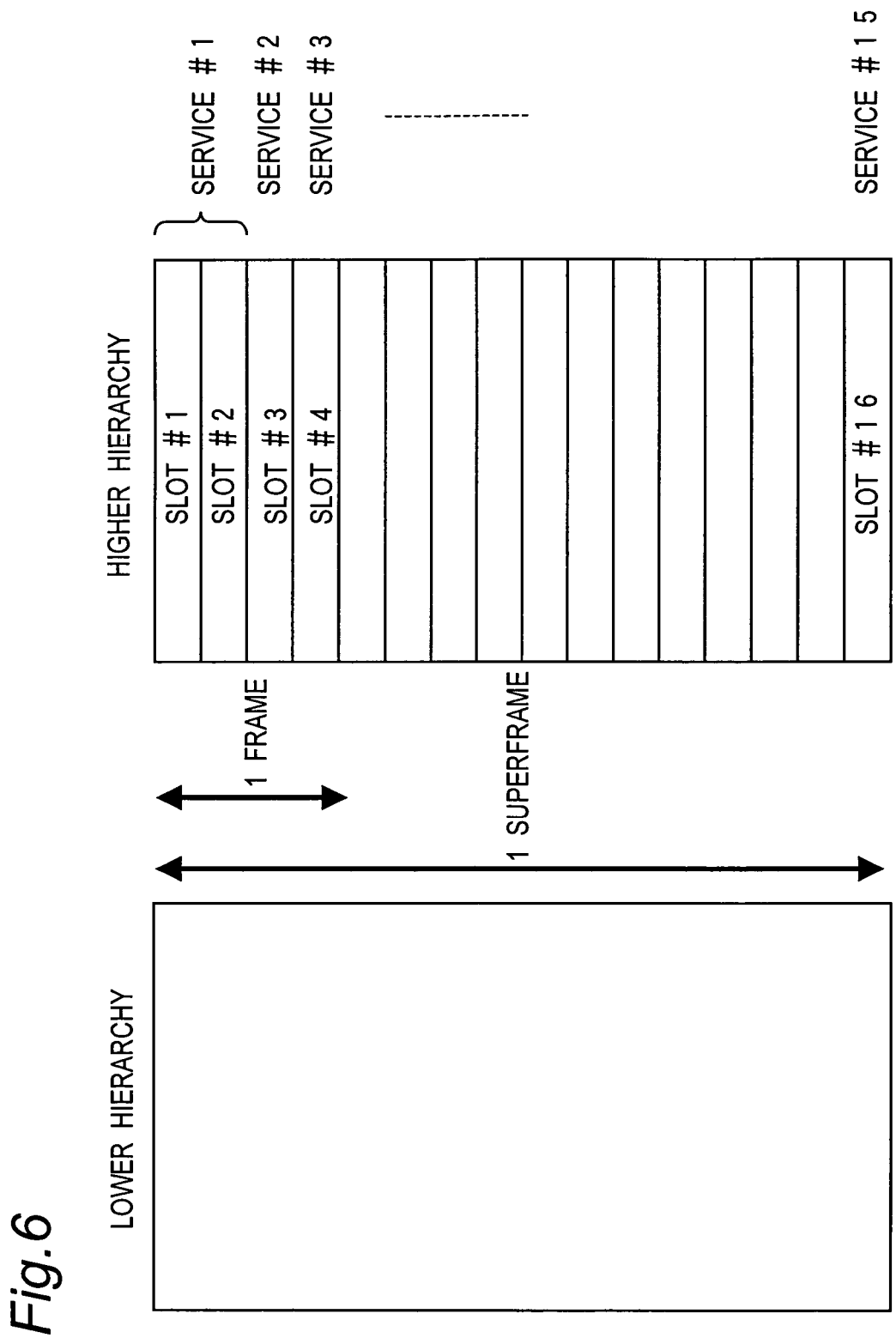
FIG. 6 describes an example of assignment of a broadcast transmitted by the digital broadcast transmission method of the present invention to slots.

The concept of the second embodiment of the invention is shown in FIG. 6. This embodiment of the invention uses the first two slots in the frame structure of the first embodiment to transmit one service, and assigns a different service to each of the remaining fourteen slots. This embodiment is otherwise identical to the first embodiment. In this embodiment energy dispersion 11, Reed-Solomon coding 12, byte interleaving 13, convolutional coding 14, and time interleaving 16 are applied to each service.

The first two slots are combined to transmit one service in this embodiment of the invention, but three or more slots could be used to transmit one service.

Embodiment 3

Figure 7:
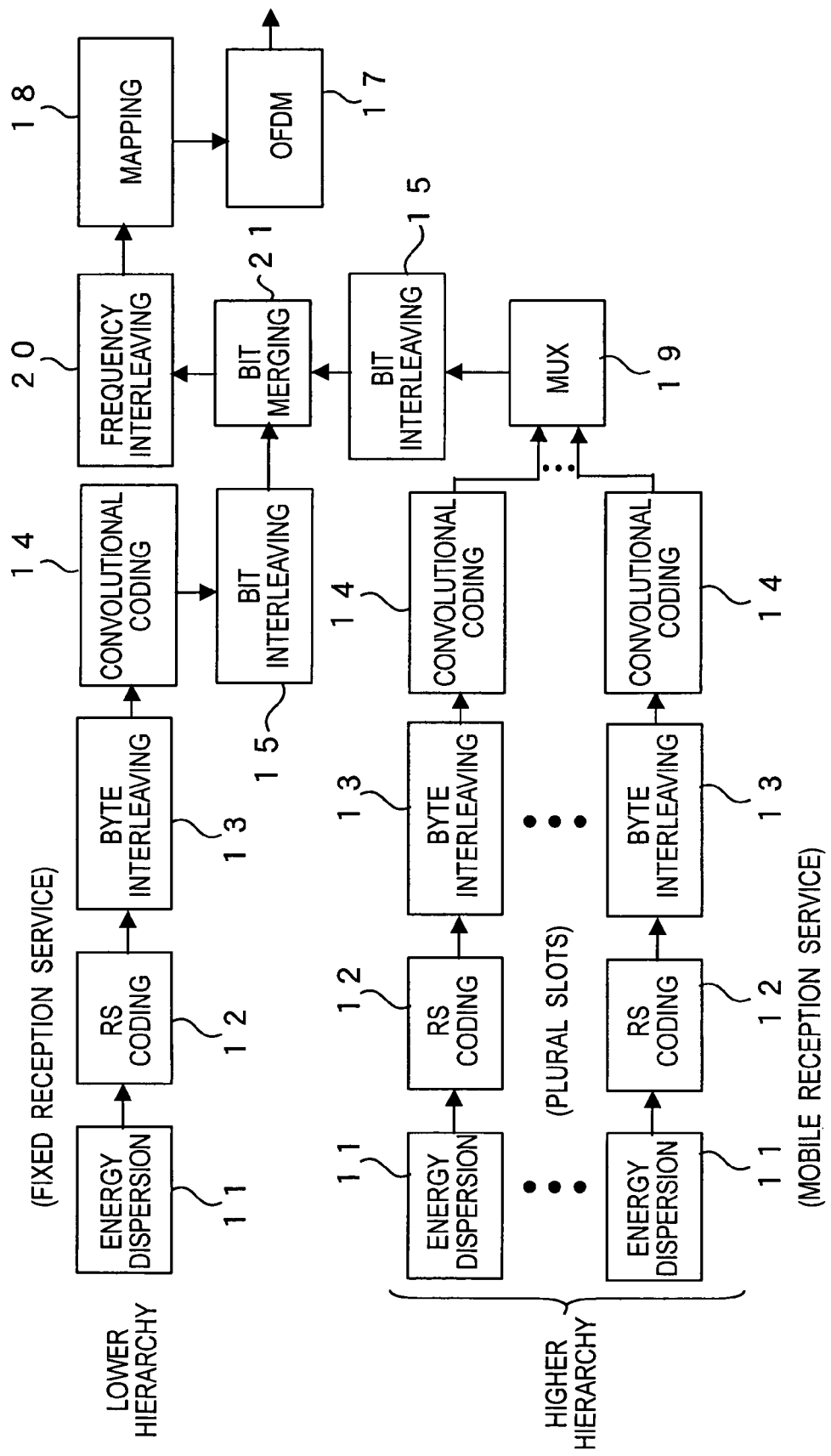
FIG. 7 is a function block diagram of a preferred embodiment of a digital broadcast transmission method according to the present invention.

FIG. 7 shows another OFDM signal transmission method according to the present invention. This embodiment differs from the first embodiment in that the time interleaving 16 of the first embodiment is omitted. This embodiment is otherwise identical to the first embodiment.

Embodiment 4

Figure 8:
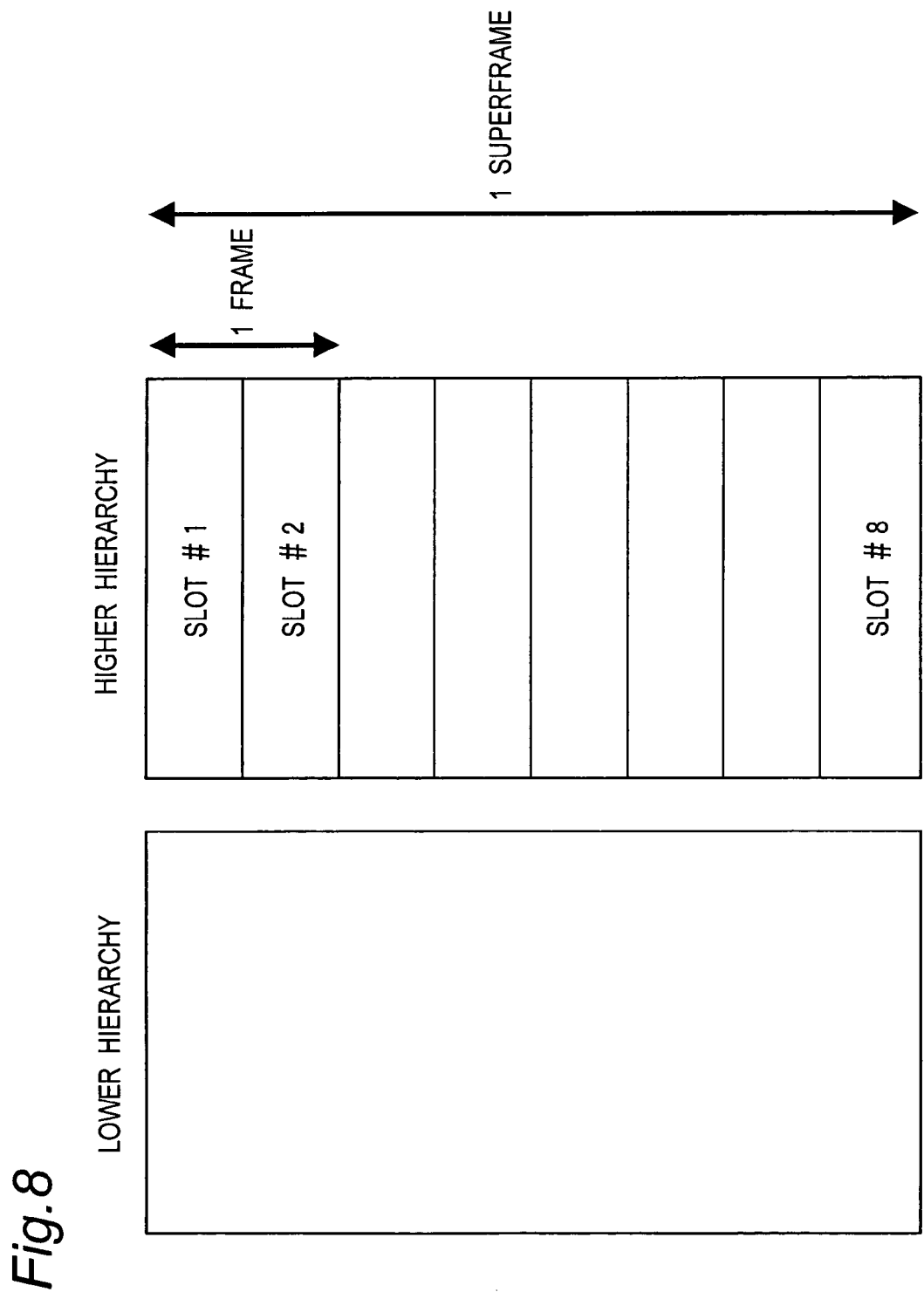
FIG. 8 describes the slot structure used in a preferred embodiment of the invention.

FIG. 8 shows a structure with the division of one superframe into eight slots.

This aspect of the embodiment is useful when an integer number of packets is contained in 1/16 superframe or an integer number of packets is contained in 1/8 superframe.

This embodiment uses the 4 k mode and 1/4 guard interval, 64 QAM mapping and hierarchical transmission. Note that the 4 k mode is not defined in the DVB-T standard, but the present invention can also be used with the 4 k mode. The 4 k mode, however, is incompatible with conventional DVB-T receivers.

Regarding 2 bits of the higher hierarchy, if the code rate is 1/2, an integer number of packets is contained in one frame of 34 symbols. Because 34 symbols is equivalent to 1/8 superframe, one superframe is composed of 8 slots.

4 bits of the lower hierarchy s are used for transmitting fixed reception services, and the same transmission channel coding used for DVB-T is used. This embodiment is otherwise the same as the first embodiment.

Embodiment 5

FIG. 9 describes another OFDM signal transmission method according to the present invention. In this embodiment, two channels of encoders are provided to hierarchical transmission for DVB-T, each encoder including Reed-Solomon coding, byte interleaving, and convolutional coding, respectively. More specifically, the two channels input to MUX 22 are separated for time-multiplexing and transmitting mobile reception services and fixed reception services.

The same slot structure described in the first embodiment is used for mobile reception services. MUX 19 binds the slots. This embodiment of the invention uses only one of the eight slots generated from one superframe to transmit mobile reception services. Note that L slots (where L is an integer and $1 \leq L \leq$ number of superframe divisions) could be used to transmit services for mobile terminal reception.

The transmitting frequency of mobile reception services in this embodiment is once per superframe. Note that the frequency of transmitting services for mobile terminal reception could be once per N superframes (where N is an integer) or M times (where M is an integer) per N superframes.

As in the first embodiment, time interleaving 16 is introduced after convolutional coding 14 to transmit mobile reception services. The 2 k mode and a 1/4 guard interval is used for FFT, and QPSK with a 2/3 code rate is used for the mobile reception services. The service is transmitted using only one slot of 34 symbols at the beginning of the frame. For fixed reception services, 64 QAM with a 3/4 code rate is used.

The packets input to the OFDM modulator are TS packets. The mobile reception services and fixed reception services are time-division multiplexed for transmission. Thus, in the fixed reception services, packets in a period corresponding to a period in which the mobile reception services are transmitted, and several packets before and after those packets, are null packets. These packets are processed by energy dispersion 11, Reed-Solomon coding 12, byte interleaving 13, convolutional coding 14, bit interleaving 15, and frequency interleaving 20. Alternatively, in the fixed reception services, packets in a period corresponding to a period in which the mobile reception services are transmitted, and several packets before and after those packets, may be packets containing PIDs different from that of the fixed reception service.

Figure 10:
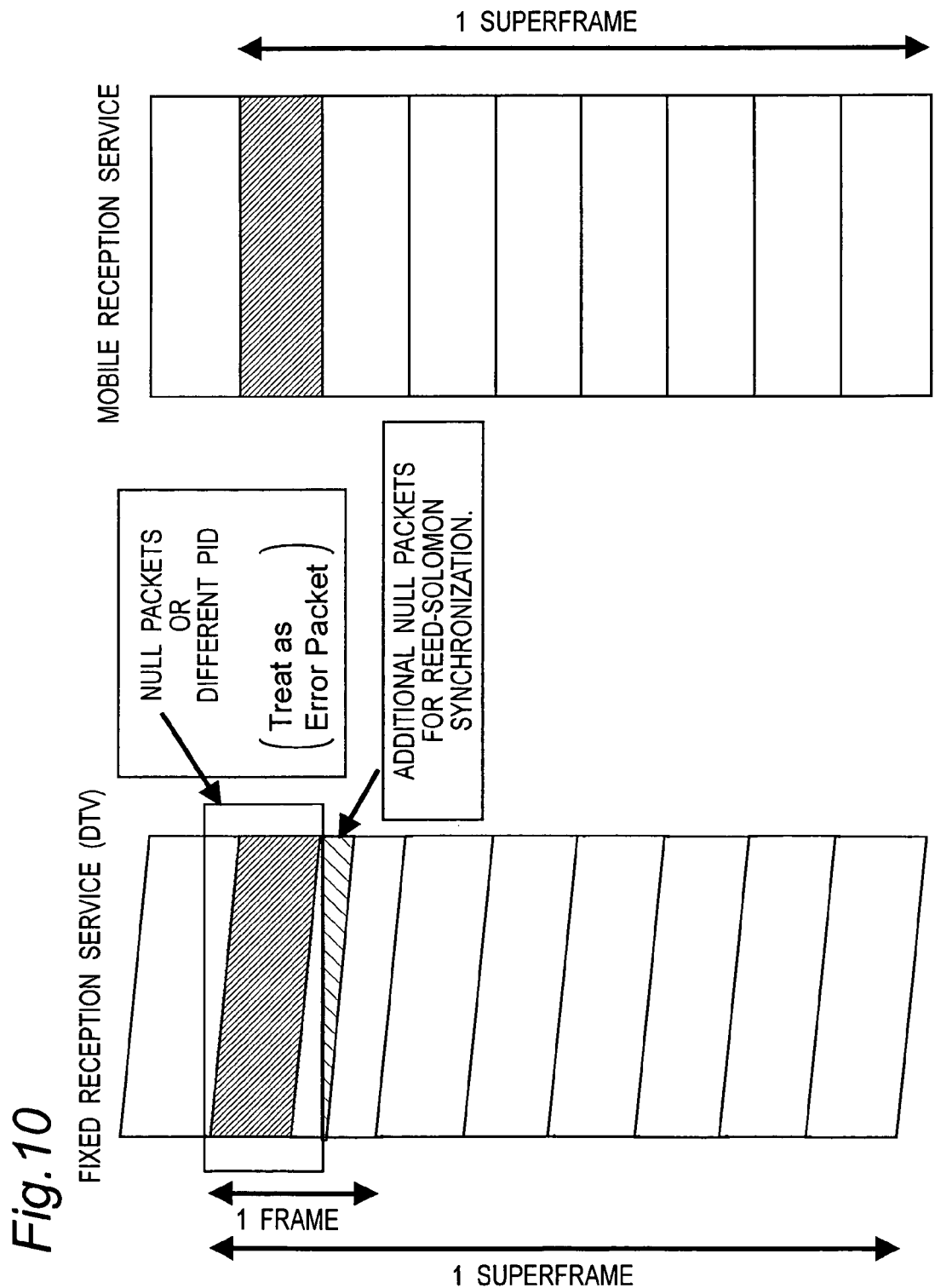
FIG. 10 describes how slots are used in a preferred embodiment of the invention.

This concept is described further in FIG. 10. As shown in FIG. 10, the packets in the period of the fixed reception service in which the mobile reception service is transmitted and a number of packets therebefore and after are null packets. Note that these null packets are inserted before and after the period carrying the mobile reception services to synchronize Reed-Solomon coding.

Because the MUX 22 switches at a symbol unit, the frequency interleaving 20 block can be shared. Furthermore, the arrangement shown in FIG. 9 is sufficient because mapping 18 also switches at each symbol, but the fixed reception services and mobile reception services could be parallel processed through frequency interleaving 20, and then multiplexed by MUX 22.

As shown in FIG. 9, the MUX 22 selects and outputs symbols at the slot position of the mobile reception service, i.e., 34 symbols. Simple QPSK mapping can therefore be used for the mobile reception services, and the C/N needed to enable reception can be lowered compared with the case of using the upper bits in the hierarchy for mobile reception services.

The mobile receiver receives the slot carrying the mobile reception services and several symbols preceding that slot. This slot is transmitted in a fixed position in the OFDM superframe. Thus, the reception process executed on the receiver becomes simplified, and the switch can be turned on for a constant regular period, thereby achieving low power consumption. Furthermore, time interleaving is applied only to the slots for mobile reception services, and thus it is possible to extract and receive only those slots carrying the mobile reception services. The transfer rate of mobile reception services in this embodiment is 830 Kbps.

Reception of fixed reception services is considered next.

Figure 11:
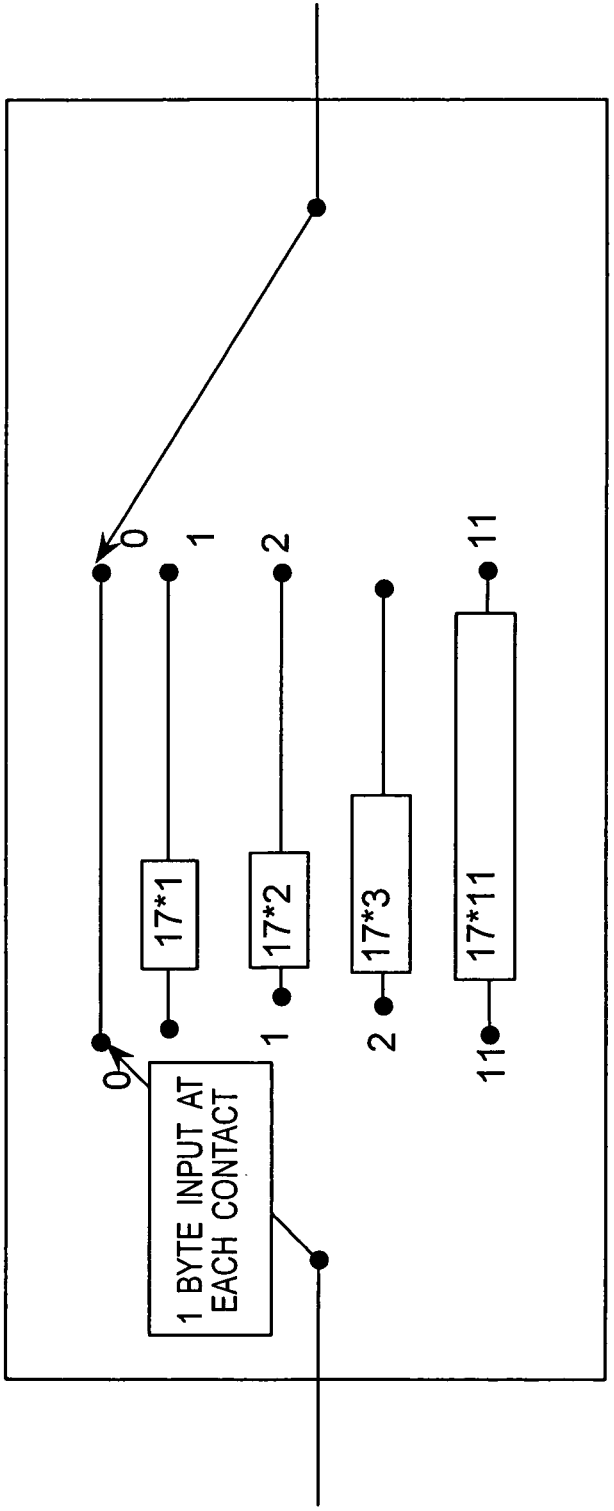
FIG. 11 describes convolutional interleaving used in a preferred embodiment of the invention.

Byte interleaving of fixed reception services interleaves 12 packets. Byte interleaving is shown in FIG. 11. It is therefore necessary to transmit additional null packets for the twelve packets covering the slots used for mobile reception services. One extra null packet is also sent on the receiver side to truncate Viterbi decoding of the fixed reception services. As a result, a total of 13 null packets or packets with a different PID are sent before the mobile reception service slot.

Furthermore, if 64 QAM and a 3/4 code rate are used, 1134 packets are transmitted in one superframe. As a result, 141.75 ($=1134 \times 34/272$) packets are inserted to the 34 symbols of the slot in which the mobile reception services are transmitted.

Because 12 packets are also mixed by byte interleaving after the part used for the mobile reception services, 167 ($13+141.75+12=166.75$) consecutive null packets are inserted from the TS multiplexer to the OFDM modulator. In this embodiment of the invention additional 24 null packets are transmitted. FIG. 12 shows a packet transmission method in DVB.

The DVB-T receiver uses these null packets to detect synchronization byte 47, and detect synchronization byte B8 which inverts every 8 packets. Energy dispersion is initialized at synchronization byte B8, and thus inverse energy dispersion is applied to restore the packets. As a result, a total 191 ($=167+24$) consecutive null packets are input synchronized to the superframe from the TS multiplexer to the OFDM modulator for fixed reception services. In this embodiment of the invention 178 packets from the beginning of a superframe are null packets, and 13 packets from the end of a superframe are null packets.

The receiver side is described next.

A conventional DVB-T receiver (fixed terminal) cannot differentiate fixed reception services and mobile reception services, and therefore simply decode the received signals. Because time interleaving 16 is applied to the period carrying the mobile reception services, the conventional DVB-T receiver processes these packets as error packets. The TS packet synchronization signal is, however, broken. However, data that can be correctly recognized as null packet data by the conventional receiver is received next, synchronization flag "47" can thus be detected, and the Reed-Solomon decoder applies error correction. The location of byte "B8" is then detected, the receiver correctly reverses energy dispersion and recreates the actual transmitted data. Depending on the TS decoder located after this, the TS decoder synchronization may be lost, in which case additional null packets must be added.

In this embodiment, 191 null packets are transmitted, and therefore the maximum transfer rate of transmission at 64 QAM with a 3/4 code rate drops from 22.39 Mbps to 18.62 ($=22.39 \times (1134-191)/1134$) Mbps.

Note that in this embodiment, in addition to the 12 packets added by byte interleaving after the mobile reception services slot, 24 null packets are added for synchronizing the Reed-Solomon decoder, but the number of added null packets is preferably determined according to the process of the commercial decoder that is used.

Embodiment 6

Figure 13:
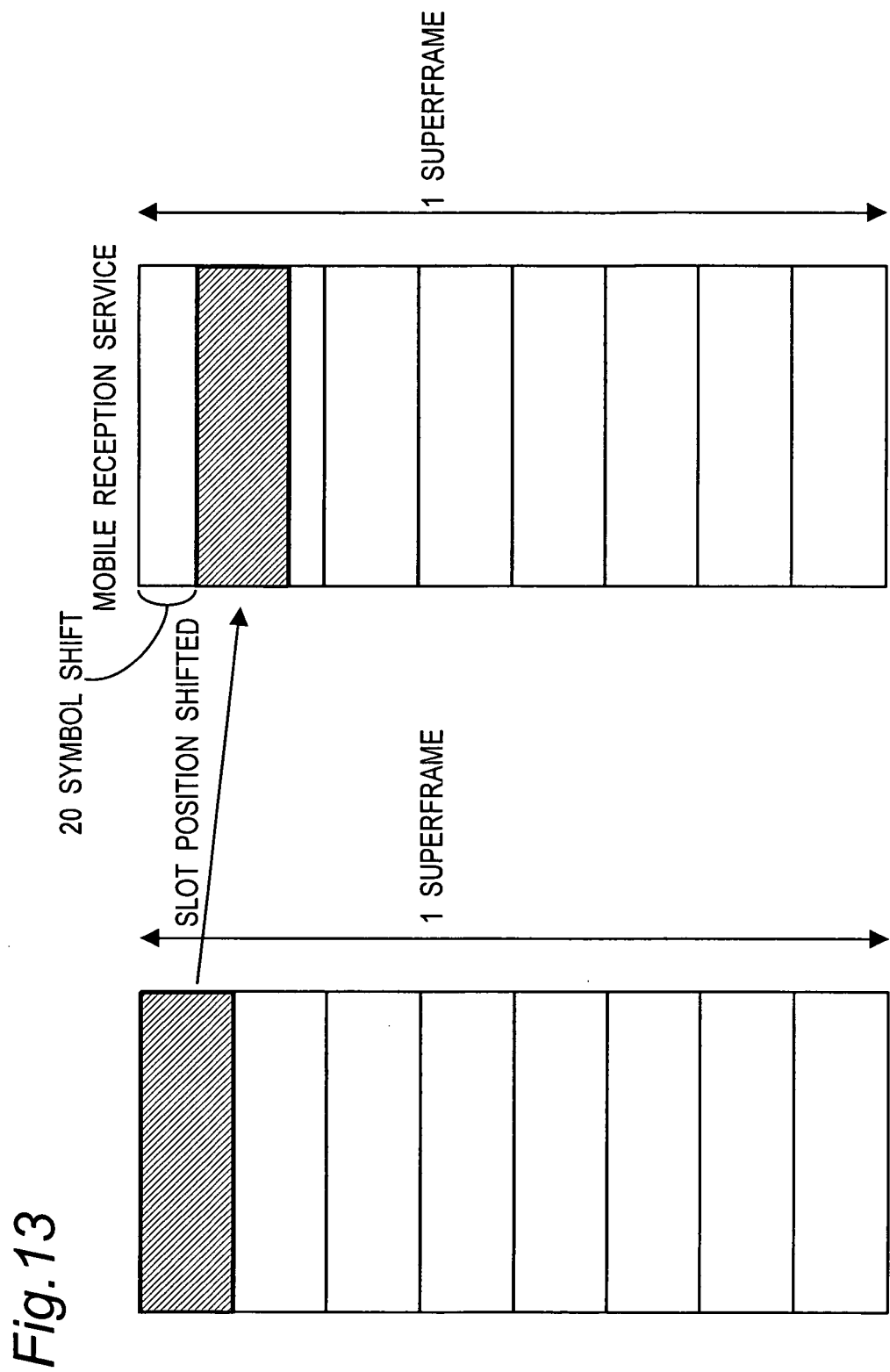
FIG. 13 describes the slot structure used in a preferred embodiment of a digital broadcast transmission method according to the invention.

This embodiment introduces time-division multiplexing to DVB-T similarly to the fifth embodiment. This embodiment, however, shifts the slot structure by 20 symbols, and uses 34 symbols from 21st symbol to 54th symbol at the beginning of the frame to transmit mobile reception services. That is, 20th to 53th TS packets are contained in the mobile reception service slot (note that TS packets are counted from the 0-th packet). This shifted slot arrangement is shown in FIG. 13. TPS information is shown in FIG. 15. This arrangement enables a mobile receiver to constantly monitor the TS packet information. The cell indicator, however, is not so limited. BCH error correction is applied to the TPS, but the TPS signal is modulated by BPSK, however, and is thus very robust. Furthermore, because the TPS signal is assigned to a large number of carriers, the receiver can restore the signal with good precision using a majority decision rule without using BCH error correction.

Figure 14:
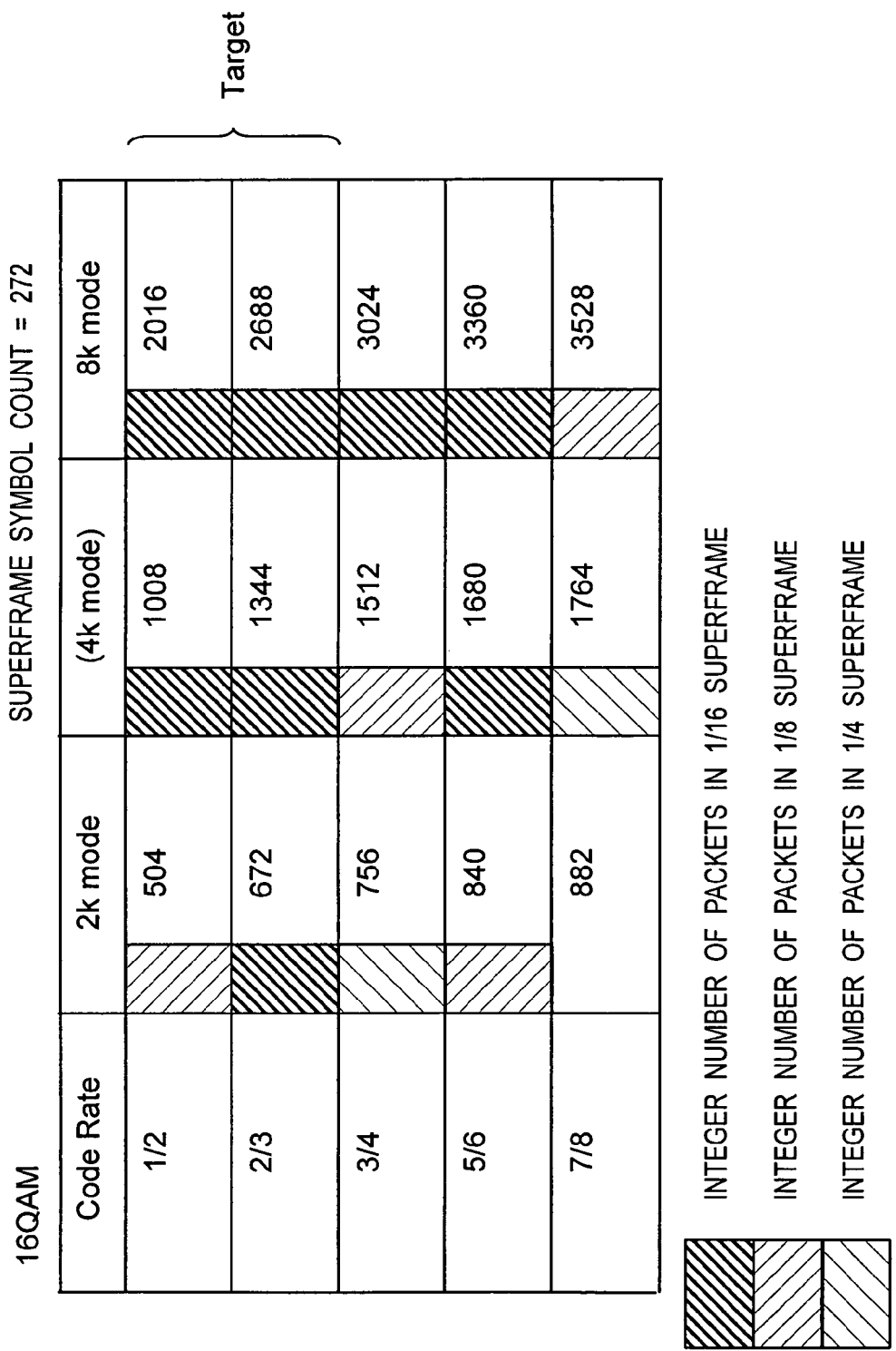
FIG. 14 shows a combination of 16 QAM parameters used in a preferred embodiment of the invention.

This embodiment uses the 8 k mode with a 1/4 code rate, and uses 16 QAM and a 2/3 code rate for data for mobile terminal reception. In this embodiment each superframe is segmented into 8 slots of which one slot or 34 symbols is used for transmission. FIG. 14 shows the number of packets in one superframe with 16 QAM. From FIG. 14 it is known that even if one superframe is segmented into 8 slots, an extremely large number of parameter combinations can be used.

The packets in the period in which the mobile reception services are transmitted and several packets therebefore and after are null packets, to which energy dispersion 11, Reed-Solomon coding 12, byte interleaving 13, convolutional coding 14, bit interleaving 15, and frequency interleaving 20 are applied, as described in FIG. 9. Packets with a PID different from the PID of the fixed reception services could be used instead of null packets. This is as shown in FIG. 10.

The fixed reception services in this embodiment use 16 QAM and a 2/3 code rate like the mobile reception services. The number of packets transmitted in one superframe is thus 2688. The drop in the transfer rate of the fixed reception services as a result of putting the mobile reception service in one slot is estimated below.

Because one slot is 34 symbols wide, null symbols are inserted to 336 (=(34/272)×2688) packets in the mobile reception services in this embodiment of the invention. 14 packets are needed before the slot position, in considering of necessity of 13 null packets to terminate byte interleaving and Viterbi decoding and one packet due to shifting the slot position. The one packet is required because an integer number of packets are not inserted up to the position of the shifted slot. In addition, 24 packets are needed after the mobile reception services slot to detect the 12 byte interleaved packets and the synchronization flag "B8" which is inverted every 8 bytes. As a result, 386 (=14+336+12+24) null packets are needed.

The transfer rate for fixed reception services therefore drops from 13.27 Mbps to 11.36 Mbps (=13.27×(2688−386)/2688).

The mobile reception service uses 34 symbols and thus can 336 (=(34/272)×2688) packets. The transfer rate at this time is 1.65 (=13.27×(336/2688)) Mbps, thus assuring sufficient transmission capacity for mobile reception services.

Embodiment 7

Figure 16:
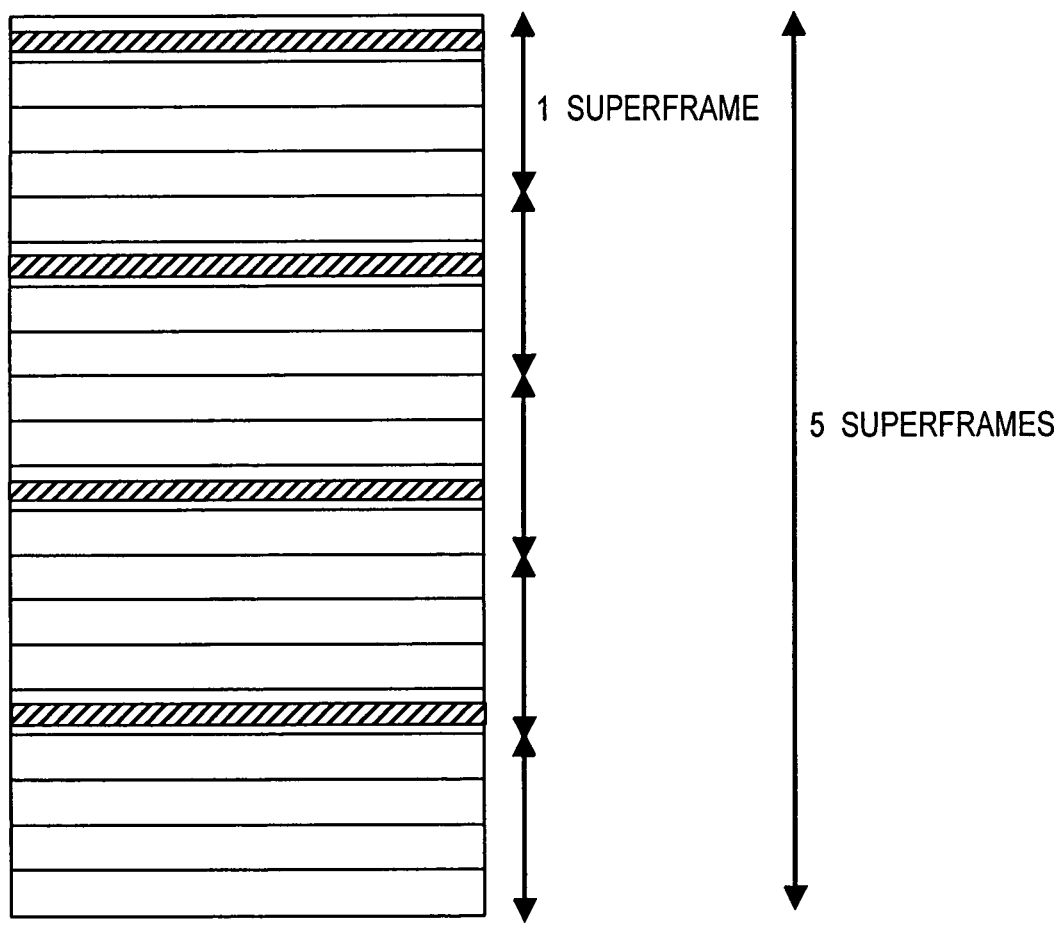
FIG. 16 describes where slots are used in a preferred embodiment of a digital broadcast transmission method according to the present invention.

FIG. 16 describes the concept of this embodiment. This embodiment differs from the sixth embodiment in that five superframes are grouped as one unit, and the mobile reception service transmission frequency is changed from one slot per frame to four slots per five frames.

This causes the slot to appear alternately in odd frames and even frames. As described above, the slot position is set so that a valid TPS signal is contained in the slot. The cell indicator in FIG. 15 is signalled by combining the odd frames and even frames so that the cell can be identified. Therefore use of the transmission method of this embodiment allows all TPS signals containing a cell indicator to be received in the slot for the mobile reception service.

Embodiment 8

Figure 17:
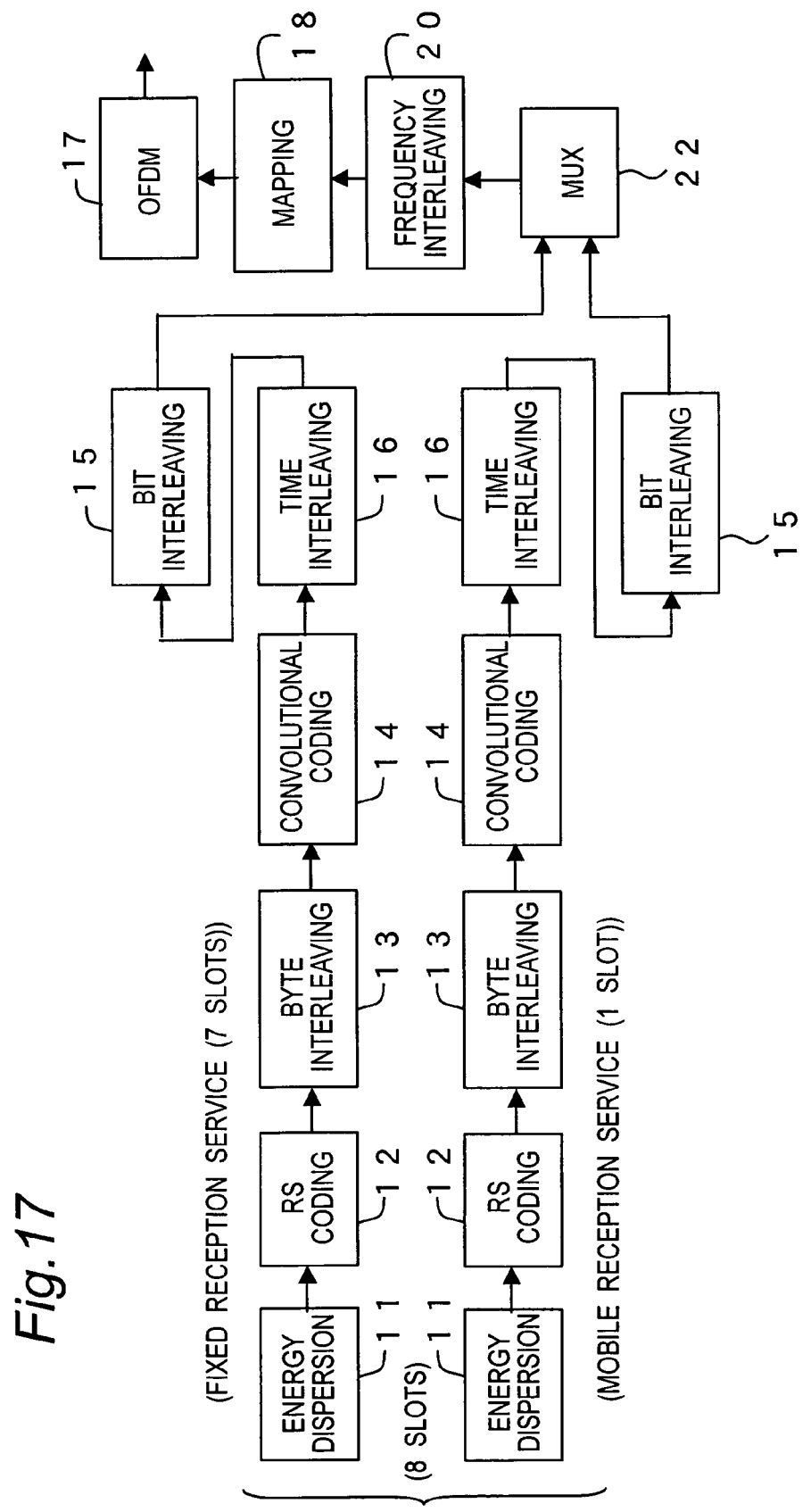
FIG. 17 is a function block diagram of a preferred embodiment of a digital broadcast transmission method according to the present invention.
Figure 18:
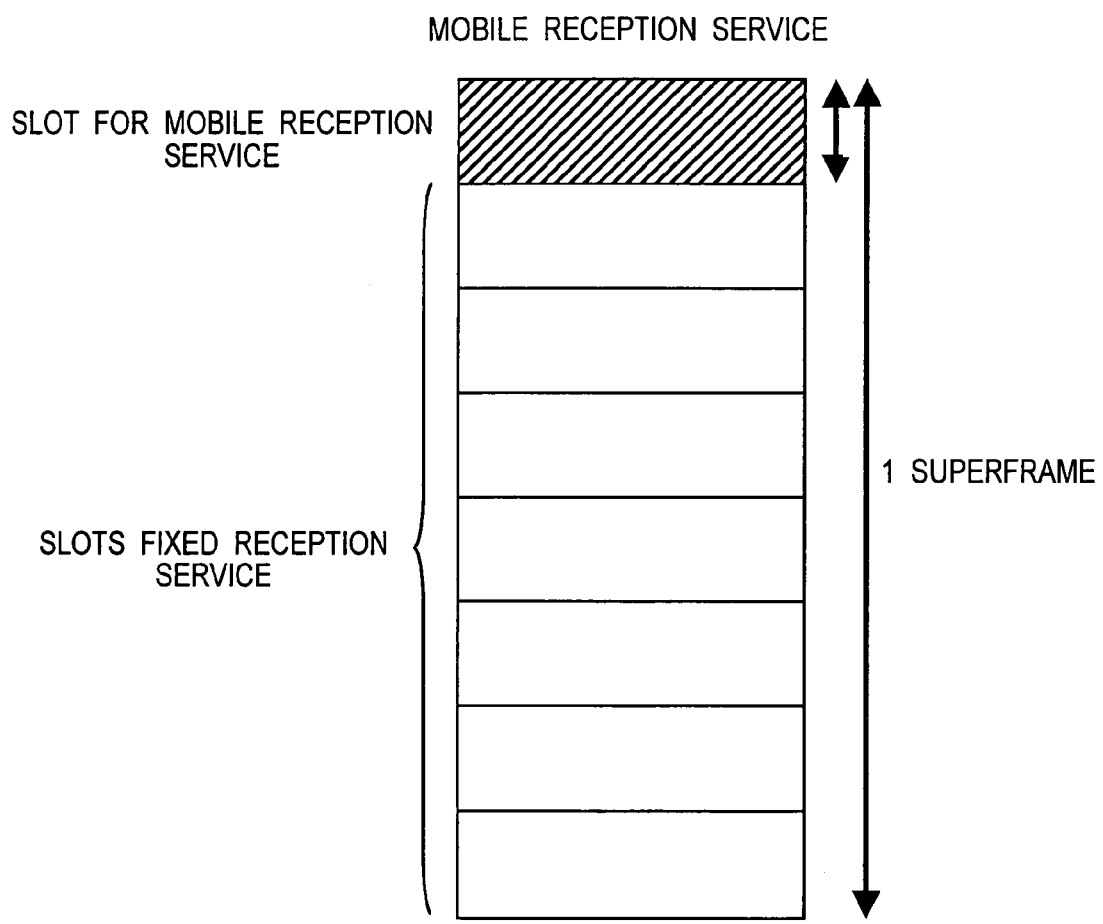
FIG. 18 describes the slot structure used in a preferred embodiment of a digital broadcast transmission method according to the invention.
Figure 19:
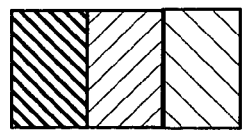
FIG. 19 shows a combination of 64 QAM parameters used in a preferred embodiment of the invention.

FIG. 17 describes the concept of this embodiment. This embodiment differs from the fifth embodiment in that slots are applied to the fixed reception service as well as the mobile reception service. The slot arrangement of this embodiment is shown in FIG. 18, and the 64 QAM packet count is shown in FIG. 19.

This embodiment is not compatible with conventional DVB-T services. However, the mobile reception service slot in this embodiment is compatible with the mobile reception service slot in the fifth embodiment. This embodiment segments one superframe into eight slots, uses one slot for mobile reception service and the remaining seven slots for fixed reception services.

The parameters used in this embodiment are 8 k mode and 1/4 guard interval; for mobile reception services slot, QPSK coded at a 1/2 code rate, and for fixed reception service slot, 64 QAM coded at a 3/4 code rate.

This embodiment is provided with two channels of encoders, each encoder including energy dispersion 11, Reed-Solomon coding 12, byte interleaving 13, convolutional coding 14, time interleaving 16, and bit interleaving 15. Introducing TDM (Time Division Multiplex), the mobile reception service and fixed reception service are multiplexed by MUX 22 by symbol unit, subsequently processed with frequency interleaving 20, mapping 18 and OFDM modulation 17, and transmitted finally.

The mobile receiver receives only the slot carrying mobile reception service. The slot is transmitted at a fixed position in the OFDM superframe. The mobile receiver can therefore operate for a known specific time only, and low power consumption can thus be achieved. Furthermore, because time interleaving 16 is applied separately to the mobile reception services and fixed reception services, only those slots carrying the mobile reception service can be extracted and received. The mobile reception service transfer rate in this embodiment is 623 Kbps.

Receiving fixed reception service is described next. Since byte interleaving 13, convolutional coding 14, and time interleaving 16 are applied within the fixed reception service, the fixed reception services are not intermixed with data for the mobile reception services. As a result, the carrier can be used effectively.

The transfer rate for fixed reception services in this embodiment is 19.59 (=22.39×7/8) Mbps because the transfer rate when the entire slot is used is 22.39 Mbps.

Embodiment 9

Figure 20:
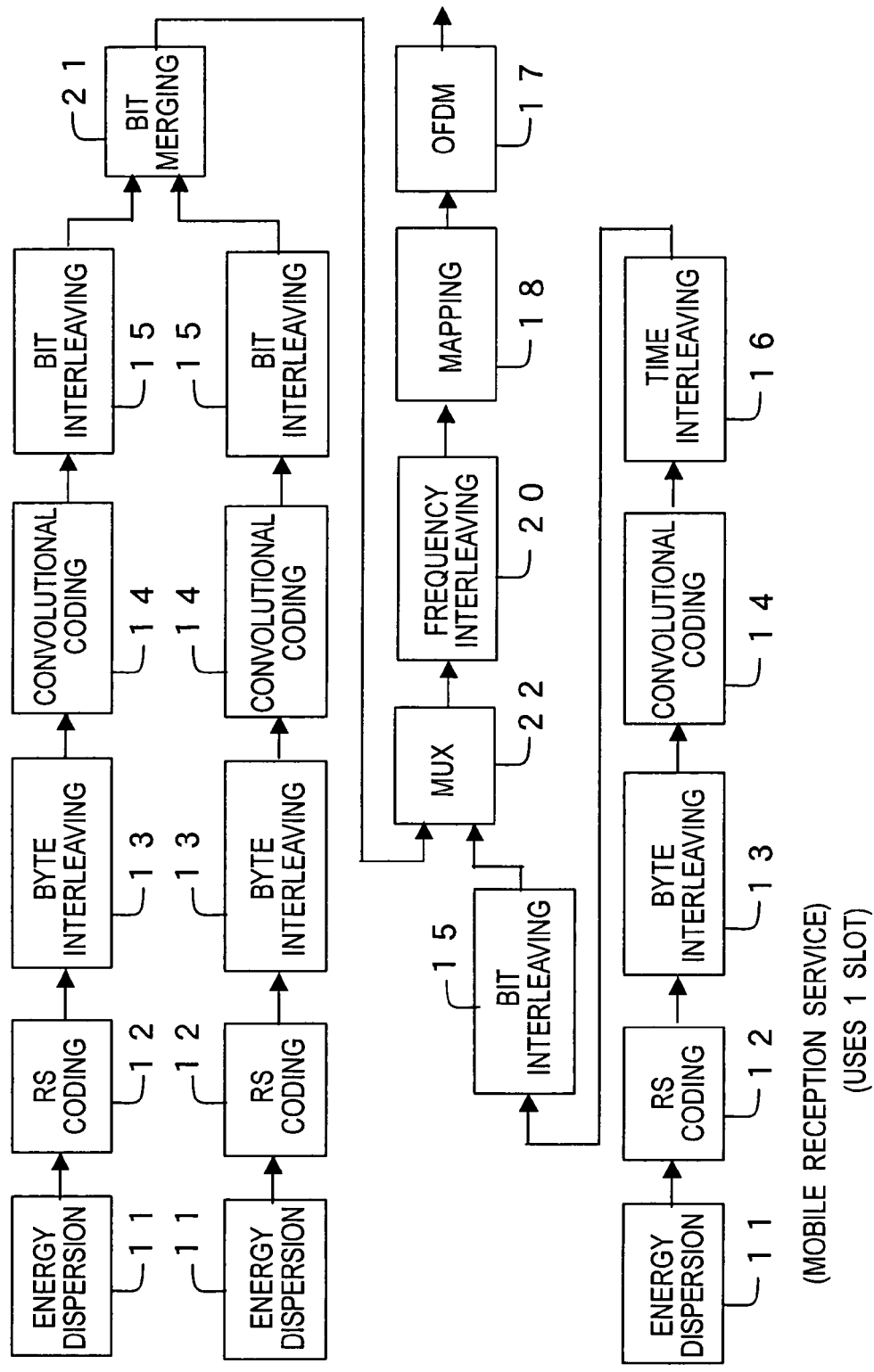
FIG. 20 is a function block diagram of a preferred embodiment of a digital broadcast transmission method according to the present invention.
Figure 21:
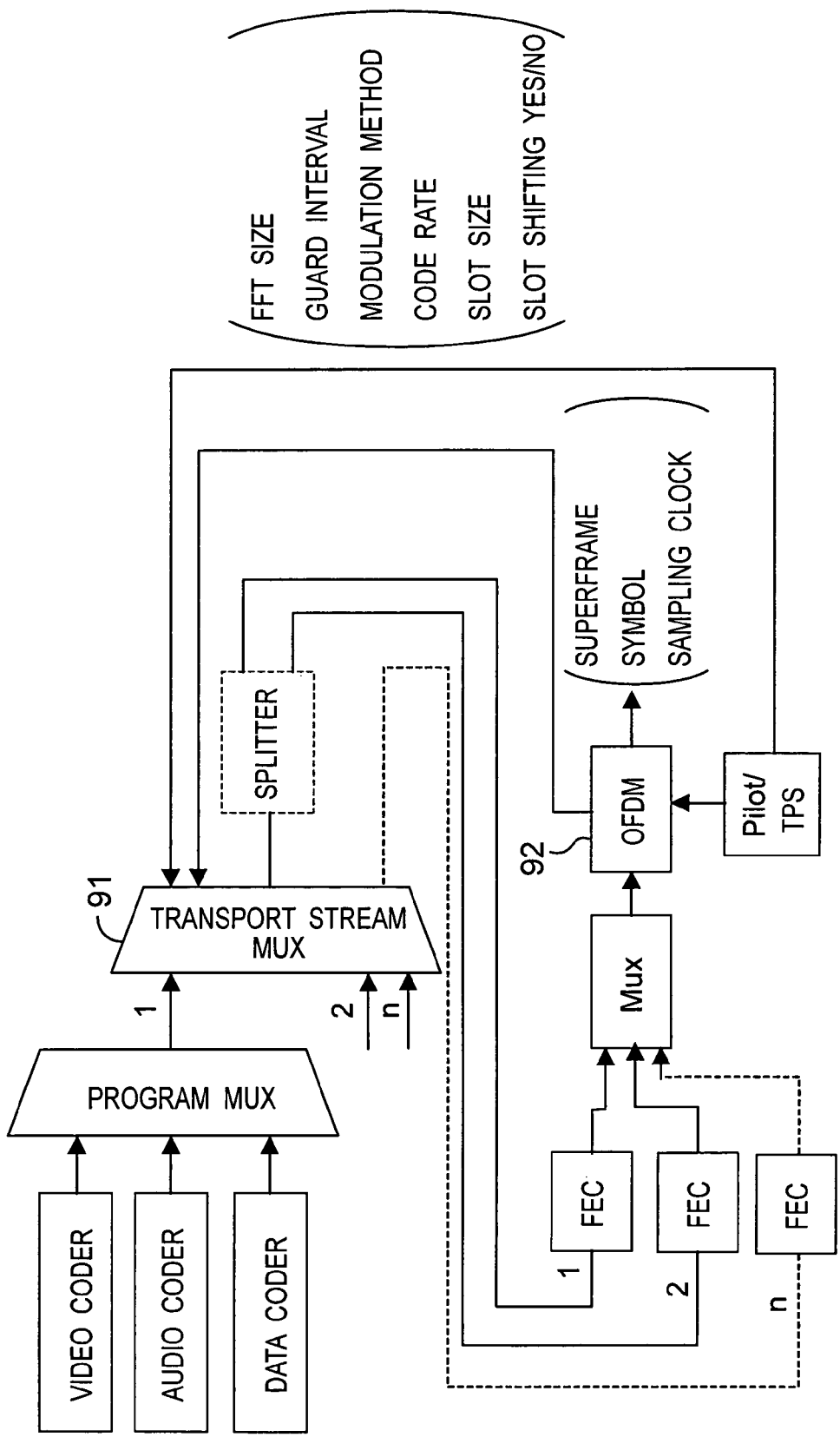
FIG. 21 describes a TS multiplexer control method according to the present invention.

FIG. 20 shows an example of applying time division to hierarchical services in a DVB-T system when one slot is used for the mobile reception service. Although DVB-T service using hierarchical transmission are not currently available, the concept of the foregoing fifth embodiment can be applied as described in this embodiment to hierarchical transmission of DVB-T service.

It is arranged that null packets are inserted to the location of the mobile terminal services slots and before and after those slots in this embodiment of the invention and the null packets are input continuously to the modulator input of a conventional DVB-T hierarchical transmitter to be processed.

Embodiment 10

This embodiment describes a method of determining the packet location according to the frame configuration on the transmission side. This embodiment relates to control of the transport stream multiplexer (MUX) on the transmission side when OFDM is applied to the DVB-T in the fifth and later embodiments.

In this embodiment, the transport stream MUX 91 receives (feeds back), from the OFDM modulator 92, FFT sampling clock, FFT size, guard ratio, superframe synchronization signal, symbol synchronization signal, the modulation method for fixed terminal reception and mobile terminal reception, code rate, slot size, number of slots, and on/off of slot shift. The transport stream MUX 91 then locates the mobile reception service appropriately to a specific slot position for mobile terminal reception. At this time the transport stream MUX 91 inserts or deletes null guard packets in the conventional fixed reception service data at a position corresponding to the mobile reception service slot position and before and after this slot position. As a result, as described in the fifth embodiment, consecutive null packets, or packets having a PID that is not used by the receiver for mobile reception services or fixed reception services, are inserted in the fixed reception services data at the slot position of the mobile reception services and before and after this slot position. Resetting the PCR clock by packet shifting is also done in this block in this embodiment of the invention.

The transport stream MUX 91 segments the transport stream (TS) according to the number of services, inserts null packets as needed, and sends the TS packets to the OFDM modulator 92. The OFDM modulator 92 receives the TS packets for each slot according to the number of services, and applies transmission channel coding as described in the embodiments of the invention.

Embodiment 11

This embodiment of the invention relates to a receiver for mobile reception service. The mobile reception service can be received by a personal digital assistant (PDA) or a cellular phone, for example.

Figure 22:
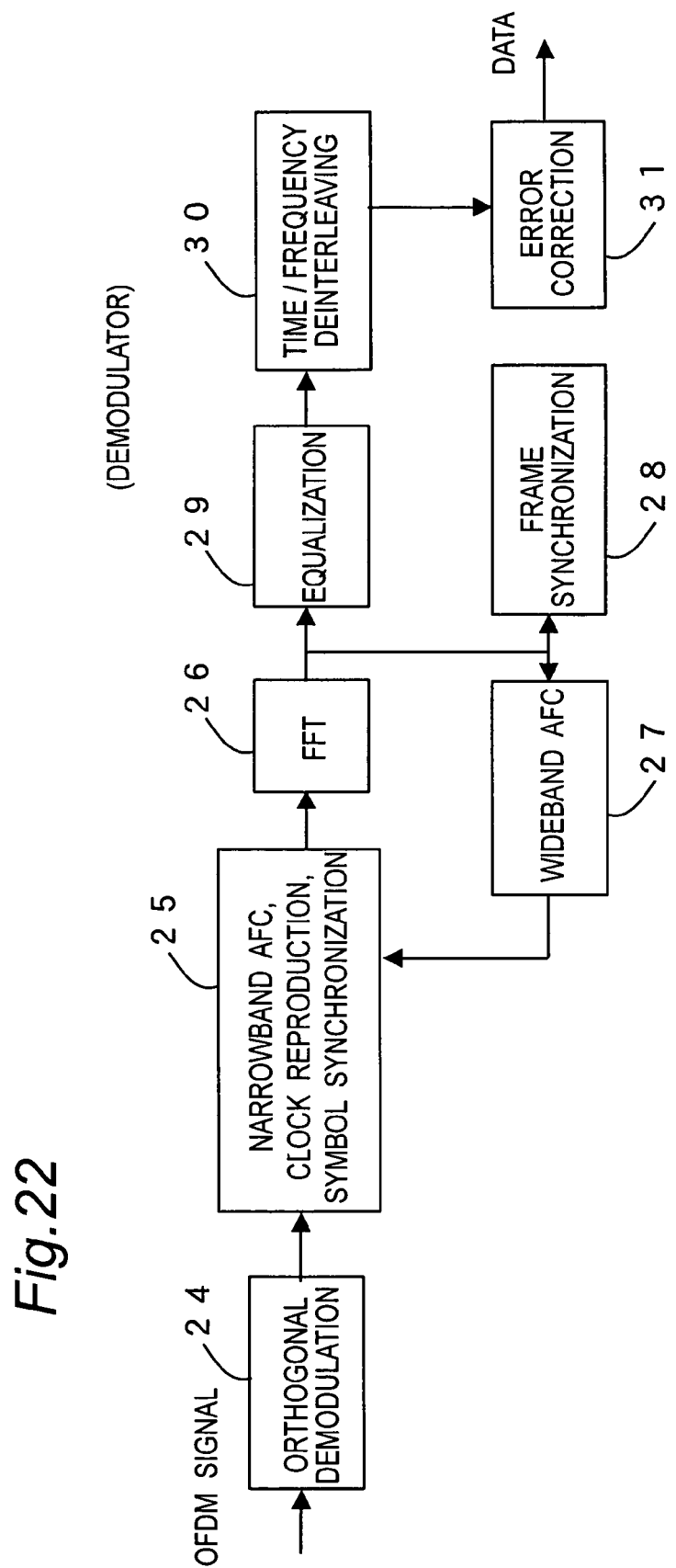
FIG. 22 shows the arrangement of a receiver for receiving signals transmitted by the present invention.

This embodiment is described as a mobile receiver for receiving services transmitted in the transmission format described in the seventh embodiment of the invention. FIG. 22 is a function block diagram of this receiver. The received OFDM signal is orthogonally demodulated in the receiver, and is clock synchronized in the time domain, narrowband frequency synchronized, and symbol synchronized. The signal is then FFT processed, wideband frequency synchronized, frame synchronized, and superframe synchronized.

At the start of receiving a mobile reception service, the mobile receiver establishes frame synchronization, symbol synchronization, and superframe synchronization, and receives the TPS signal. After storing the TPS signal to a predetermined memory, the minimal circuitry required to prevent a loss of symbol synchronization, frame synchronization, and superframe synchronization is driven.

Figure 23:
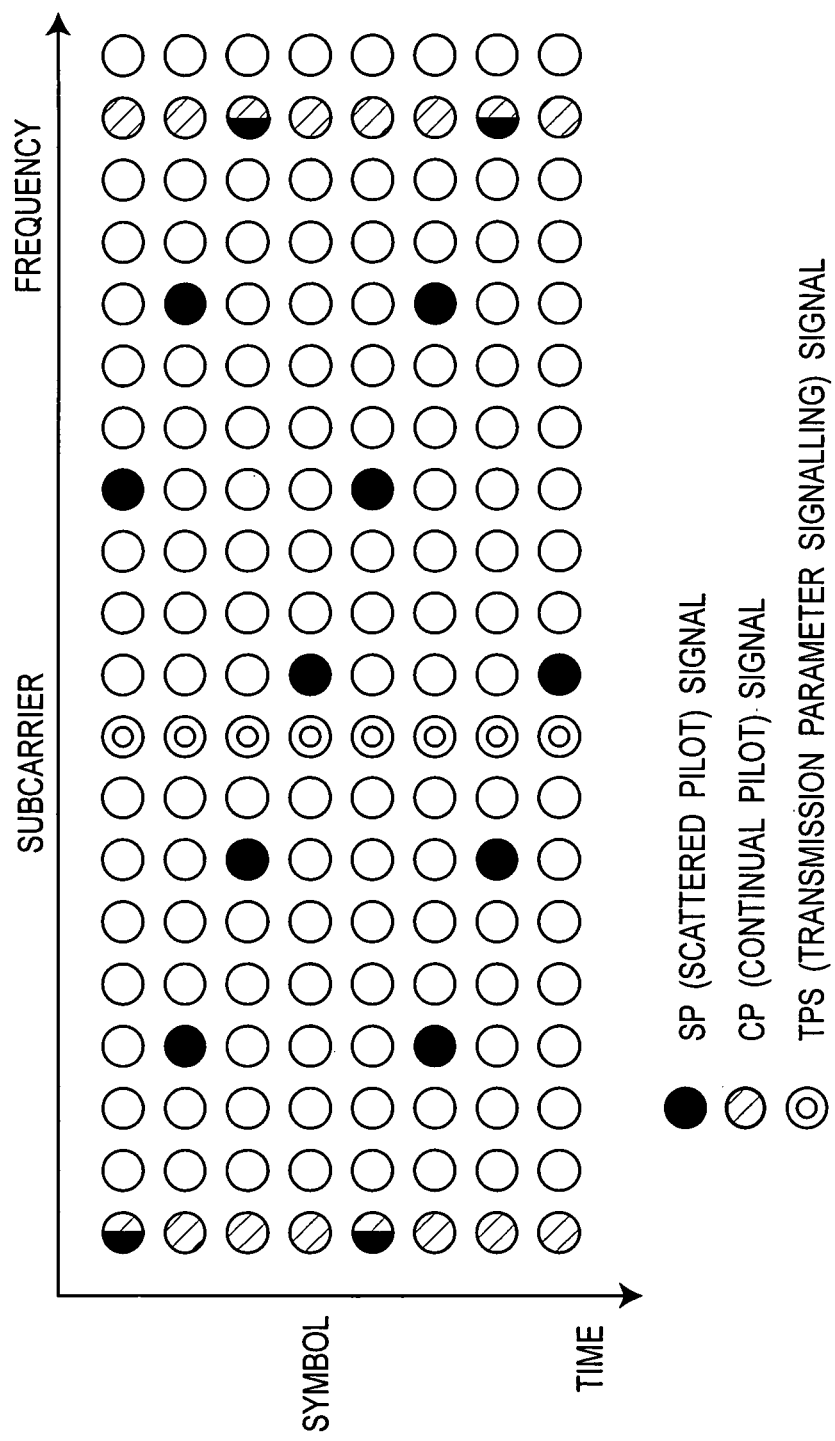
FIG. 23 shows an example of the SP signal contained in the OFDM signal in the present invention.
Figure 24:
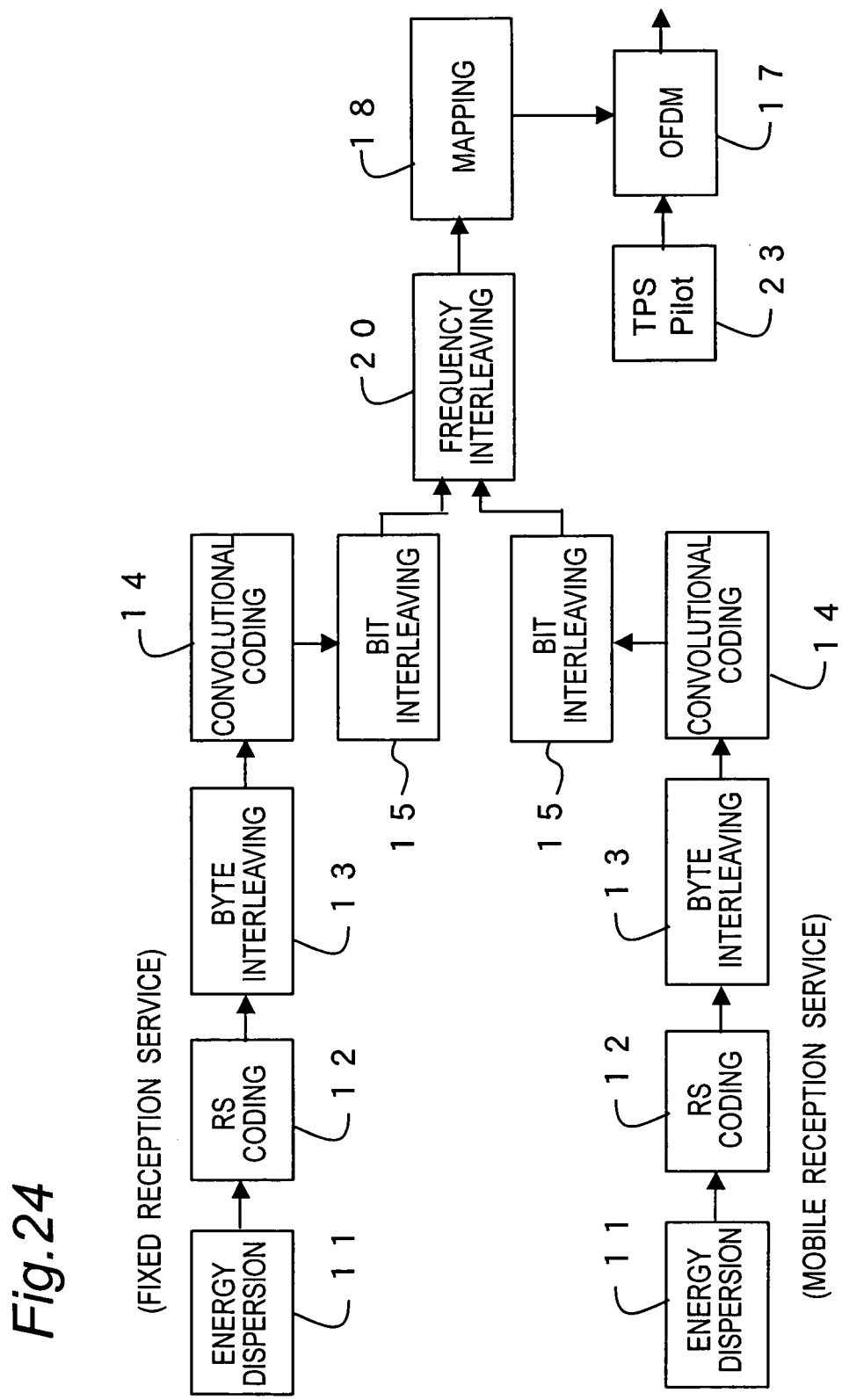
FIG. 24 is a block diagram showing the conventional DVB-T transmission method.

Once wideband frequency synchronization and frame synchronization are established, the frame position can be confirmed without driving the FFT and the subsequent modules, as long as in the time domain narrowband frequency synchronization the clock reproduction, and symbol synchronization are driven. Further clock synchronization and frequency synchronization can be maintained. However, after FFT, the signals are equalized based on the phase of the transmitted SP signal. FIG. 23 shows the locations of the SP signals. The SP signals are located every four symbols, and it will be known from FIG. 23 that FFT processing to extract the SP signal is required from at least three symbols before a specific slot.

The mobile receiver can thus run the FFT and subsequent processes only for the specific slot and three symbols before. Note that interleaving and error correction are only applied to the slots containing the specific service.

Power consumption can thus be reduced. Note that because it is sufficient to just maintain synchronization at positions other than the specific slot a current of the tuner can be lowered at locations outside the specific slot, and low power consumption can also be achieved in the RF unit.

Embodiment 12

Figure 25:
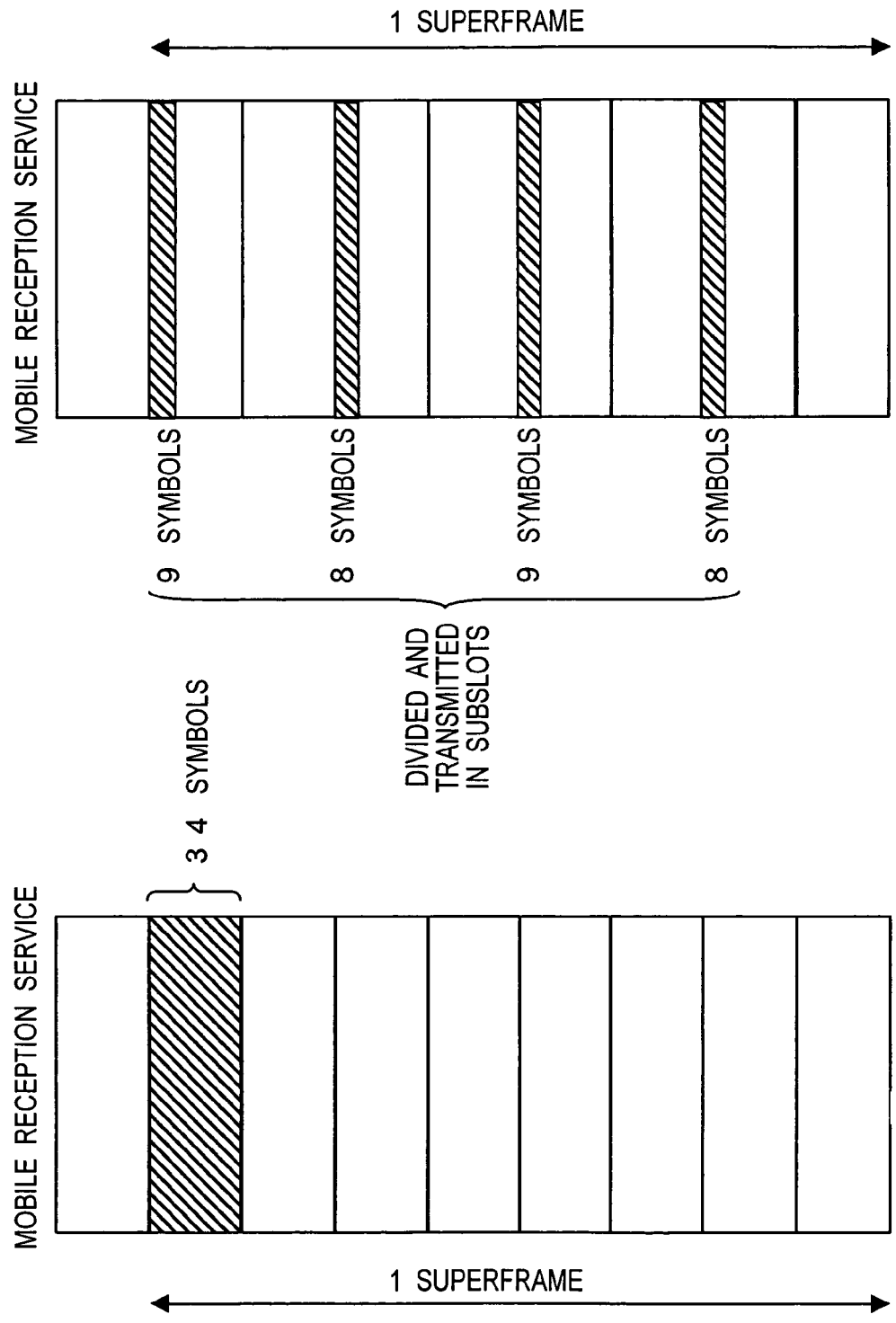
FIG. 25 shows the slot structure in a preferred embodiment of a digital broadcast transmission method according to the present invention.

This embodiment of the invention is the same as the foregoing fifth embodiment except that one slot is segmented into four parts in one superframe. That is, mobile reception service is transmitted using four subslots. FIG. 25 shows this subslot structure.

In this embodiment of the invention, one slot (34 symbols) is segmented into subslot #1 (9 symbols), subslot #2 (8 symbols), subslot #3 (9 symbols), and subslot #4 (8 symbols).

This embodiment relates to mobile reception services in the arrangement shown in FIG. 9, and applies Reed-Solomon coding, byte interleaving, convolutional coding, and time interleaving in one channel. Each subslot is composed of an integer number of symbols, and if the number of packets contained in the subslots are combined, there is an integer number of packets in one superframe. Otherwise, this embodiment of the invention is the same as the fifth embodiment.

However, the slots are segmented into subslots and the number of null packets inserted before and after the subslots increases. The transmission capacity of the fixed reception services thus drops. This is calculated below.

Twelve packets are interleaved as a result of byte interleaving for the fixed reception service. Byte interleaving is shown in FIG. 11. Therefore, at each every subslot for the mobile reception service, 12 null packets are provided before and after the subslot, and one null packet to terminate Viterbi decoding is added before the subslot. Thus 13 null packets are transmitted before each subslot. After each subslot, 24 null packets for TS synchronization are transmitted in addition to the 12 byte interleaved packets. The number of packets in the fixed reception services transmitted in the 34 symbols of all four subslots using 64 QAM and a 3/4 code rate is 337.75 (1134×34/272=141.75, and (13+12+24)×4+141.75=337.75), and thus approximately 338 null packets are required.

Because 338 null packets are transmitted in this embodiment, the maximum transfer rate with 64 QAM and a 3/4 code rate drops from 22.39 Mbps to 15.72 (=22.39×(1134−338)1134) Mbps.

These figures apply to the 2 k mode. In the 8 k mode, the number of packets transmitted per superframe is greater, the drop in the transfer rate is less than in the 2 k mode.

Embodiment 13

The eleventh embodiment of the invention is described in further detail below. The overall process of the receiver is shown in FIG. 22. In the receiver, the OFDM signal for the desired channel selected in the received signal is orthogonally demodulated by the orthogonal demodulator 24, and is processed with clock synchronization, narrowband frequency synchronization, and symbol synchronization by the time domain processing circuit 25. Transmission channel decoding is then applied to the synchronized signals. That is, the synchronized signal is FFT processed by the FFT circuit 26, frequency error is detected by carrier interval unit by the wideband AFC circuit 27, and the frame synchronization circuit 28 establishes frame synchronization and superframe synchronization. After FFT processing, the equalization circuit 29 restores the amplitude and phase of each carrier. The deinterleave circuit 30 then applies frequency deinterleaving, bit deinterleaving, time deinterleaving, or other process, and the error correction circuit 31 applies Viterbi decoding, byte deinterleaving, and Reed-Solomon decoding.

The normal DVB-T reception process is described specifically first.

The OFDM signal used in DVB-T has a guard interval which is generated by copying the latter part of data in the valid symbol period cyclically copied to the front of the valid symbol period.

The ratio of this added portion to the valid symbol is defined as guard interval, and is 1/32, 1/16, 1/8, or 1/4 in DVB-T.

Figure 26:
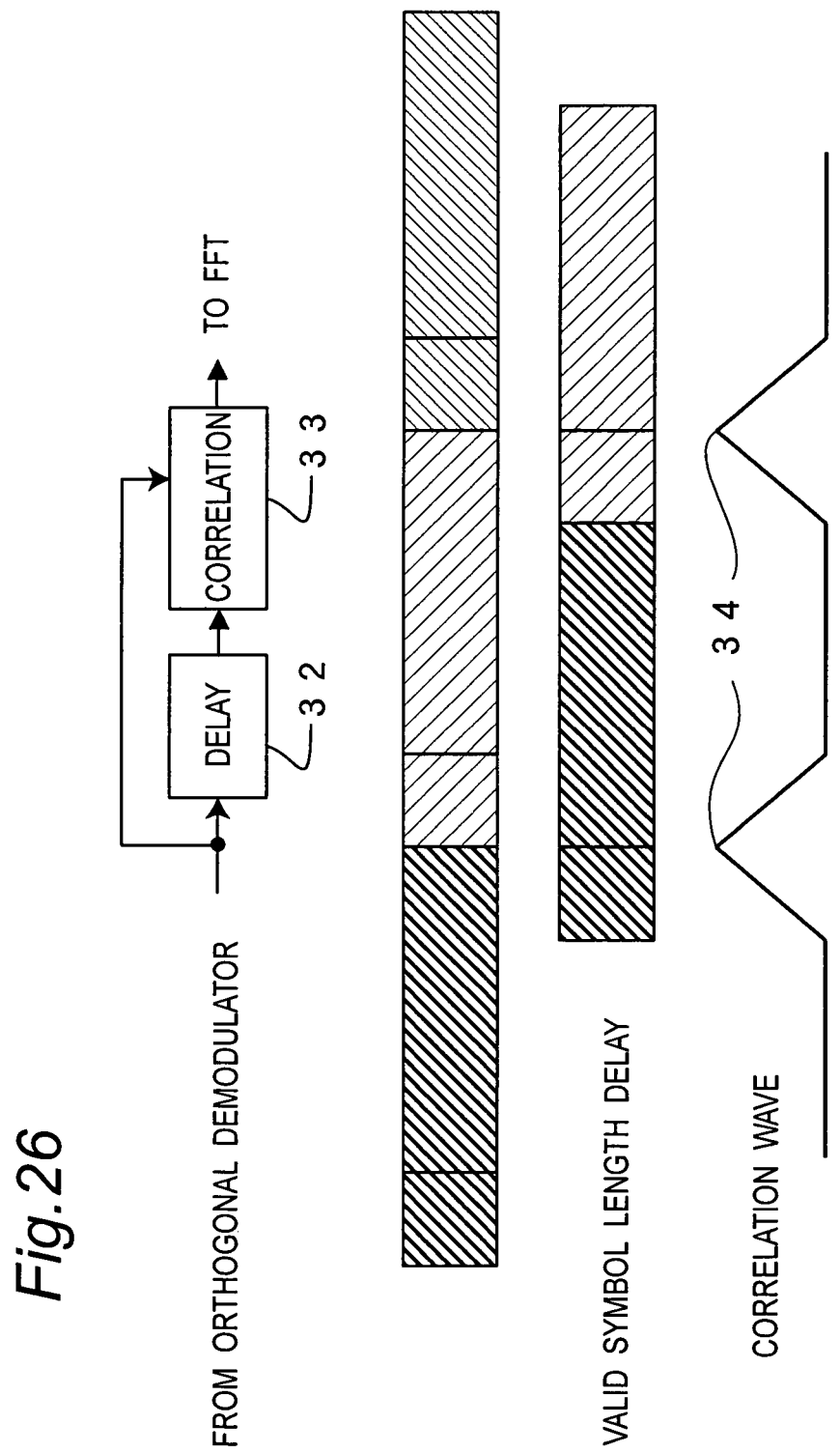
FIG. 26 describes processing in the time domain used in a preferred embodiment of the invention.

Using the fact that the guard interval is a copy of the latter part of the valid symbol period, synchronization is possible on the reception side. This is shown in FIG. 26. The delay circuit 32 delays the data after orthogonal demodulation by the length of the valid symbol period. Correlation circuit 33 relates the received signal to the delay circuit 32 output. A correlation wave 34 is observed between each symbol. The FFT size and guard length can be detected from the time width of this correlation wave 34. Furthermore, using the fact that the correlation wave 34 appears at the symbol boundary, symbol synchronization is also possible. The guard interval is then removed and the remaining signal is sent to the FFT.

Figure 27:
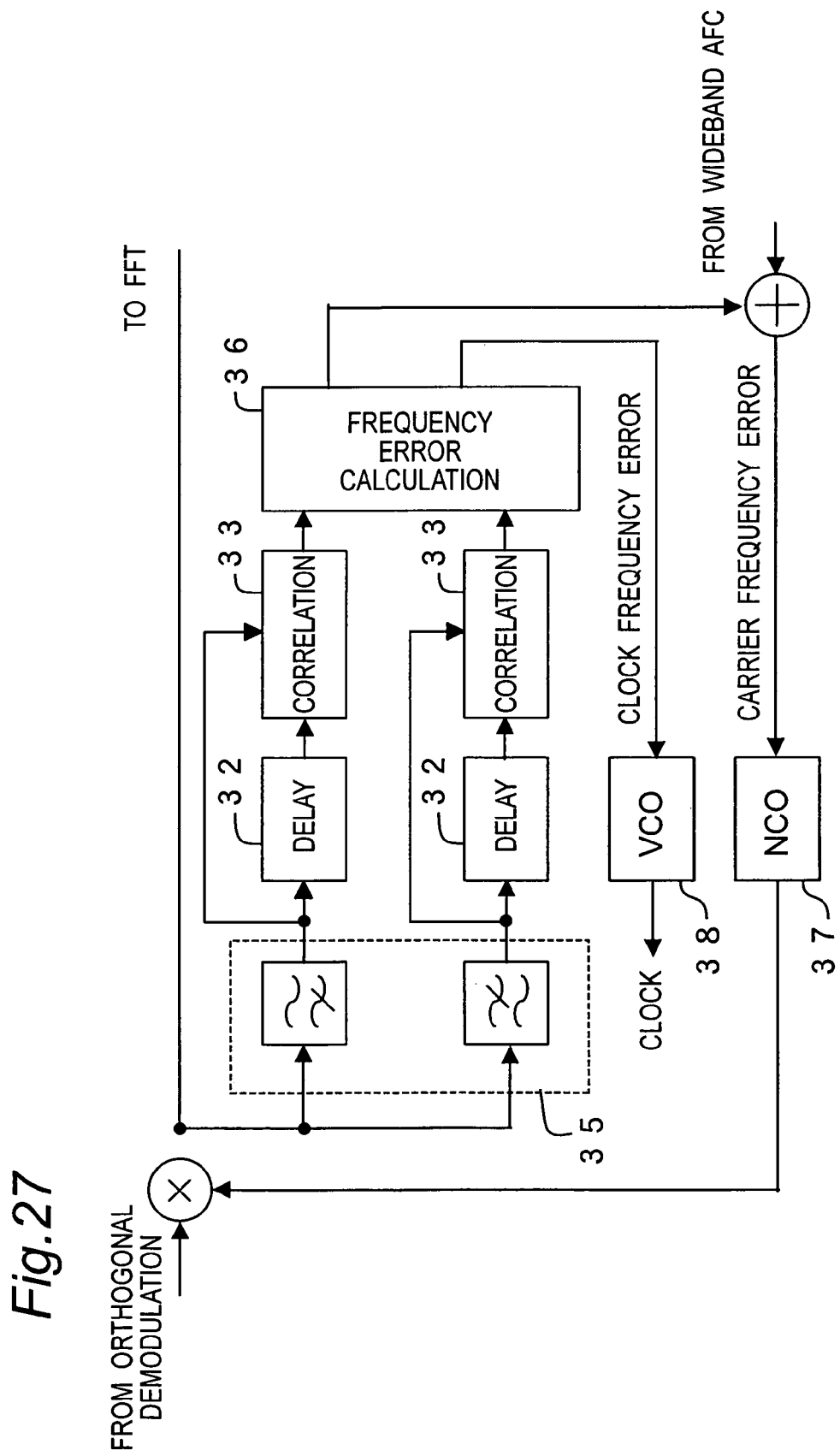
FIG. 27 describes processing in the time domain used in a preferred embodiment of the invention.

Using this correlation wave 34, narrowband AFC for synchronization within the subcarrier interval and clock generation is also possible in addition to symbol synchronization. This is shown in FIG. 27. Regarding narrowband AFC and clock generation, the frequency separation circuit 35 separates the orthogonal demodulation signal into signal components, in the positive and negative frequency domains, and the correlation between these signals and the signals delayed the valid symbol period is obtained.

The frequency error calculation circuit 36 estimates the carrier frequency error in the subcarrier interval from the sum of the phase of these correlation signals, and estimates the clock frequency error from the phase difference of the correlation signals.

The carrier frequency error in the subcarrier interval is added to the frequency error of the subcarrier interval unit from the wideband AFC circuit to control NCO 37. VCO 38 is controlled by the detected clock frequency error.

Figure 28:
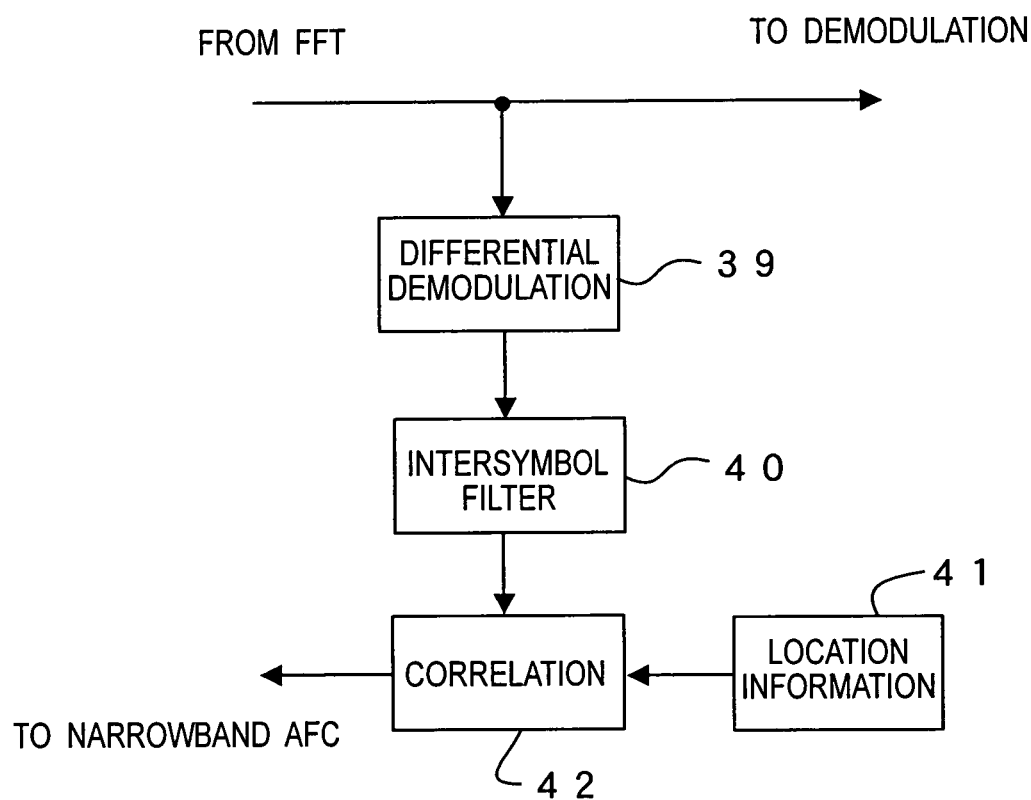
FIG. 28 describes processing of a wideband AFC used in a preferred embodiment of the invention.

Carrier frequency synchronization of the subcarrier interval unit after FFT processing, that is, wideband frequency synchronization, is described next. FIG. 28 is a block diagram of the wideband AFC. The FFT output signal is differentially demodulated between symbols at each subcarrier by the differential demodulation circuit 39, and integrated by the intersymbol filter 40. The differential demodulation result of CP signal is the same in phase for each symbol, while that of the other signal is random in phase. Thus the filter can extract the signal component only for the CP signal. Calculation of the correlation between the filter output and CP signal location information 41 by the correlation circuit 42 allows the carrier frequency error at the subcarrier interval to be estimated.

The synchronization code (s1 to s16) contained in the TPS signal shown in FIG. 15 is used for frame synchronization. The synchronization code is detected from the result of differential demodulation of the TPS signal between symbols and then integrating the numerous TPS signals transmitted in the symbols.

Estimating and equalizing the transmission channel characteristics are described next.

Figure 29:
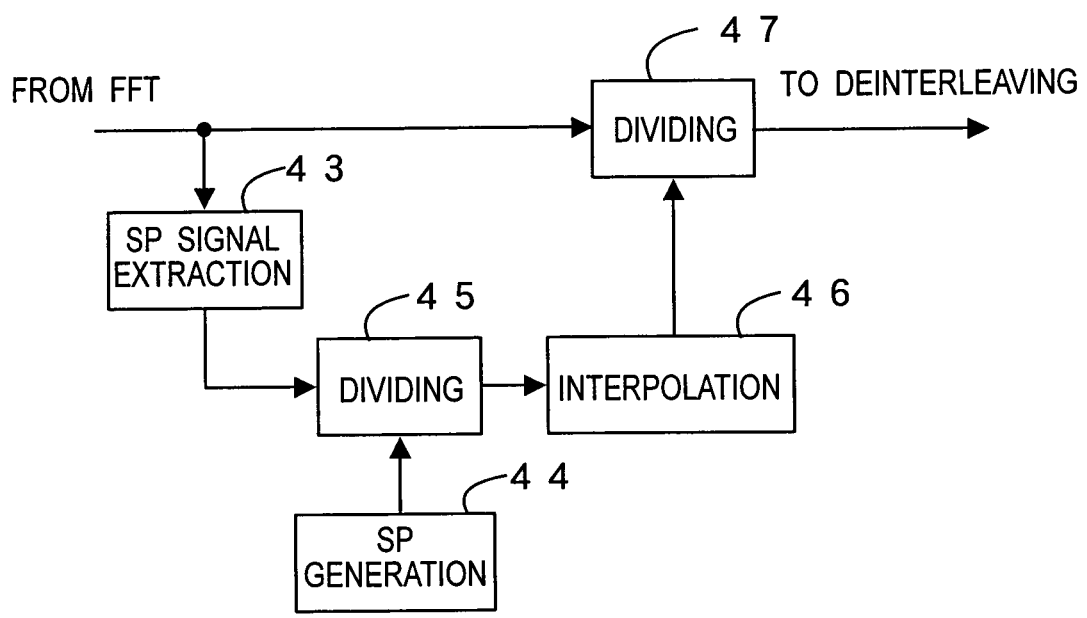
FIG. 29 describes an equalization process used in a preferred embodiment of the invention.

The transmission channel characteristics are obtained as described below. FIG. 29 shows transmission channel equalization. The SP signal extraction circuit 43 extracts SP signal contained in the FFT output. SP generator 44 generates the SP signals transmitted by the transmission side. Divider 45 divides the received SP signal by the transmission side SP signal. The transmission channel characteristic of the SP signal is thus estimated. Interpolator 46 interpolates the SP signal transmission channel characteristic in the symbol direction and subcarrier direction, and obtains the transmission channel characteristic for each subcarrier. The divider 47 divides the FFT output signal by the transmission channel characteristic, and thus restores the amplitude and phase of each carrier. The foregoing is an example of the normal DVB-T reception process, and the synchronization process of the demodulator is summarized below.

After orthogonal demodulation, narrowband AFC, clock generation, and symbol synchronization are applied to data in the time domain. The guard interval portion is extracted and the data is sent to the FFT. The data after FFT process is used for establishing wideband AFC synchronization. The frame synchronization is also established.

Receiving aspect of mobile reception service is described next.

Mobile reception service must be viewable for a long time on battery power, and an enabling method is required. As described in the first to ninth embodiments, one or multiple slots are used to provide one of mobile reception services. The remaining slots are not used for transmission of services for mobile terminal reception or are used to transmit the other mobile reception service. Therefore, only the slot(s) used to transmit the one mobile reception service is (are) received, and the other slots do not necessarily need to be received.

In this embodiment, one superframe is divided into eight slots, and one of these slots is used to transmit a mobile reception service. This embodiment of the invention uses the 8 k mode With a guard interval length of 1/4.

Figure 30:
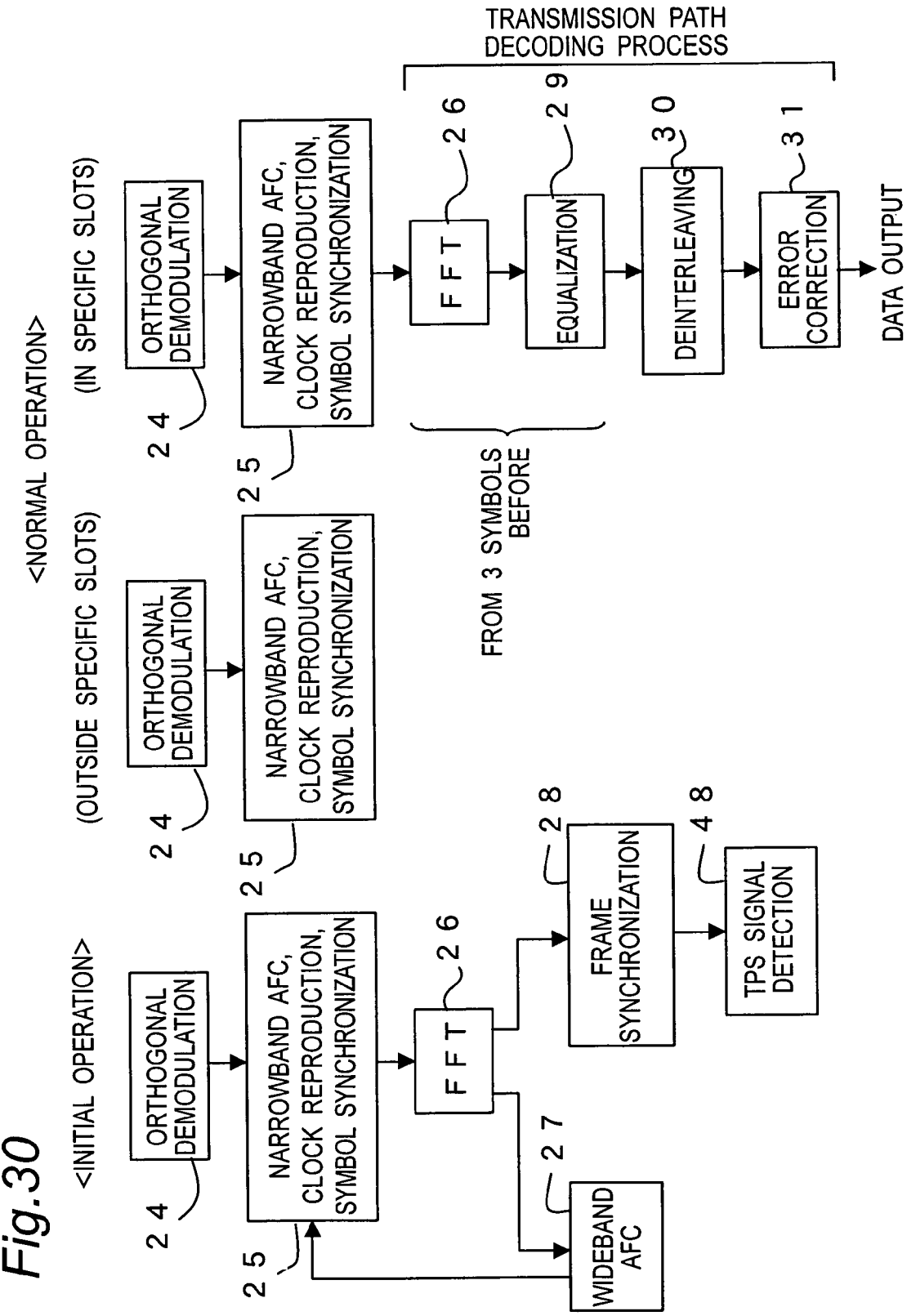
FIG. 30 is a block diagram showing signal processing used in a preferred embodiment of the invention.

FIG. 30 shows reception process of the mobile reception service. A slot containing a specific service selected for reception is referred to below as "specific slot." The middle section of FIG. 30 shows the reception operation for slots other than the specific slot, and the right portion of FIG. 30 shows the reception operation of the specific slots.

During initial operation the orthogonal demodulator 24 of the mobile receiver orthogonally demodulates the OFDM signal of the selected channel, and the time domain processing circuit 25 handles clock synchronization, narrowband frequency synchronization, and symbol synchronization. After FFT processing by the FFT circuit 26, the wideband AFC circuit 27 handles frequency synchronization at the subcarrier unit, and the frame synchronization circuit 28 handles frame synchronization and superframe synchronization.

Once frame synchronization is established, the TPS signal, location is known, and the specific information needed for the mobile reception service containing the TPS reserve bits s48 to s53, that is, the code rate of the inner code, modulation method, time interleave length, and slot size information, is stored to a specific memory in the TPS signal detector 48. The normal operating mode then takes over.

During the normal operating mode, once initial synchronization is established, if the time domain processing circuit 25 maintains frequency synchronization at the carrier interval, frequency synchronization will not be lost by using the frequency shift of the carrier unit stored in the memory even if the carrier frequency synchronization circuit is not driven. Furthermore, once frame synchronization and superframe synchronization are initially set, frame synchronization and superframe synchronization will likewise not be lost by counting, by the time domain processing circuit 25, the number of symbols, that is, counting only the number of correlation waves appearing at the symbol boundary in FIG. 26.

That is, once synchronization is initially set, all synchronizations can be maintained if the frequency synchronization and symbol synchronization is maintained within carrier interval. That is, operation downstream from the FFT circuit 26 can be stopped. Therefore, FFT and downstream processing is not needed anywhere other than for the specific slot, that is, transmission channel decoding is not needed. Furthermore, the bit count of the time domain processing circuit 25 can be reduced during operation for simply maintaining synchronization.

When receiving the specific slot, FFT circuit 26 operates from three symbols before the specific slot until the last symbol in the specific slot.

This is because the SP signal is located at the same position in a 4 symbol cycle as shown in FIG. 23. Therefore, considering that the SP signal of the current symbol can be used, if an SP signal present three symbols before the specific slot is provided, the transmission channel characteristics can be estimated. Therefore, the FFT process is only needed from three symbols before the specific slot. This SP signal is used for transmission channel equalization by the equalization circuit 29.

In the symbol period of the specific slot, deinterleaving by the deinterleave circuit 30 and error correction by the error correction circuit 31 also occur in addition to processing by the equalization circuit 29.

Therefore, the FFT and subsequent operations are not needed outside the period being received. The FFT and subsequent processes occupy 80% to 90% of the demodulation LSI, and power consumption can be reduced significantly compared with DVB-T signal reception.

Embodiment 14

This embodiment of the invention relates to reducing power consumption in the RF unit.

The properties of the OFDM signal are described first.

The difference between the average power and maximum power is extremely great in the OFDM signal, and nonlinear distortion is often a problem. As a result, current cannot be reduced in an amplification circuit of a tuner, and reducing power consumption is thus difficult.

The thirteenth embodiment of the invention enables simply maintaining synchronization except in the specific slot and 3 symbols before the specific slot. That is, it is only necessary to drive the guard correlation process in the time domain in order to maintain synchronization. This guard correlation is extremely resistant to noise, and operates without problem even when nonlinear distortion is present. Hence synchronization can be held even if the current flow is reduced, and low power consumption can be achieved in the RF section.

Figure 31:
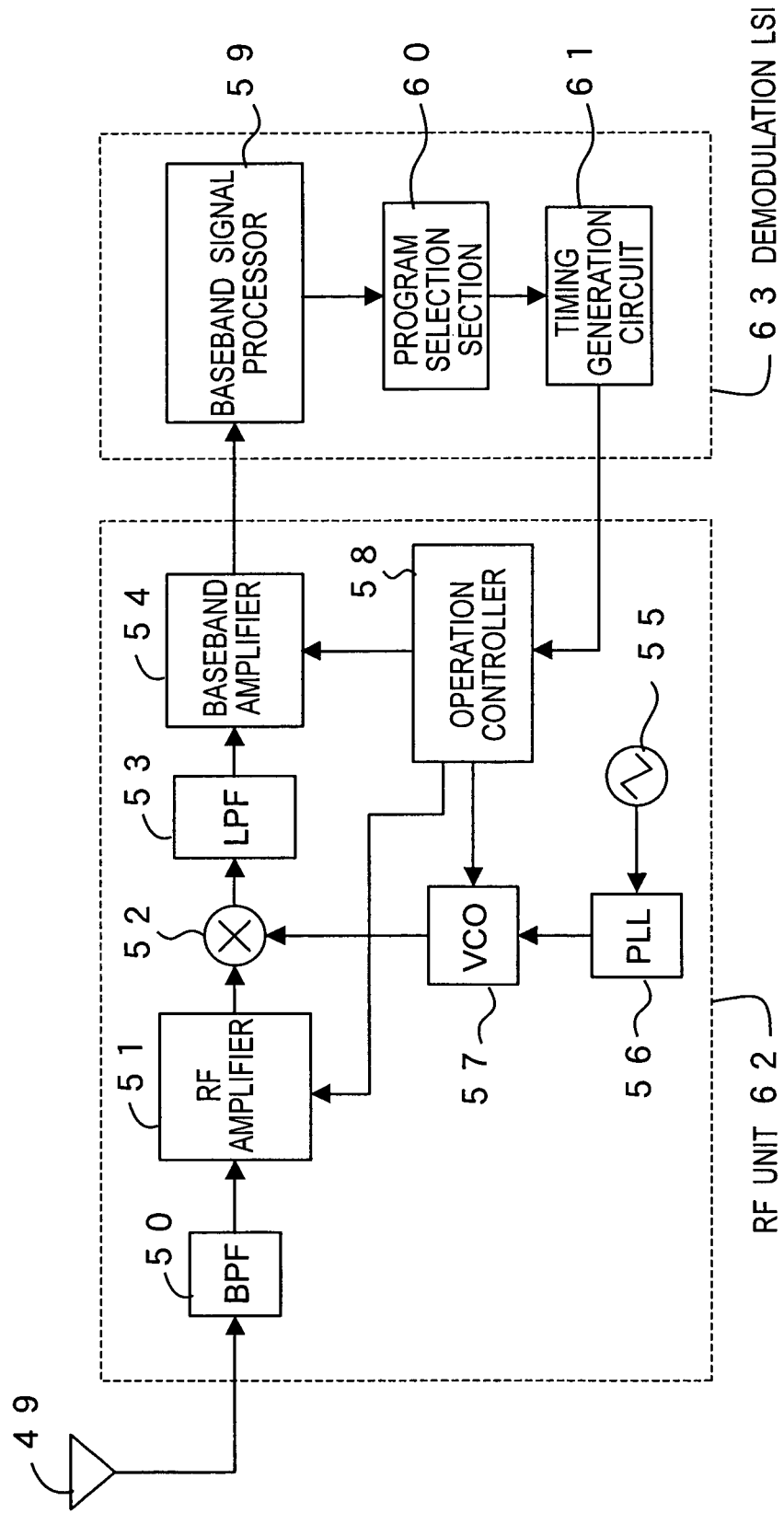
FIG. 31 is a block diagram of a reception process used in a preferred embodiment of the invention.

This is described more specifically with reference to the figures. FIG. 31 is a block diagram of a receiver according to this embodiment of the invention. In FIG. 31 antenna 49 receives the broadcast signal. The bandpass filter 50 limits the bandwidth of the received signal. RF amplifier 51 amplifies the output signal from the bandpass filter 50, and frequency converter 52 converts the output signal from the RF amplifier 51 to a baseband signal. The lowpass filter 53 then removes signals other than the baseband signal from the output signal of the frequency converter 52, and baseband amplifier 54 amplifies the baseband signal. The baseband signal processor 59 processes the broadcast signal. The program selection section 60 selects one of plural programs reproduced by the baseband signal processor 59. The timing generation circuit 61 generates a timing signal for the program selected by the program selection section 60. Voltage controlled oscillator 57 outputs a local signal for the frequency converter 52. The operation controller 58 controls the oscillation frequency of the voltage controlled oscillator using the timing signal from the timing generation circuit 61, and controls the current flow of the RF amplifier 51 and baseband amplifier 54. The phase-locked loop 56 generates a signal controlling an oscillation frequency of the voltage controlled oscillator based on the output signal from the local oscillator 55. The receiver is composed of the foregoing elements.

Operation of the receiver thus comprised is described next.

The antenna 49 receives a broadcast signal such as a digital television broadcast or digital radio broadcast transmitted with a plurality of programs time-division multiplexed together.

For the broadcast signal such as a digital television broadcast or digital radio broadcast transmitted with a plurality of programs time-division multiplexed to a single signal received by the antenna 49, the bandwidth is limited by the bandpass filter 50 and interference waves and other undesirable components are removed. The signal power is then amplified by the RF amplifier 51. Using the output signal of the voltage controlled oscillator 57 as a local signal, the frequency converter 52 converts the RF band broadcast signal to a baseband signal. The lowpass filter 53 removes all signals except the baseband signal. The baseband amplifier 54 then amplifies and outputs the baseband signal to the baseband signal processor 59 which then reproduces the broadcast signal data containing multiple time-division multiplexed programs.

After the multiple time-division multiplexed programs are cyclically reproduced, the program selection section 60 selects a desired program from the multiple reproduced programs, and timing generation circuit 61 generates a timing signal synchronized to the selected program data. As shown in the foregoing thirteenth embodiment, the timing generation circuit 61 outputs HIGH, during a period from three symbols before the slot carrying the specific service which requires FFT and subsequent processing to the last symbol in the specific slot carrying the selected service, and outputs LOW in other periods.

Based on a cyclical timing signal generated by the timing generation circuit 61, the operation controller 58 sets gains of the RF amplifier 51 and baseband amplifier 54 to gains required for normal DVB-T reproduction while the specific timing signal is HIGH. While the timing signal is LOW, synchronization can be held by the time domain processing circuit shown in the thirteenth embodiment even if gains of the RF amplifier 51 and baseband amplifier 54 are lower by approximately 1.0 dB, and low power consumption can therefore be achieved in the RF unit.

The gain of the RF amplifier 51 is switched in this embodiment, and it is therefore also necessary to switch the gain of the AGC circuit which is fed back to the tuner.

It should be noted that the timing generation circuit 61 outputs HIGH in the symbol period requiring FFT and subsequent processing in the embodiment, but considering the margin of the signal processing delay and the gain switching time, this HIGH period could be set slightly longer than the specific signal period requiring FFT and subsequent processing.

Embodiment 15

This embodiment is a different embodiment enabling reducing the power consumption of the RF unit 62. Because it is sufficient to hold synchronization except in the specific slot period as described above, this embodiment of the invention lowers the amplifier gain in the RF unit 62 as described in the fourteenth embodiment in the period in which the synchronization is held, and additionally narrows the bandwidth of the bandpass filter 50.

Figure 32:
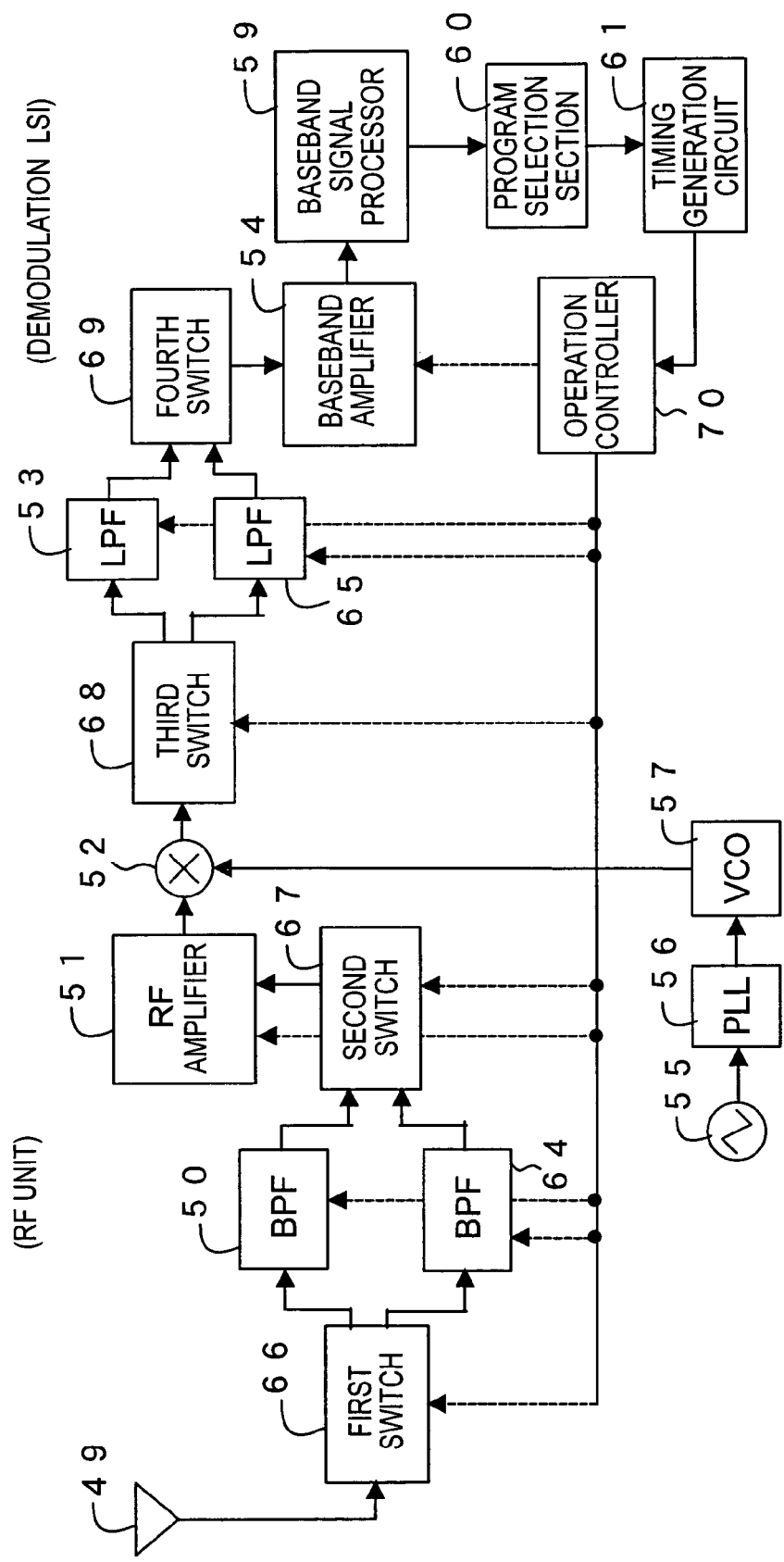
FIG. 32 is a block diagram of a reception process used in a preferred embodiment of the invention.

This operation is described more specifically with reference to the figures. FIG. 32 is a block diagram of a receiver according to this embodiment.

The antenna 49 receives a broadcast signal such as a digital television broadcast or digital radio broadcast transmitted with a plurality of programs time-division multiplexed together.

The first switch 66 determines whether the broadcast signal received by the antenna 49 is passed to bandpass filter 50 or bandpass filter 64 (narrowband). After bandwidth limiting and removal of interference waves by the bandpass filter, the second switch 67 selects the output from the bandpass filter corresponding to the first switch 66, and the bandpass filter output is amplified by RF amplifier 51.

Using the outputs signal from the voltage controlled oscillator 57 as a local signal, the frequency converter 52 converts the amplified RF band broadcast signal to a baseband signal.

A third switch 68 then selects whether to use the lowpass filter 53 or lowpass filter 65 (narrowband). The lowpass filter removes signals outside the baseband, and fourth switch 69 then selects the lowpass filter output corresponding to the third switch 68. The output of fourth switch 69 is amplified by the baseband amplifier 54 and input to the baseband signal processor 59.

The baseband signal processor 59 executes the process described in the thirteenth embodiment. The program selection section 60 selects data for the specified mobile reception service. The timing generation circuit 61 generates the specified timing signal described in the fourteenth embodiment.

Based on the cyclical timing signal output by the timing generation circuit 61, the operation controller 70 increases gains of the RF amplifier 51 and the baseband amplifier 54 when the timing signal is HIGH, and lowers gains of the RF amplifier 51 and the baseband amplifier 54 when the timing signal is LOW. Operation of the time domain processing circuit can be maintained as described in the thirteenth embodiment even if the gain is lowered by approximately 10 dB. Power consumption can also be significantly reduced by lowering the gain.

When the specified timing signal is HIGH, the operation controller 70 switches the first switch 66, second the switch 67, the third switch 68, and the fourth switch 69 to the upper channel. That is, the bandpass filter 50 and the lowpass filter 53 are selected. When the specified timing signal is LOW, the first switch 66, the second switch 67, the third switch 68, and the fourth switch 69 are set to the lower channel.

The bandpass filter 50 and the lowpass filter 53 used on the upper channel are filters that pass the bandwidth enabling DVB-T signal reception, that is, the 8 MHz bandwidth in this embodiment. Bandpass filter 64 and lowpass filter 65 used on the lower channel pass the 1 MHz band. Note that further lowering the pass band of the filters enables even lower power consumption.

As described above, this embodiment of the invention achieves low power consumption by lowering the amplifier gain, and further reduces power consumption in the RF unit by narrowing the pass band of the bandpass filter.

Lowering the gain in this embodiment of the invention as described above is achieved by lowering the current or voltage supplied to the amplifier circuits.

Embodiment 16

This embodiment of the invention relates to the AV encoder unit.

In MPEG standard it is specified that a receiver is provided with a 1.5 Mbit buffer for SD picture quality. It is also specified that several times this memory capacity is required for HD picture quality.

The receiver, however, normally has a memory more than the specified buffer size, and in this case, signals can thus be reproduced on the receiver side without problems even when transmitted as described in the foregoing fifth embodiment. It is, however, necessary to consider receivers having just the specified buffer size.

For example, in the 8 k mode with a 1/4 guard interval, one superframe is 305 ms long. If the slot size is reduced to 1/16, one slot is approximately 19 ms, or 25 ms if considering the null packets before and after the slot, and thus reception by a DVB-T receiver is not possible. If the DVB-T service is broadcast with 64 QAM and 3/4, for example, the transfer rate is 22.39 Mbps. Accordingly 560 (=22.39 Mbps×25 ms) Kbit of information is reproduced in this 25 ms period.

Hence provided is constraint that during encoding on the transmitter side, all buffers should not be used at the same time. More specifically, encoding is done by a method that does not always use one image frame (approximately 33 ms).

As a result, even if the size of the AV decoder buffer on the receiver side is only 1.5 Mbits, a picture can be reproduced by the DVB-T receiver without occurrence of a decoder buffer underflow.

Embodiment 17

This embodiment of the invention is a variation of the fifteenth embodiment, differing therefrom in holding the gain of the RF amplifier constant and lowering the voltage supplied to the amplifier in periods other than the symbols and specific slots requiring FFT processing. Other aspects of this embodiment are the same as in the fifteenth embodiment.

Although distortion is introduced to the reception signal when the voltage supplied to the amplifier is reduced, it is only necessary to hold synchronization in the periods other than the specific slots, and synchronization can thus be maintained without problem.

This is described more specifically with reference to FIG. 32.

The antenna 49 receives a broadcast signal such as a digital television broadcast or digital radio broadcast transmitted with a plurality of programs time-division multiplexed together.

The first switch 66 determines whether the broadcast signal received by the antenna 49 is passed to bandpass filter 50 or bandpass filter 64 (narrowband). After bandwidth limiting and removal of interference waves by the bandpass filter, the second switch 67 selects the output from the bandpass filter selected by the first switch 66, and the bandpass filter output is amplified by the RF amplifier 51.

Using the outputs signal from the voltage controlled oscillator 57 as a local signal, the frequency converter 52 converts the amplified RF band broadcast signal to a baseband signal.

The third switch 68 then selects the lowpass filter 53 or lowpass filter 65 (narrowband). The lowpass filter removes signals other than the baseband, and the fourth switch 69 then selects the lowpass filter output corresponding to the third switch 68. The output of fourth switch 69 is amplified by the baseband amplifier 54 and input to the baseband signal processor 59.

The baseband signal processor 59 executes the process described in the thirteenth embodiment. The program selection section 60 selects data for the specified mobile reception service. The timing generation circuit 61 generates the specified timing signal described in the fourteenth embodiment.

Based on the cyclical timing signal output by the timing generation circuit 61, the operation controller 70 sets the voltage of RF amplifier 51 and baseband amplifier 54 to the same voltage as during normal DVB-T reception when the timing signal is HIGH, and lowers the voltage supplied to the RF amplifier 51 and the baseband amplifier 54 when the timing signal is LOW.

Distortion occurs in the reception signal when the voltage supplied to the amplifier drops, but synchronization can be maintained without problem because it is only necessary to hold synchronization outside of the specific slot.

When the specified timing signal is HIGH, the operation controller 70 switches the first switch 66, the second switch 67, the third switch 68, and the fourth switch 69 to the upper channel. That is, the operation controller 70 selects the bandpass filter 50 and the lowpass filter 53. When the specified timing signal is LOW, the first switch 66, the second switch 67, the third switch 68, and the fourth switch 69 are set to the lower channel.

The bandpass filter 50 and the lowpass filter 53 used on the upper channel are filters that pass the bandwidth enabling DVB-T signal reception, that is, the 8 MHz bandwidth in this embodiment. The bandpass filter 64 and the lowpass filter 65 used on the lower channel pass the 1 MHz band. Note that further narrowing the pass band of the filters tends to alleviate nonlinear distortion, thus enabling the voltage to be lowered even further and thereby affording even lower power consumption.

As described above, this embodiment of the invention can lower the voltage supplied to the RF amplifier except in the specific slots and portions requiring FFT processing, and can thus lower power consumption.

Note, further, that the voltage or current can also be decreased to circuits other than the RF amplifier section except in the specific slots and three symbols therebefore.

Embodiment 18

Figure 33:
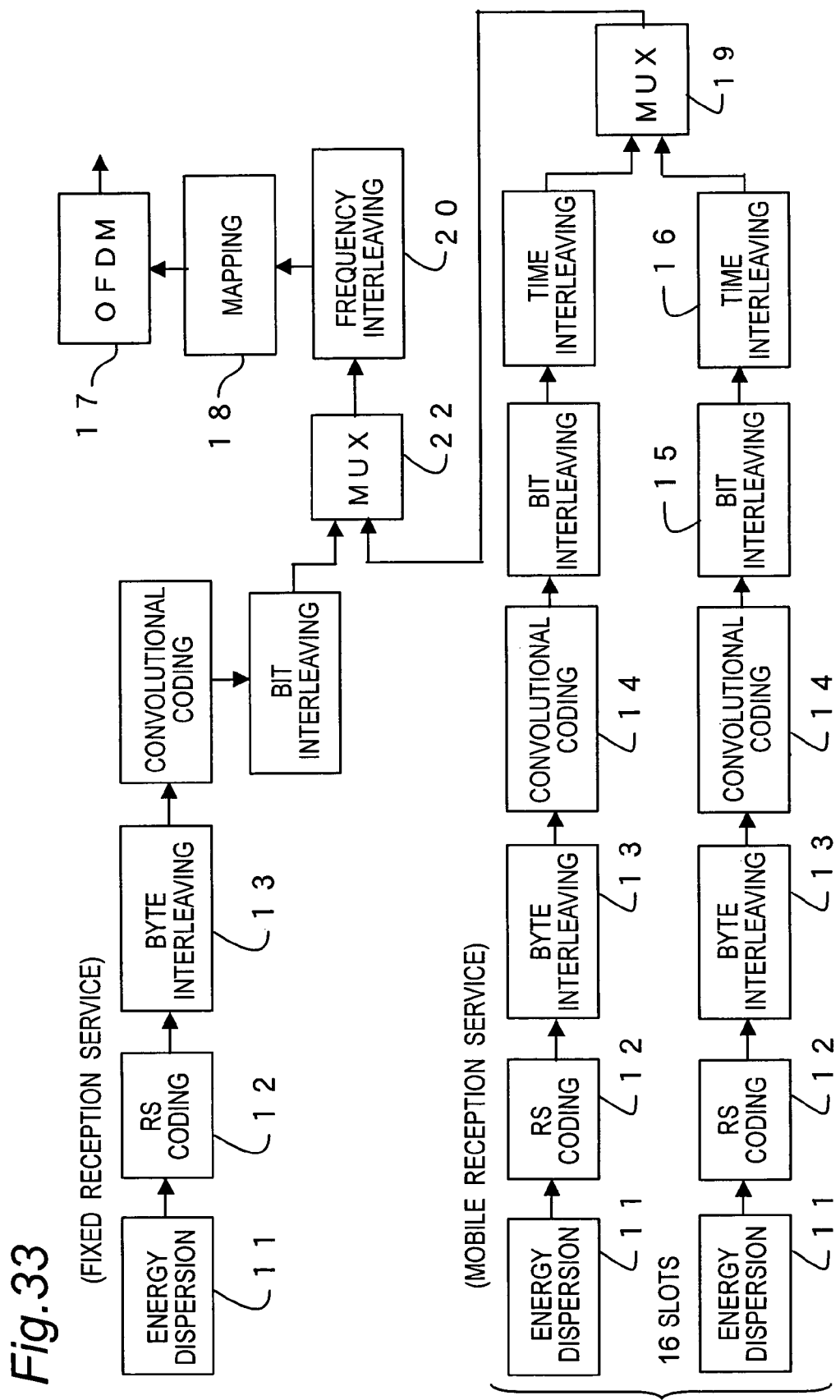
FIG. 33 is a block diagram of a reception process used in a preferred embodiment of the invention.

FIG. 33 describes another OFDM signal transmission method according to the present invention. This embodiment is a variation of the fifth embodiment in which the bit interleave and time interleave positions are switched. This embodiment also uses only one of the 16 superframe segments used in the fifth embodiment, and is otherwise the same as the fifth embodiment.

Embodiment 19

Figure 34:
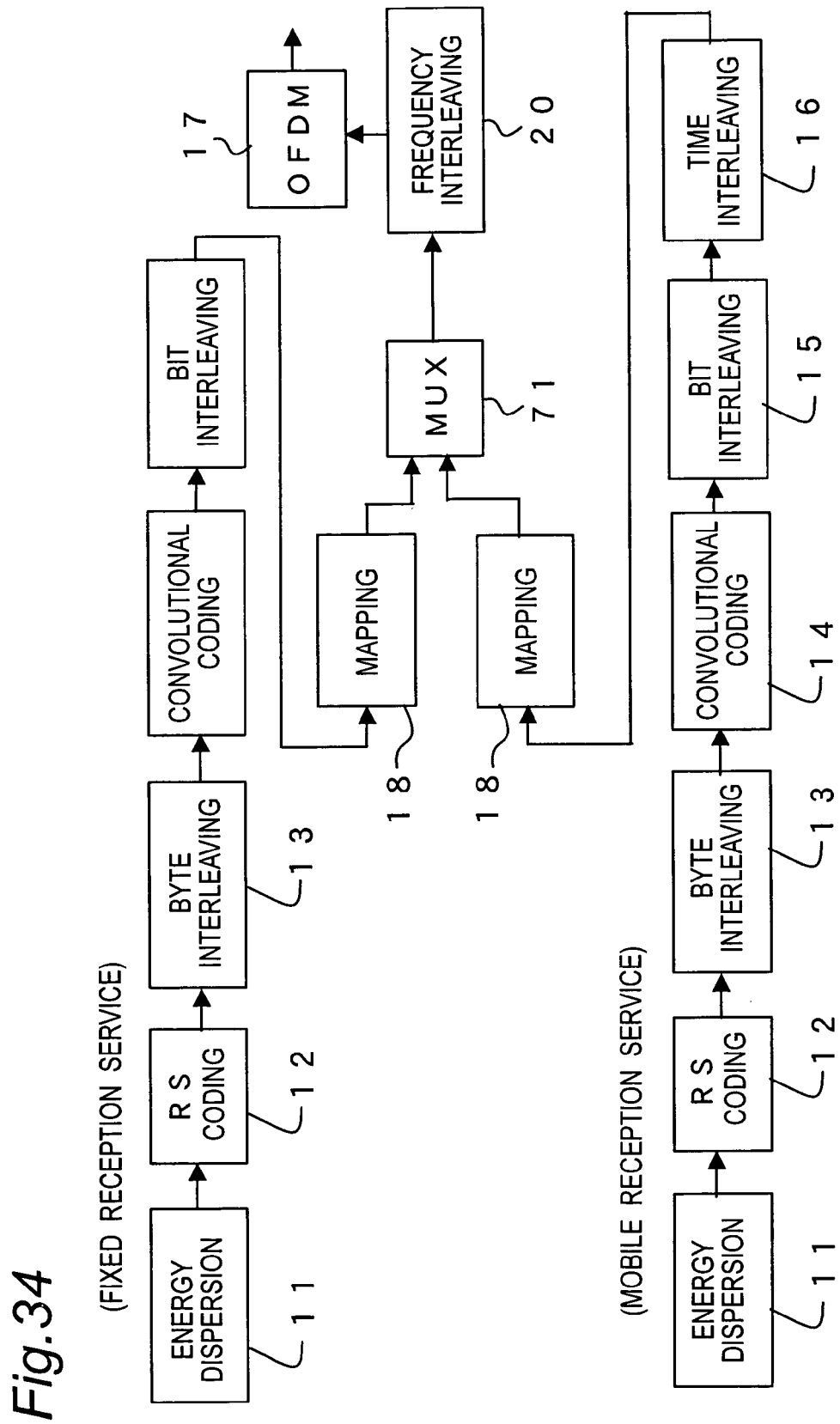
FIG. 34 is a block diagram of a reception process used in a preferred embodiment of the invention.

FIG. 34 describes another OFDM signal transmission method according to the present invention. This embodiment differs from the eighteenth embodiment in that it clearly shows only one mobile reception service.

This embodiment uses two slots of the 16 superframe segments for one service. In this embodiment there is one transmission channel coding channel for mobile reception service, and the multiplexer 71 switches between the mobile reception service and the fixed reception service.

In this embodiment, the multiplexer 71 switches between the fixed reception service and the mobile reception service not at the OFDM symbol but at the carrier symbol contained in the OFDM symbol. As a result, the mapping section 18 is located before the multiplexer 71 in this embodiment.

Figure 35:
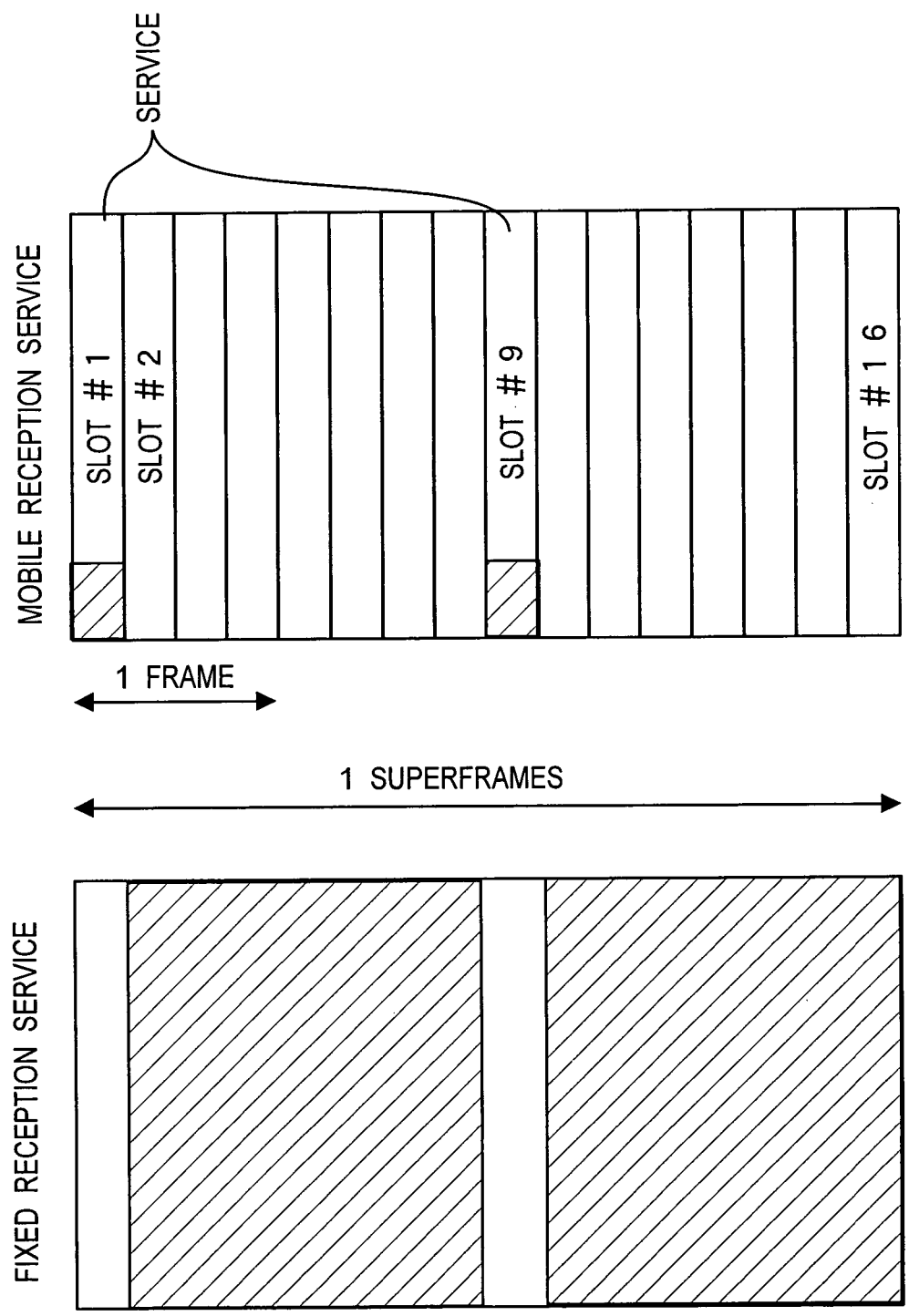
FIG. 35 shows how slots are used in a preferred embodiment of the invention.

The superframe structure in this embodiment is shown in FIG. 35.

In this embodiment, the multiplexer 71 multiplexes, with time-division, the mobile reception service and the fixed reception service. However, even if a slot for the mobile reception service is being transmitted at a position at which the synchronization signal of TS packet for the fixed reception service is transmitted normally, the multiplexer 71 performs switching so that the fixed reception services data is transmitted at the position.

More specifically, for reception by a conventional DVB-T receiver, the multiplexer 71 is controlled on the transmission side to predict a truncation length of the Viterbi decoding in the receiver so that during reception by the DVB-T receiver the DVB-T synchronization signal can be detected even in a mobile reception service slot.

The reception process is considered below. After frequency deinterleaving, the DVB-T receiver applies bit deinterleaving, then Viterbi decoding to decode the TS synchronization byte. The transmitter must therefore transmit so that the Viterbi decoding process can run with no problem.

The transmission side process is considered next. The TS packets input to the transmitter are processed for energy dispersion, Reed-Solomon coding, and byte interleaving, then converted to a bit stream for convolutional coding. Bit interleaving is then applied. Because processing after bit interleaving is applied to the carrier symbol unit, the multiplexer 71 can work using carrier symbol units.

In this embodiment, after the synchronization byte is converted to a bit stream for reproducing the synchronization byte in a future, it is considered how 144 bits of the convolutional coder output including 20 bits before the converted bits and the first bit of the synchronization byte are dispersed with bit interleaving. The multiplexer 71 then is switched so that mobile reception service is not transmitted in the dispersion range, It is noted that the Viterbi truncation length is 96 bits and the convolutional coder output is 144 bits long at a 2/3 code rate in this embodiment, but a different truncation length could be used.

Figure 36:
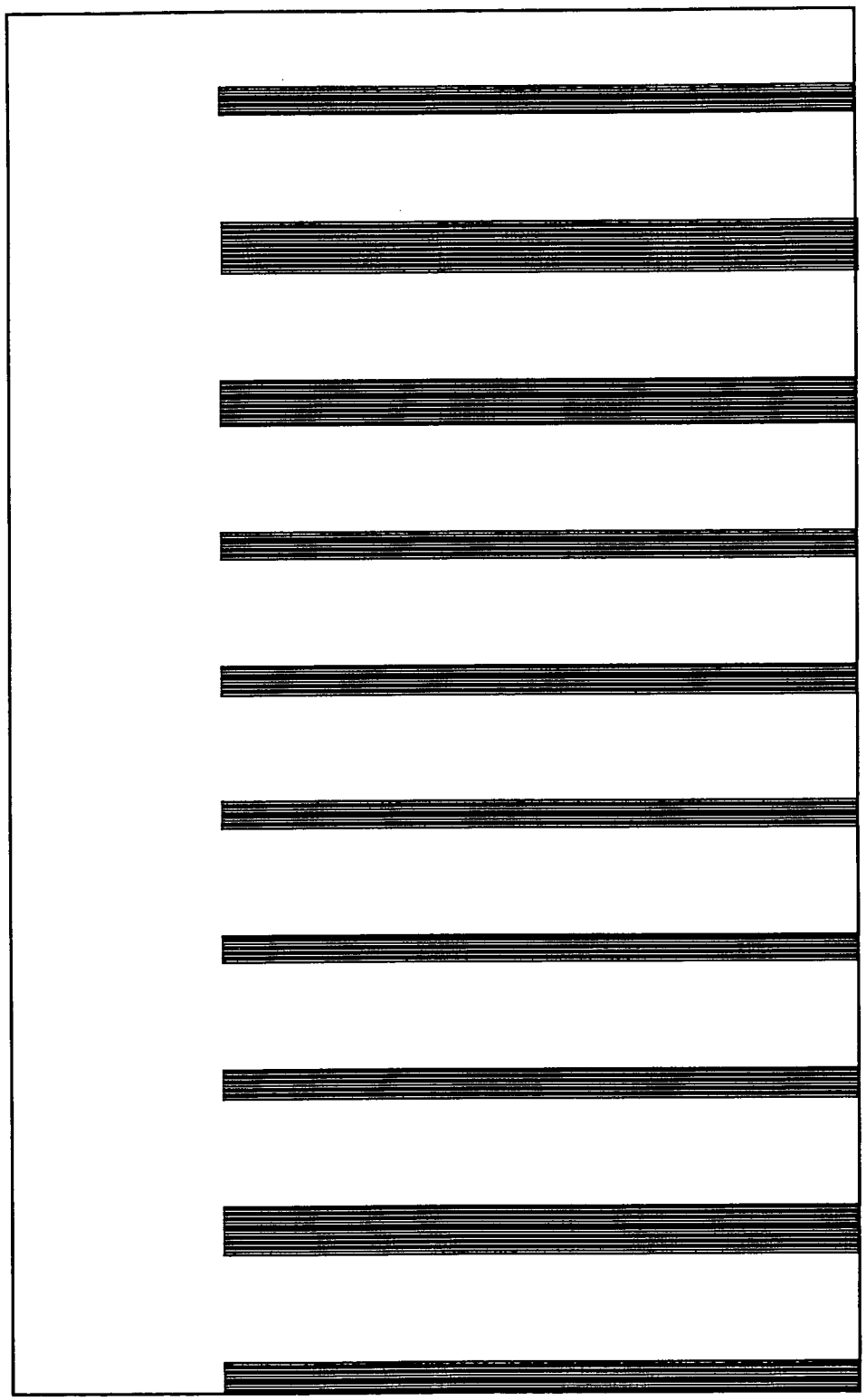
FIG. 36 describes diffusion by bit interleaving the 100+ bits before and after the TS synchronization byte signal used in a preferred embodiment of the invention.
Figure 37:
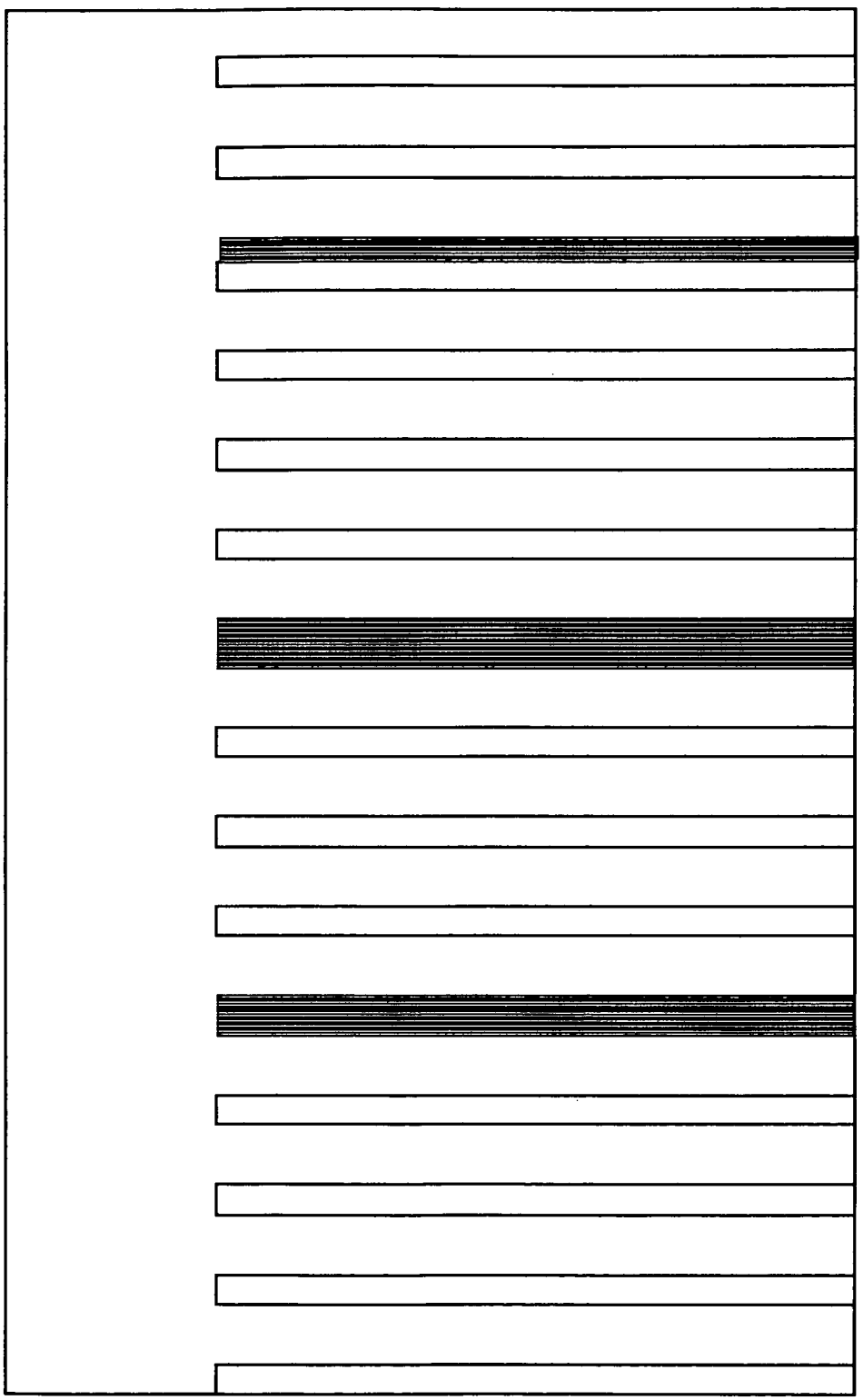
FIG. 37 describes diffusion by bit interleaving the 100+ bits before and after the TS synchronization byte signal used in a preferred embodiment of the invention.

FIG. 36 and FIG. 37 describe a method whereby the 164 bits before and after the synchronization byte are dispersed by bit interleaving. FIG. 36 shows a DVB-T service at 16-QAM and 2/3, and FIG. 37 shows a DVB-T service at 64-QAM and 2/3. As shown in FIG. 5, bit interleaving in DVB-T is a block interleave of 126 carriers per bit. For the 164 bits including the convoluted synchronization byte, 41 bits are input to each bit interleave in 16 QAM because four bit interleaves are used. Depending on the position of the bit sequence, the 164 bits including the convoluted synchronization byte are dispersed across 126 carriers, or 256 carriers if spanning a block.

Therefore, regarding the position of carrier used in the mobile reception service it is sufficient to store the start and stop positions of each block, for each symbol, and it is not necessary to store the position of every carrier.

With parameters shown in FIG. 36, the number of carriers to which the 164 bits containing the synchronization signal are dispersed to approximately 1300 carriers although the synchronization signal is positioned in a different part of each symbol. This corresponds to approximately 20% of all carriers, and use of other parts for the mobile reception service will not cause a problem for the DVB-T receiver at all. Likewise with the parameters shown in FIG. 37, the number of carriers to which the 164 bits are dispersed is approximately 2000, which is equivalent to approximately 30% of all carriers.

Regarding the carrier used for the TS synchronization signal of the DVB-T receiver, FIG. 36 shows approximately 20% and FIG. 37 shows approximately 30%. This is because mapping changes from four bits in 16 QAM to six bits in 64 QAM. Though not shown clearly in this embodiment, the number of carriers needed to reproduce the TS synchronization signal in the DVB-T receiver is 33% (=30%×(3/4)/(2/3)=30%×(9/8)) if the code rate is changed from 2/3 to 3/4 with 64 QAM, and can be handled similarly to 16 QAM.

Figure 38:
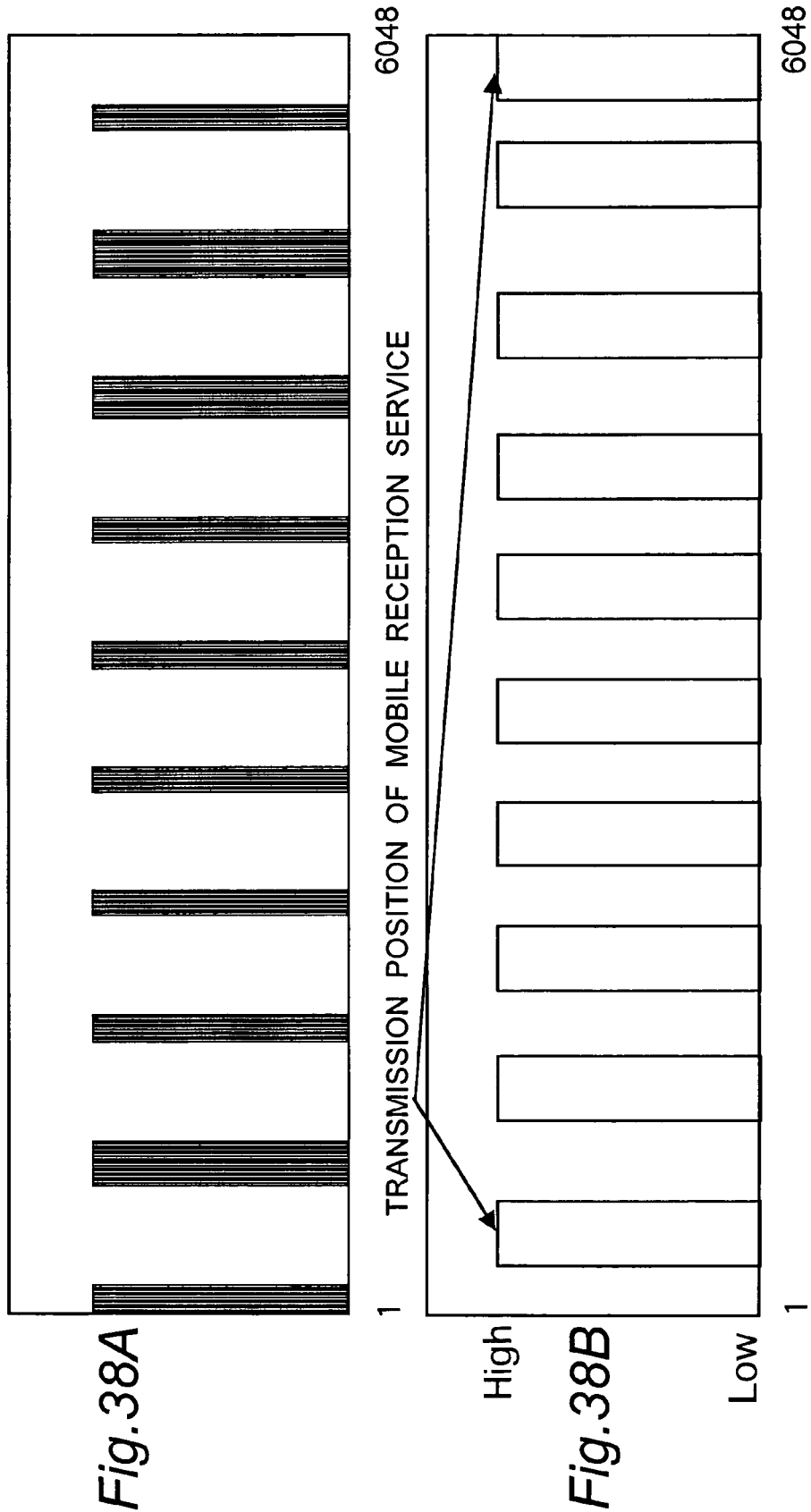
FIG. 38A and FIG. 38B are timing charts of switching the multiplexer used in a preferred embodiment of the invention.

In this embodiment, to simplify the slot structure, 3024 of the valid carriers per symbol, or half of the valid carriers are allocated to the mobile reception service, and the remaining carriers are used to transmit services for DVB-T (fixed terminal). This is shown in FIG. 38A and FIG. 38B. In FIG. 38B the multiplexer 71 is switched so that the mobile reception service is transmitted on the high portion and the fixed reception service is transmitted on the low portion.

FIG. 38A is the same as FIG. 36 and shows the period for transmitting DVB-T service. FIG. 38B shows the period for transmitting the mobile reception service. Because only half of all valid carriers are used in this embodiment of the invention, using two slots for transmission as shown in FIG. 35 has the same transmission capacity as with one slot in the fifth embodiment.

According to this embodiment, it dose not need to transmit additional 24 null packets to reproduce TS synchronization as described in the fifth embodiment.

According to this embodiment, a conventional DVB-T receiver which is not designed to replace the TS synchronization signal can receive DVB-T services with no problem.

Embodiment 20

Figure 39:
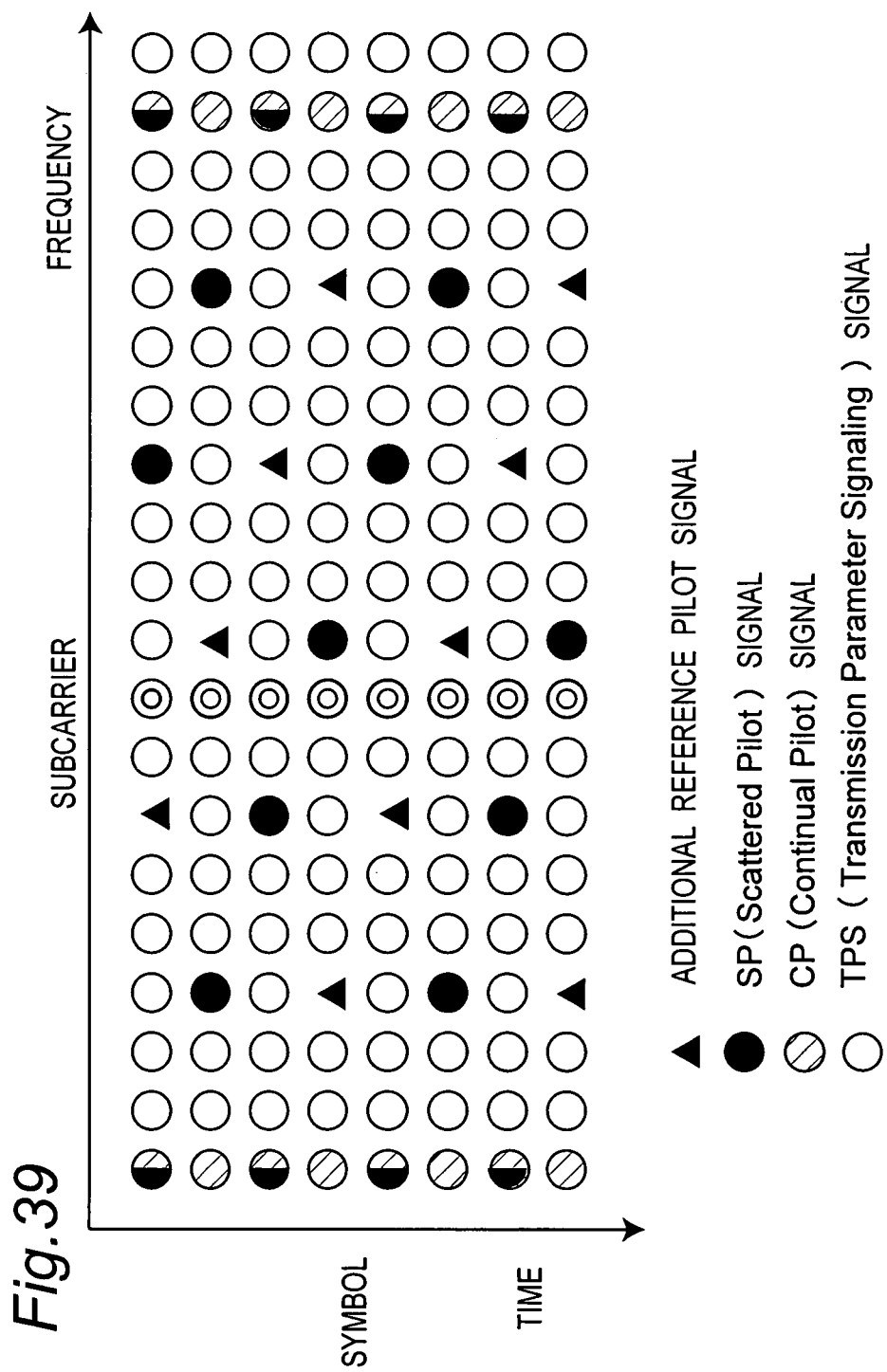
FIG. 39 shows the location of an additional reference pilot signal used in a preferred embodiment of the invention.

This embodiment uses the extra transfer rate capacity of the nineteenth embodiment to increase the reference pilot signal transmission frequency in the slots used to transmit the mobile reception service. The scattered pilot signal (SP signal) is output in the carrier direction once every 12 carriers, but is output once every 6 carriers in this embodiment. This is shown in FIG. 39. In this case the actual number of carriers used increases, but because one additional reference pilot signal is added to each 11 signals between the scattered pilot signals, the drop in transmission capacity is less than 10% (=1/11), and this increase is not a problem. The reference pilot signal added in this embodiment are BPSK modulated using the PRBS circuit in the same way as the SP signal. The amplitude of the additional reference pilot signal could have the same power as the data carrier, or could be boosted in the same way as the SP signal.

Figure 40:
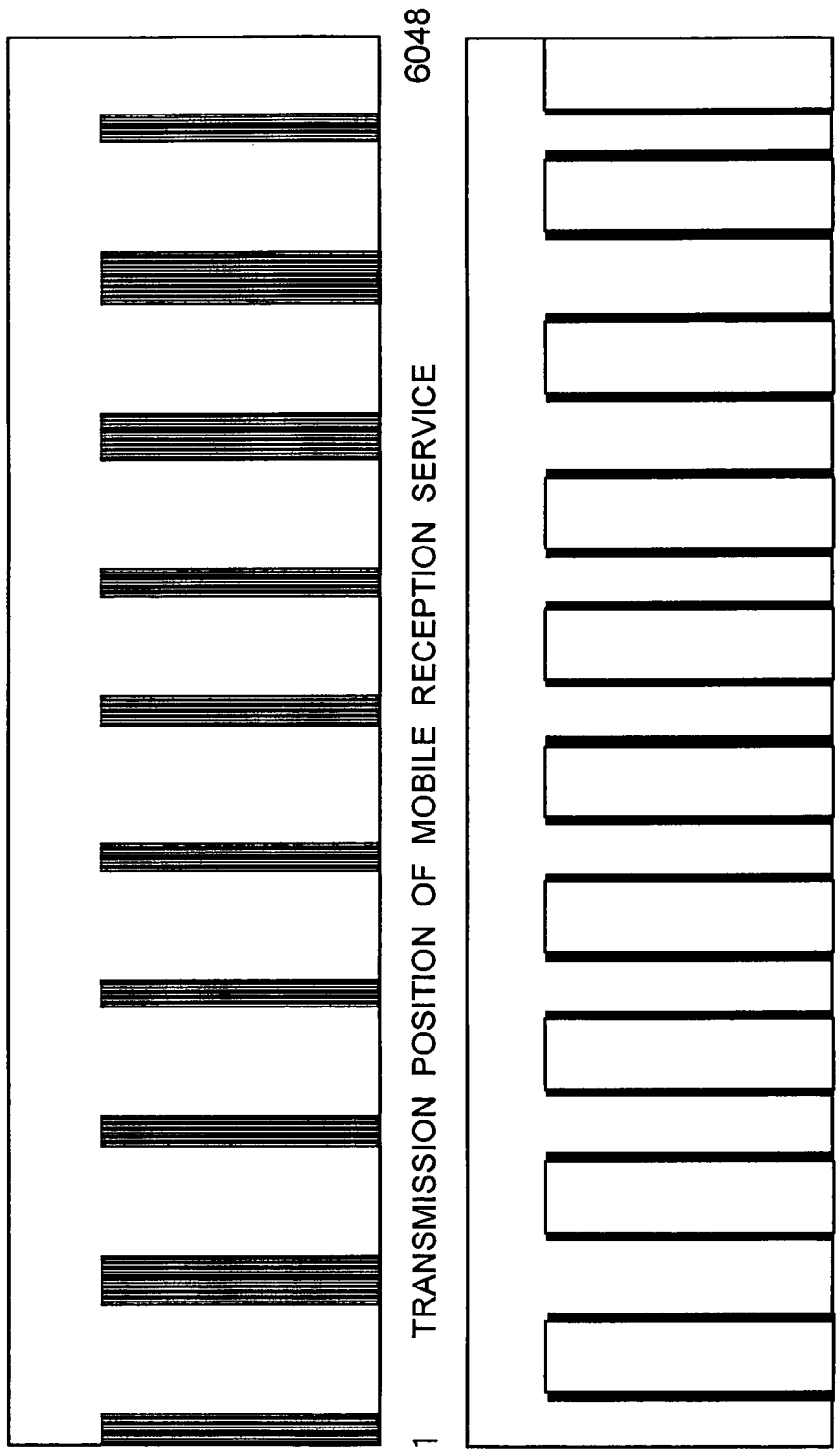
FIG. 40A and FIG. 40B show the location of an additional reference pilot signal used in a preferred embodiment of the invention.

The additional reference pilot signal may be output once every six carriers outside the period where the TS synchronization signal is output for DVB-T service. This is shown in FIG. 40A and FIG. 40B. In those figures as well as FIG. 39, the added reference pilot signal is output once every six carriers at the outside (that is, the solid black portions in FIGS. 40A and 40B) of the carrier transmitting the mobile reception service. The normal SP signal is transmitted at the carrier position where the conventional SP signal is transmitted.

Embodiment 21

Figure 41:
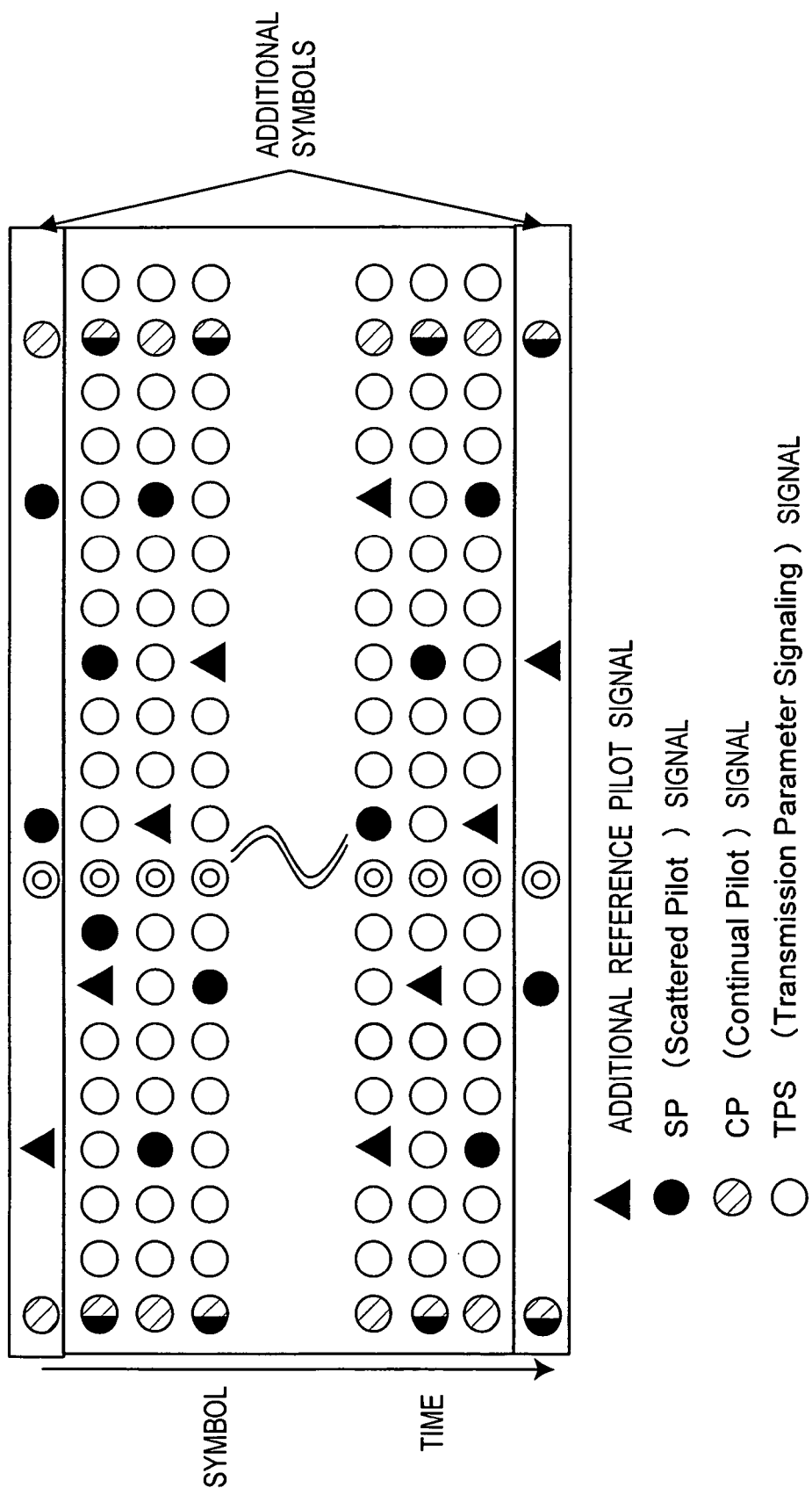
FIG. 41 shows the location of an additional reference pilot signal used in a preferred embodiment of the invention.
Figure 42:
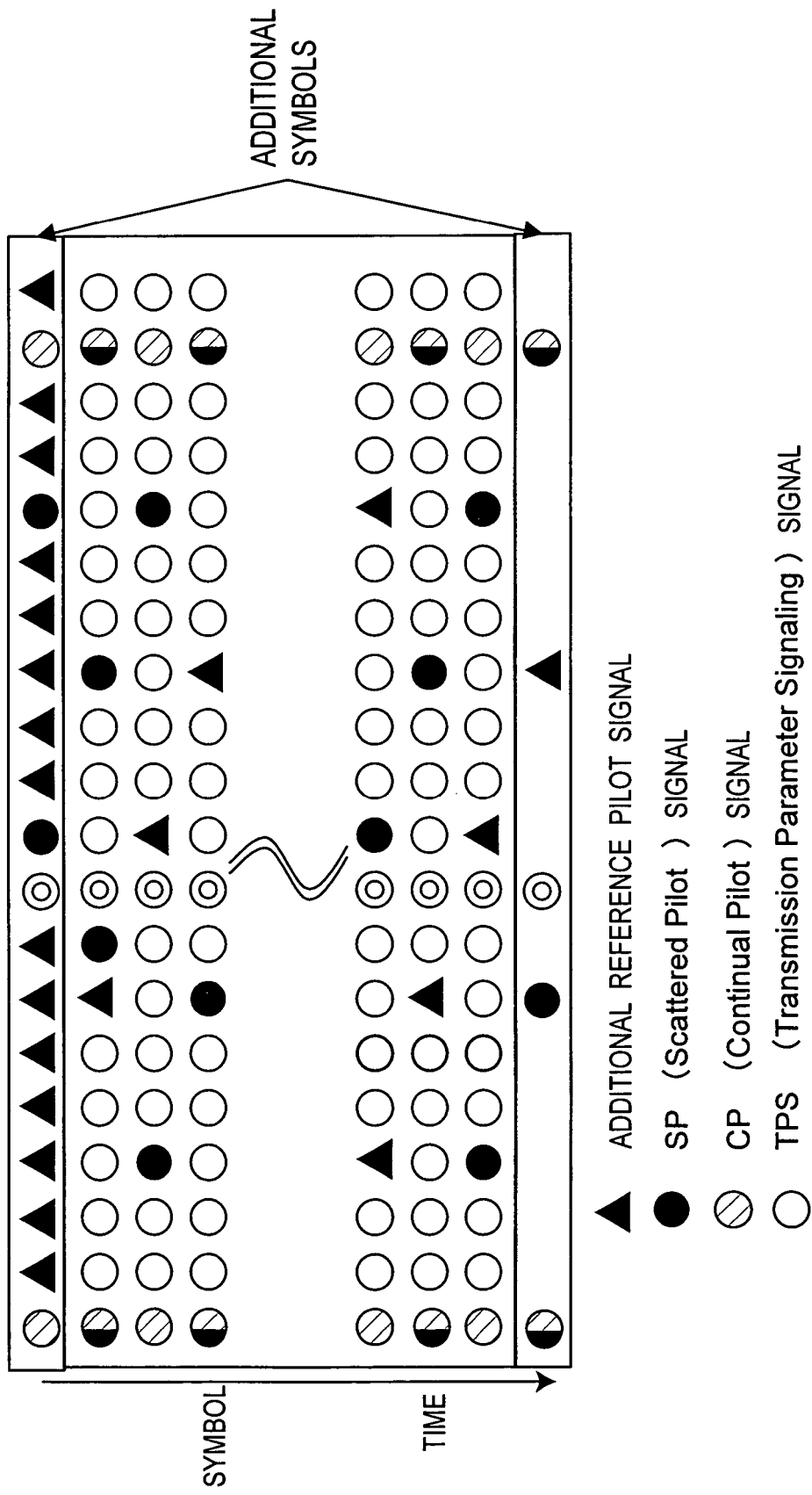
FIG. 42 shows the location of an additional reference pilot signal used in a preferred embodiment of the invention.

This embodiment varies the foregoing twentieth embodiment by increasing the slot size from 1/16 superframe to 19 symbols by adding one symbol before and after each slot. These symbols added before and after the slot are not used to transmit the mobile reception service, but instead to transmit a reference pilot signal for calculation of transmission channel characteristic. This is shown in FIG. 41 and FIG. 42. FIG. 41 shows that in addition to the reference pilot signal added as described above, the same reference signal is added to the before and after symbols. FIG. 42 shows that an additional reference pilot signal is transmitted in the symbols at the beginning of the slot for all carriers used for the mobile reception service.

Embodiment 22

Figure 43:
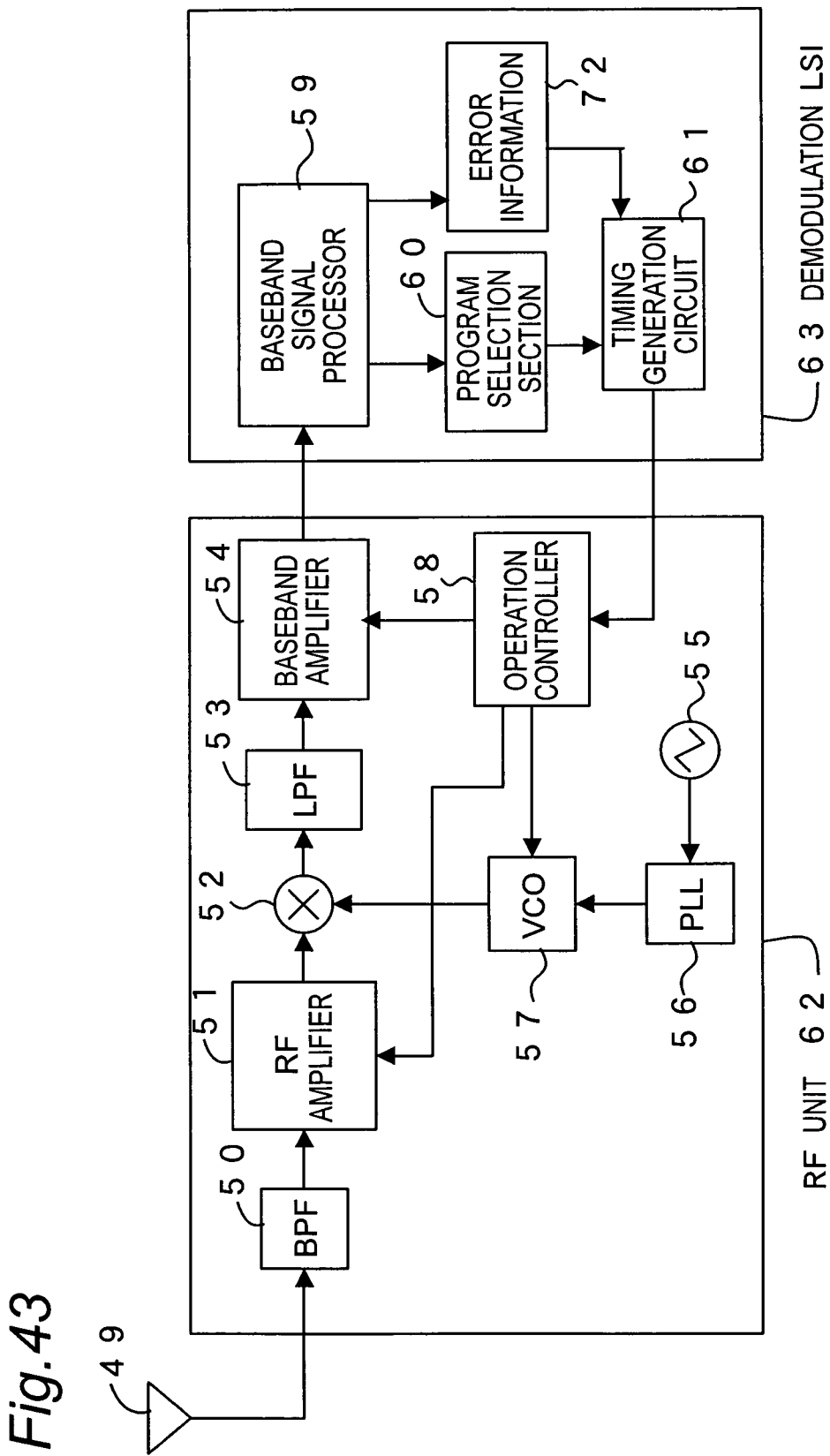
FIG. 43 is a block diagram of a reception process used in a preferred embodiment of the invention.

This embodiment of the invention controls power consumption based on the error rate in the fourteenth and fifteenth embodiments. FIG. 43 shows a configuration of this embodiment.

In this embodiment, error information 72 is output to timing generation circuit 61. If the errors exceed a threshold, the RF section is not driven in the low power consumption mode even in the periods outside the mobile reception service slots.

Note that multiple stepped error thresholds could be set so that low power consumption operation of the RF section could be controlled in multiple stages.

Embodiment 23

Figure 44:
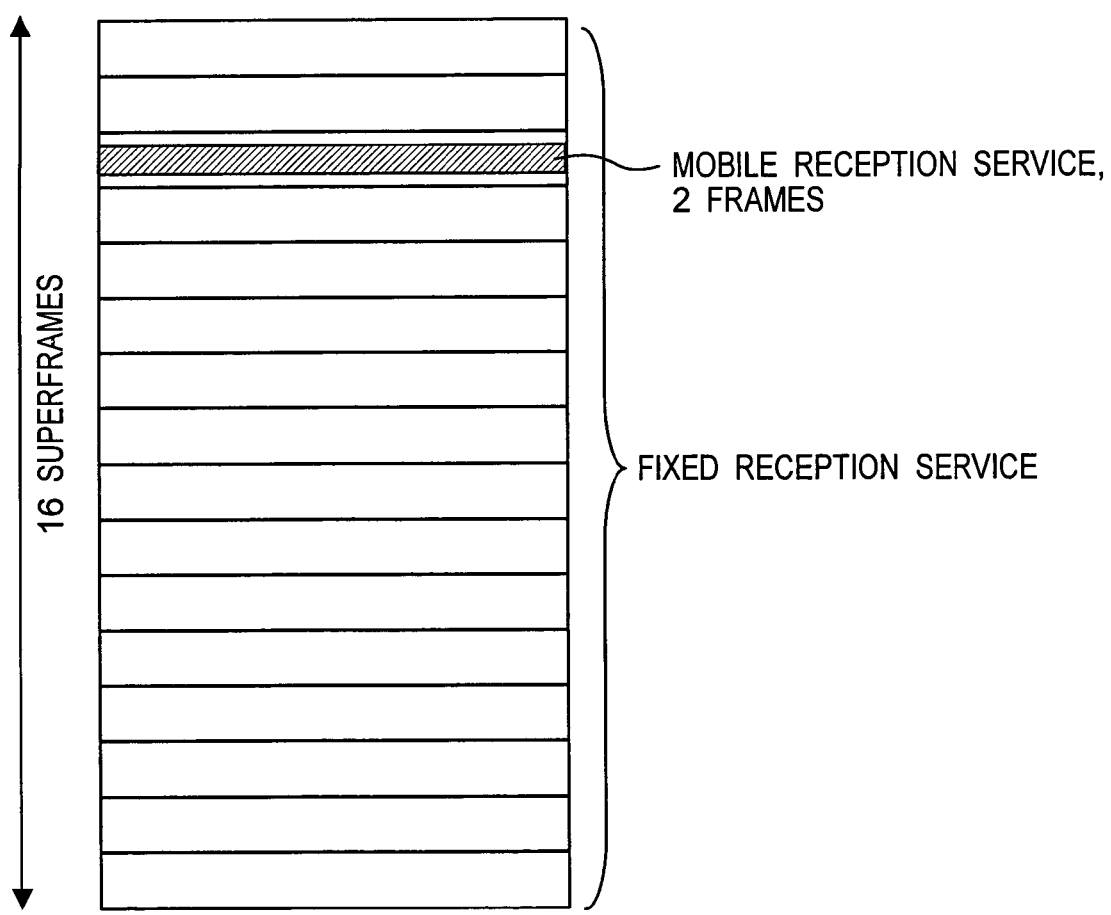
FIG. 44 describes the frame structure used in a preferred embodiment of the invention.
Figure 45:
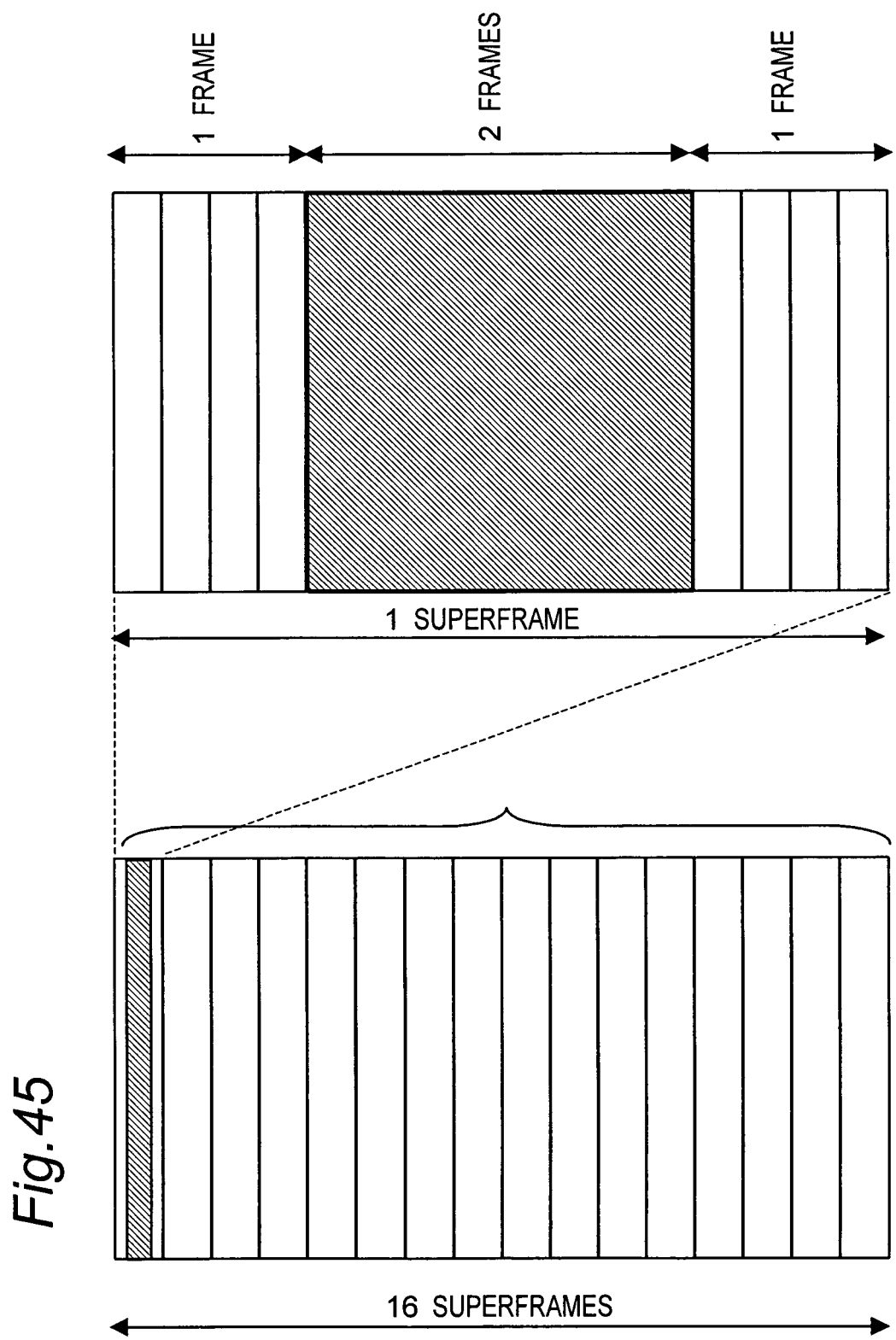
FIG. 45 describes the frame structure used in a preferred embodiment of the invention.

FIG. 44 explains a concept of the twenty-third embodiment of the present invention. FIG. 45 is an enlarged view of one frame in FIG. 44. This embodiment is a variation of the fifth embodiment, which transmits the mobile reception service at a frequency of once every 16 superframes. In the present embodiment, however, the mobile reception service is transmitted using two frames in 16 superframes, and transmits either null packets or signals for fixed terminal reception. Mobile reception service are thus output using two frames of every 16 superframe cycle.

In this embodiment, common Reed-Solomon coding, byte interleaving, and convolutional coding are used between mobile reception service and fixed reception service. The both services are thus mixed by byte interleaving at the boundary between mobile reception services and fixed reception services.

In this embodiment, data is transmitted using two-frames every 16 superframes, but the mobile reception service could be transmitted using M (M is an integer) frames, every N (N is an integer) superframes or every K (K is an integer) frames. For synchronization in SFN, the transmission interval is preferably an integer multiple of 1 megaframe (a unit containing an integer number of superframes, such as 2 superframes in the 8 k mode).

According to this embodiment, the position of mobile reception service transmitted in bursts is at a predetermined position in one megaframe, and thus the TS header synchronization signal "47" or the inverted synchronization signal "B8" appears at the same position in each burst.

Embodiment 24

Figure 46:
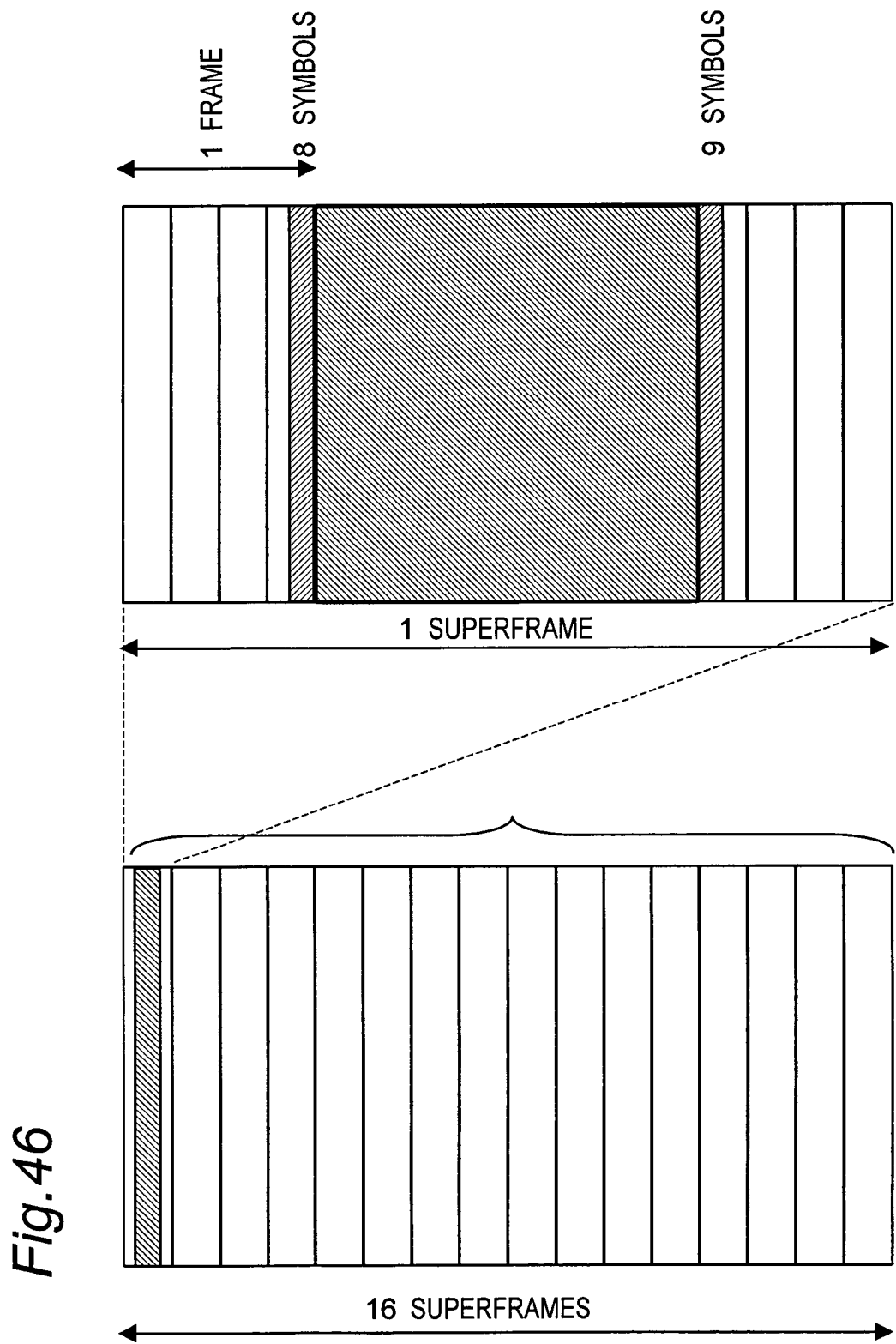
FIG. 46 describes the frame structure used in a preferred embodiment of the invention.

To provide a buffer at the boundary between the fixed reception service and the mobile reception service in the foregoing twenty-third embodiment, this embodiment provides eight symbols before the mobile reception service and nine symbols after the mobile reception service. This is shown in FIG. 46.

In the beginning portion of the buffer for 8 symbols, the fixed reception service and null packets transmitted in the buffer period are mixed over 12 symbols by byte interleaving. In the trailing buffer portion for 9 symbols, the null packets transmitted in the buffer period and the fixed reception service are mixed by byte interleaving over 12 symbols.

More specifically, in the 8 k mode with 16 QAM carrier modulation and code rate for convolution to be 2/3, 2688 packets are transmitted in one superframe, and 168 packets are in the 17 symbol for the buffer, that is, 1/16 superframe. Approximately 79 packets are contained in the 8 symbols, and approximately 89 packets in the 9 symbols. Therefore, the number of packets in the buffer greatly exceeds the 12 packets which are mixed by byte interleaving, and thus this buffer size is sufficient.

Embodiment 25

Figure 47:
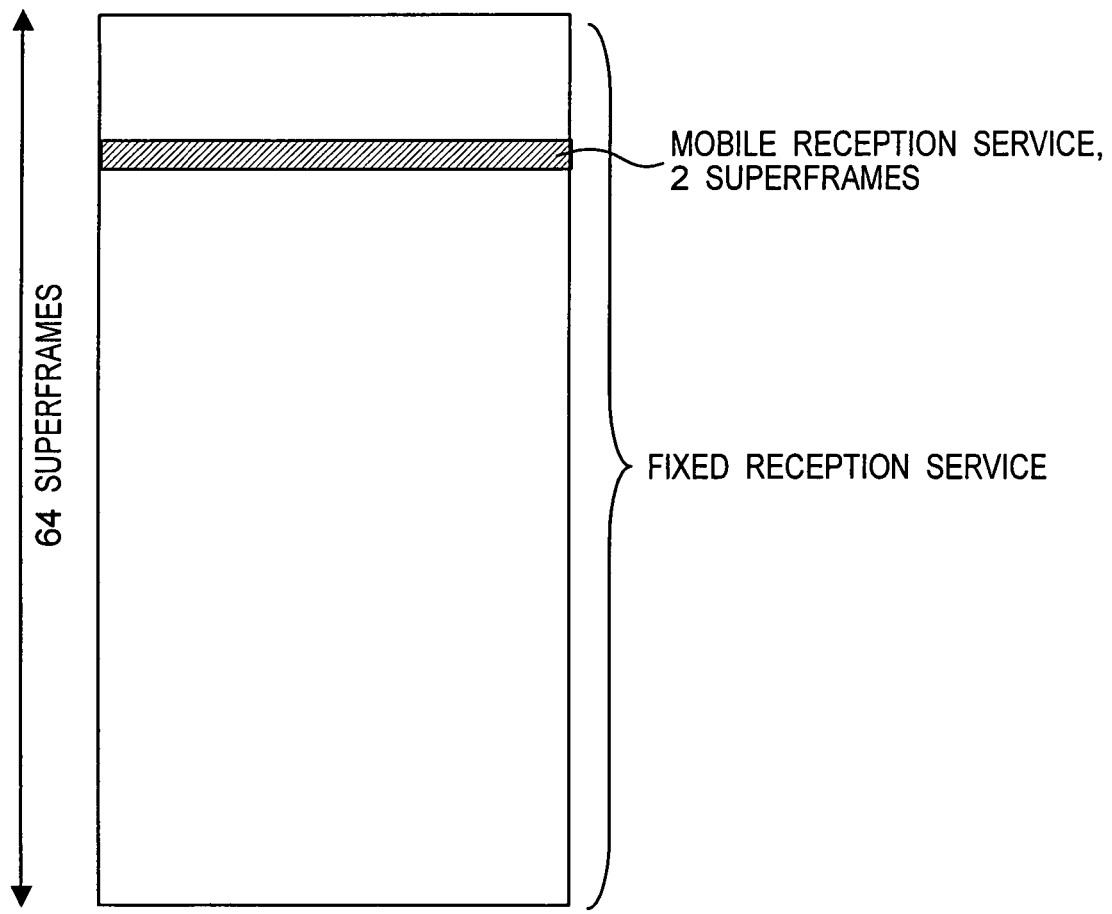
FIG. 47 describes the frame structure used in a preferred embodiment of the invention.

FIG. 47 describes another embodiment of the invention. This embodiment differs from the twenty-third embodiment by setting the mobile reception service transmission frequency to once every 64 superframes. This embodiment also operates primarily in the 2 k mode, and the portable service transmission interval and transmission time are equivalent to those in the twenty-third embodiment operating in the 8 k mode.

In this embodiment of the invention two superframes of each 64 superframes are used to transmit-mobile reception services, and fixed terminal reception signals or null packets are transmitted in the other frames. Two-superframes are thus used out of every 64 superframes to transmit mobile reception services.

Embodiment 26

Figure 48:
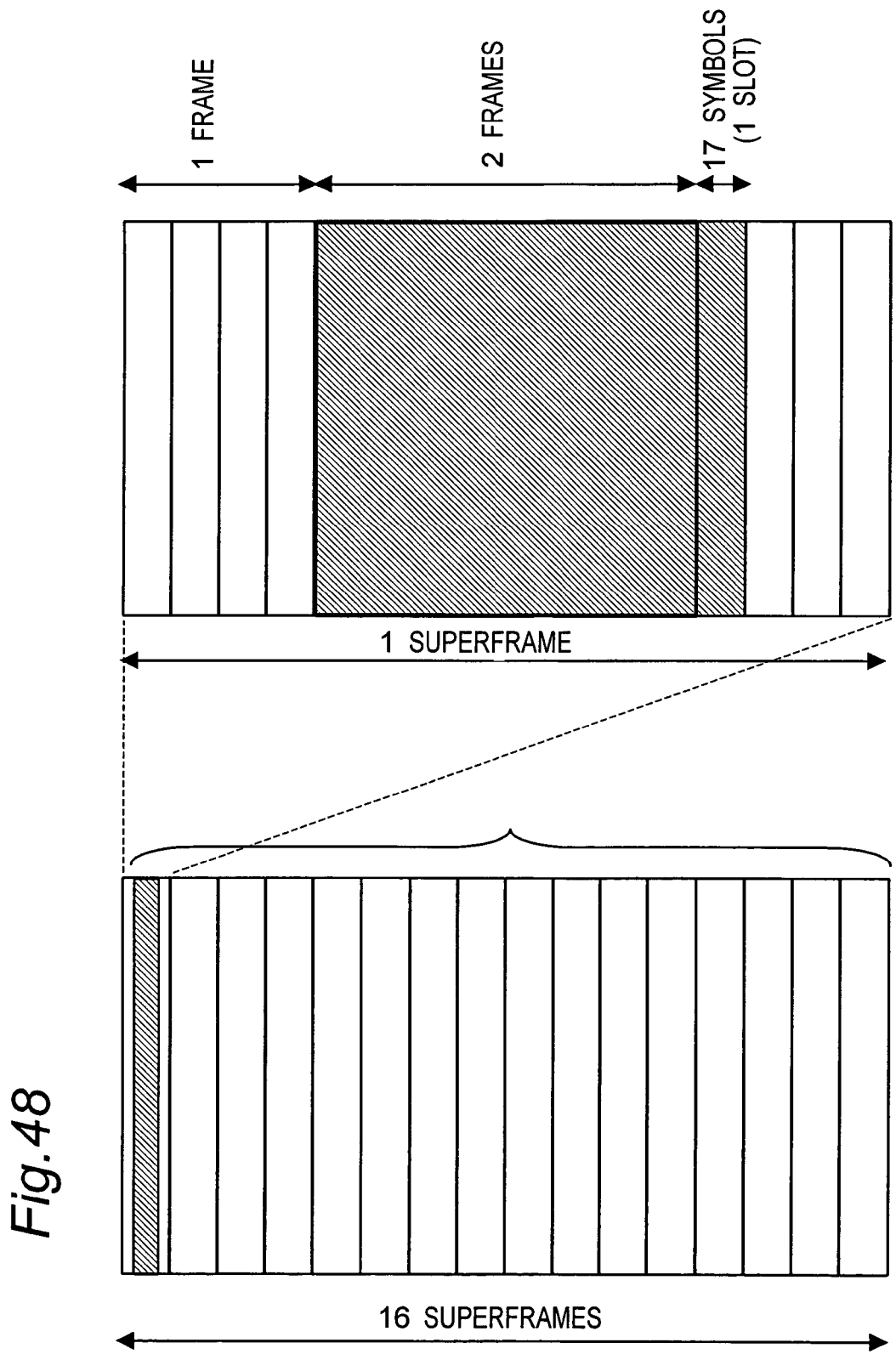
FIG. 48 describes the frame structure used in a preferred embodiment of the invention.

FIG. 48 describes another embodiment of the invention. This embodiment differs from the fifth embodiment by setting the mobile reception service transmission frequency to once every 16 superframes. This embodiment of the invention transmits the mobile reception service using 2 frames and 17 symbols (1/16 superframe) in 16 superframes, and transmits the fixed terminal reception signal or null packets in the remaining frames. Thus the mobile reception service is transmitted once per 16 superframes.

Note that in this embodiment the mobile reception service and the fixed reception service use common Read-Solomon coding, byte interleaving, and convolutional coding. Hence both mobile reception service and fixed reception service are mixed by byte interleaving at the boundary between both services.

Note that this embodiment transmits data using two frames and 17 symbols every 16 superframes, but an integer number of slots each equal to 1/16 superframe or 1/8 superframe could be used to transmit services for mobile terminal reception every integer number of superframes or integer number of frames.

Embodiment 27

Figure 49:
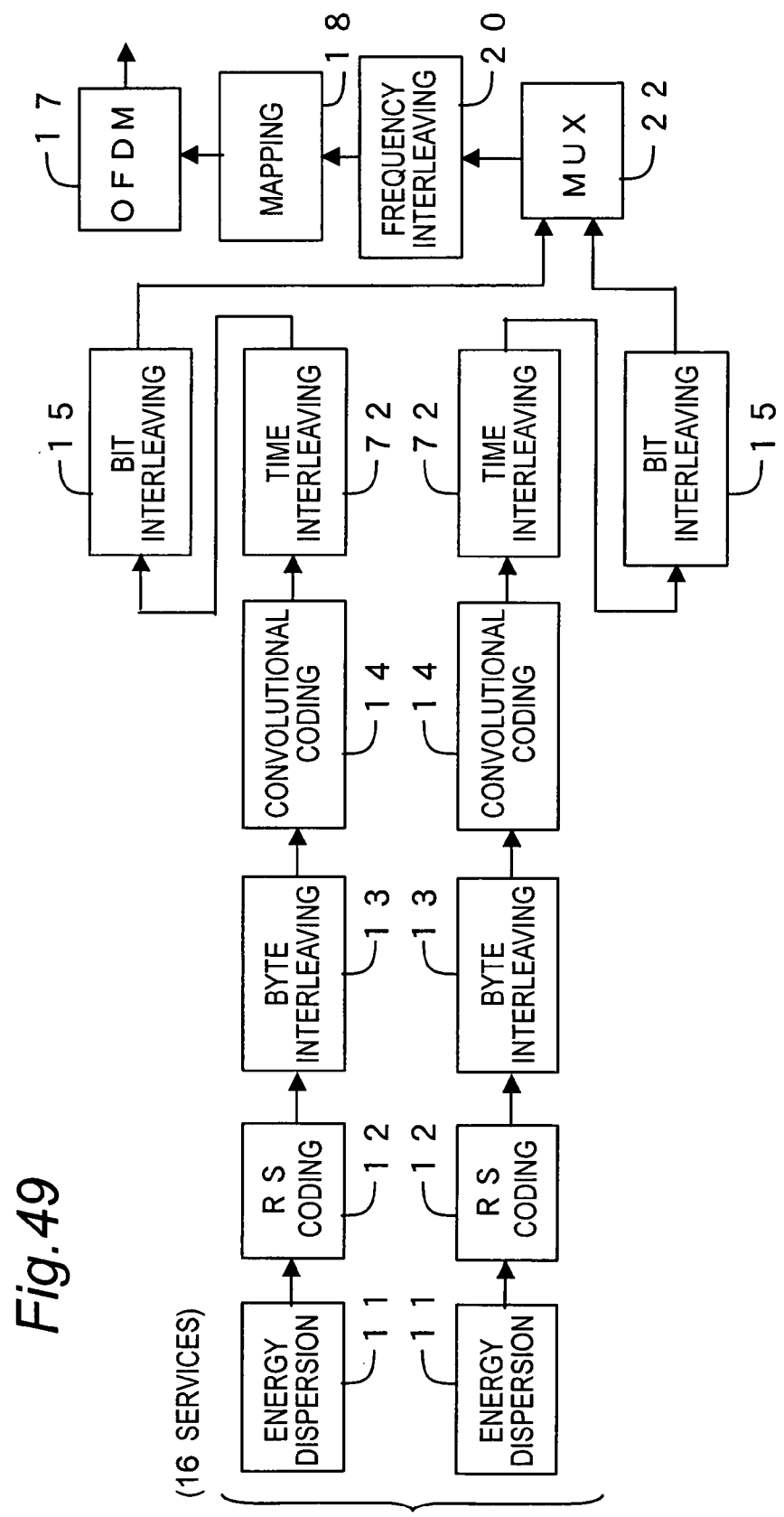
FIG. 49 is a block diagram showing a preferred embodiment of a digital broadcast transmission method according to the present invention.

FIG. 49 describes another embodiment of the invention. This is a variation of the twenty-third embodiment in which transmission channel coding is applied to each service as in the fifth embodiment. In addition, block time interleaving is applied between consecutive symbols in each service.

The parameters used in this embodiment of the invention are 8 k mode, 1/8 guard interval, 16 QAM, 2/3 code rate, and a frequency of mobile reception service transmission of once every 16 superframes. In this embodiment of the invention two consecutive frames are one time slice, and one service is transmitted in one time slice every 16 superframes. Therefore, if 16 superframes is the unit for transmitting one service, 32 services can be transmitted.

Figure 50:
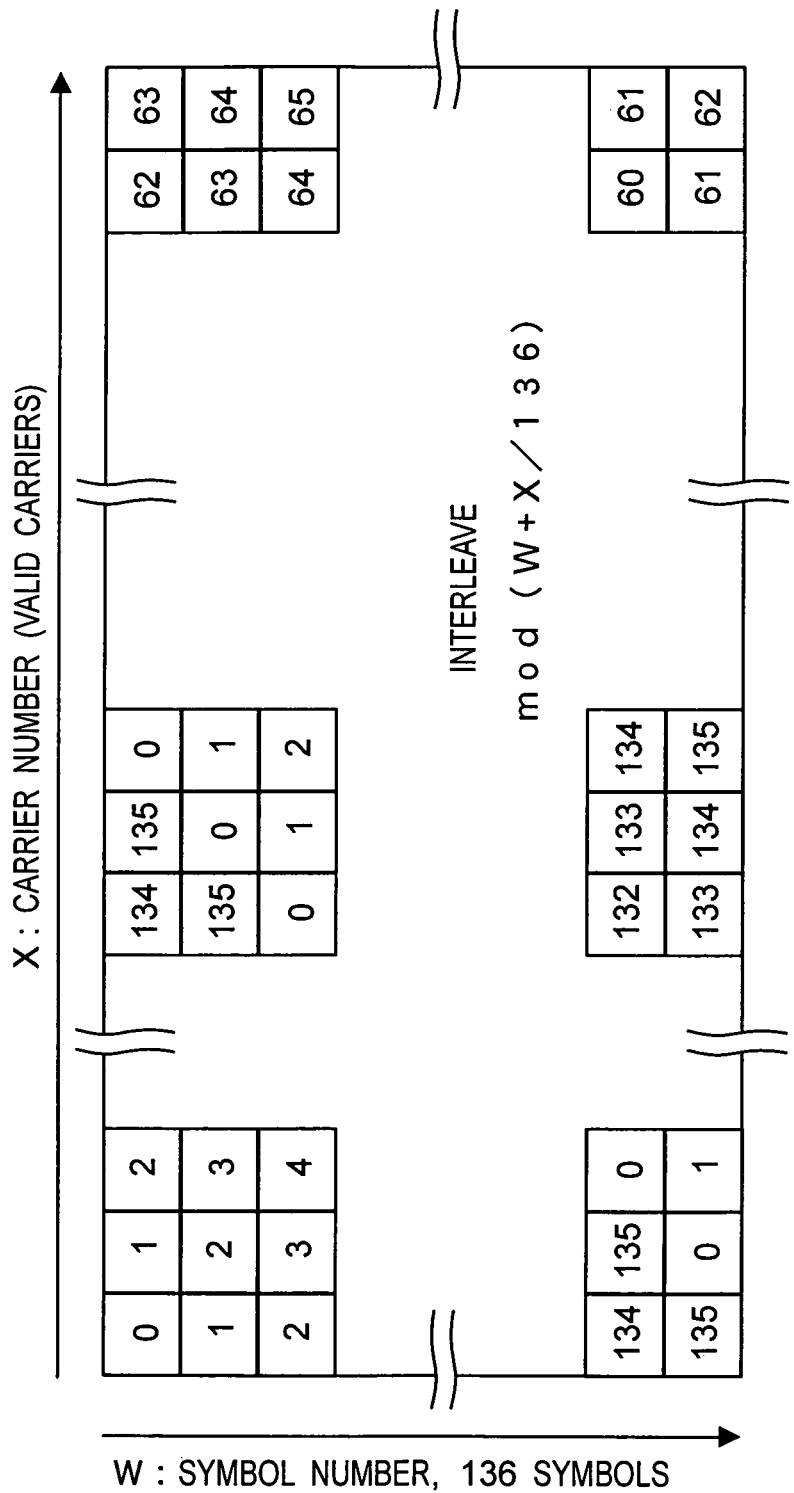
FIG. 50 describes time interleaving used in a preferred embodiment of the invention.

This embodiment of the invention applies Reed-Solomon coding, byte interleaving, convolutional coding, time interleaving, and bit interleaving to each time slice, for transmission channel coding. Time interleaving in this embodiment is a block interleaving in each time slice. The time interleaving is shown in FIG. 50. Time interleaving is achieved by replacing data at the same data carrier position between different symbols for valid data carriers. The block interleaving in this embodiment is defined as follows.

$$(X+W) \bmod (136)$$

where X is the carrier number and W is the symbol number in the time slice. However a different block interleave could be used.

In this embodiment, the time interleaving is applied in each time slice. However, because data for 12 packets is mixed in the time slice by byte interleaving, data at the time slice boundary cannot be decoded without waiting for the next time slice for the same service. Therefore, in this embodiment, the packets at the time slice boundary are null packets or invalid packets that have no relation to the service, thus enabling decoding to proceed without waiting for the next time slice.

Figure 51:
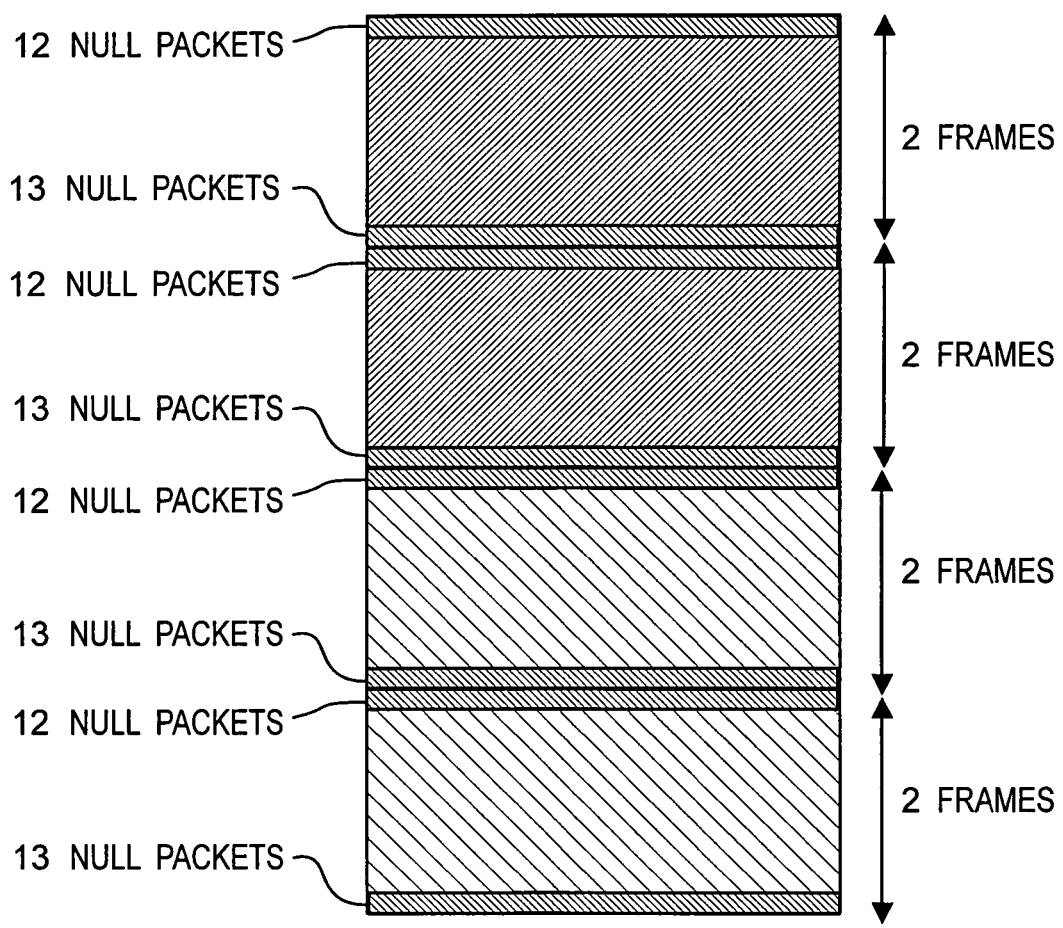
FIG. 51 shows the time slice structure used in a preferred embodiment of the invention.

As shown in FIG. 51, twelve null packets or invalid packets with no relation to the service are mixed by byte interleaving at the service boundary, and an extra packet for a total of 13 packets are inserted at the end of the service in each time slice for truncating Viterbi decoding. It is thus possible to decode each time slice to output a valid TS. Note that 12 packets are inserted before each service and 13 null packets are inserted after the service in this embodiment, but more null packets or invalid packets unrelated to the service in that time slice could be provided.

Embodiment 28

Figure 52:
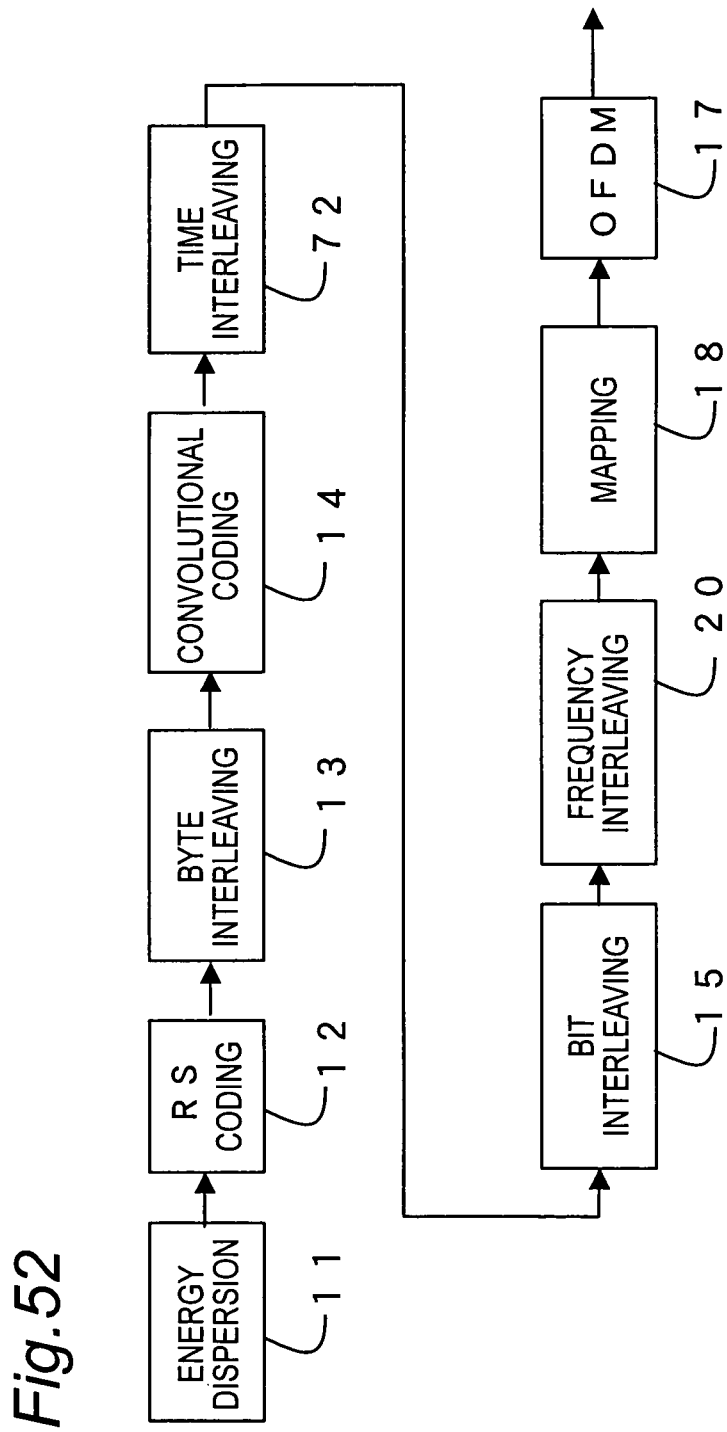
FIG. 52 is a block diagram of a preferred embodiment of a digital broadcast transmission method according to the present invention.

This embodiment is a variation of the twenty-seventh embodiment, and differs therefrom by using the same transmission channel coding in each time slice. This is shown in FIG. 52. This embodiment of the invention operates in the 4 k mode with a 1/4 guard interval, 16 QAM, and 2/3 code rate.

This embodiment uses a transmission interval of 32 superframes of which one superframe is a time slice and different services are assigned to each time slice. The number of packets transmitted in each time slice is 1344. If 25 null packets are provided totally before and after each time slice, the valid packet count is 1319. The amount of data contained in one time slice is 2.15 (=1319×204×8) Mbit. In the 4 k mode with a 1/4 guard interval, a period for one superframe is 152 ms, and a period for 32 superframes is 4.87 sec. The transfer rate output in each time slice is thus 440 Kbps.

In FIG. 52 the input data is energy dispersed by the energy dispersion block 11 and Reed-Solomon coded by the Reed-Solomon coding block 12. Byte interleaving is then applied by the byte interleaving block 13 and convolutional coding is applied by the convolutional coding block 14. The time interleaving block 72 then applies block time interleaving to each time slice, that is, to one superframe in this embodiment.

When transmitted thus described, the transmitted data in the valid portion of the data is the same as in the twenty-seventh embodiment thereby also enabling the transmission circuit to be simplified.

Embodiment 29

This embodiment of the invention relates to a receiver (mobile terminal) for receiving services for mobile terminal reception capable of receiving digital broadcast signals transmitted by a method described in any of the foregoing embodiments 23 to 28. The arrangement of this receiver is shown in FIG. 53.

Figure 53:
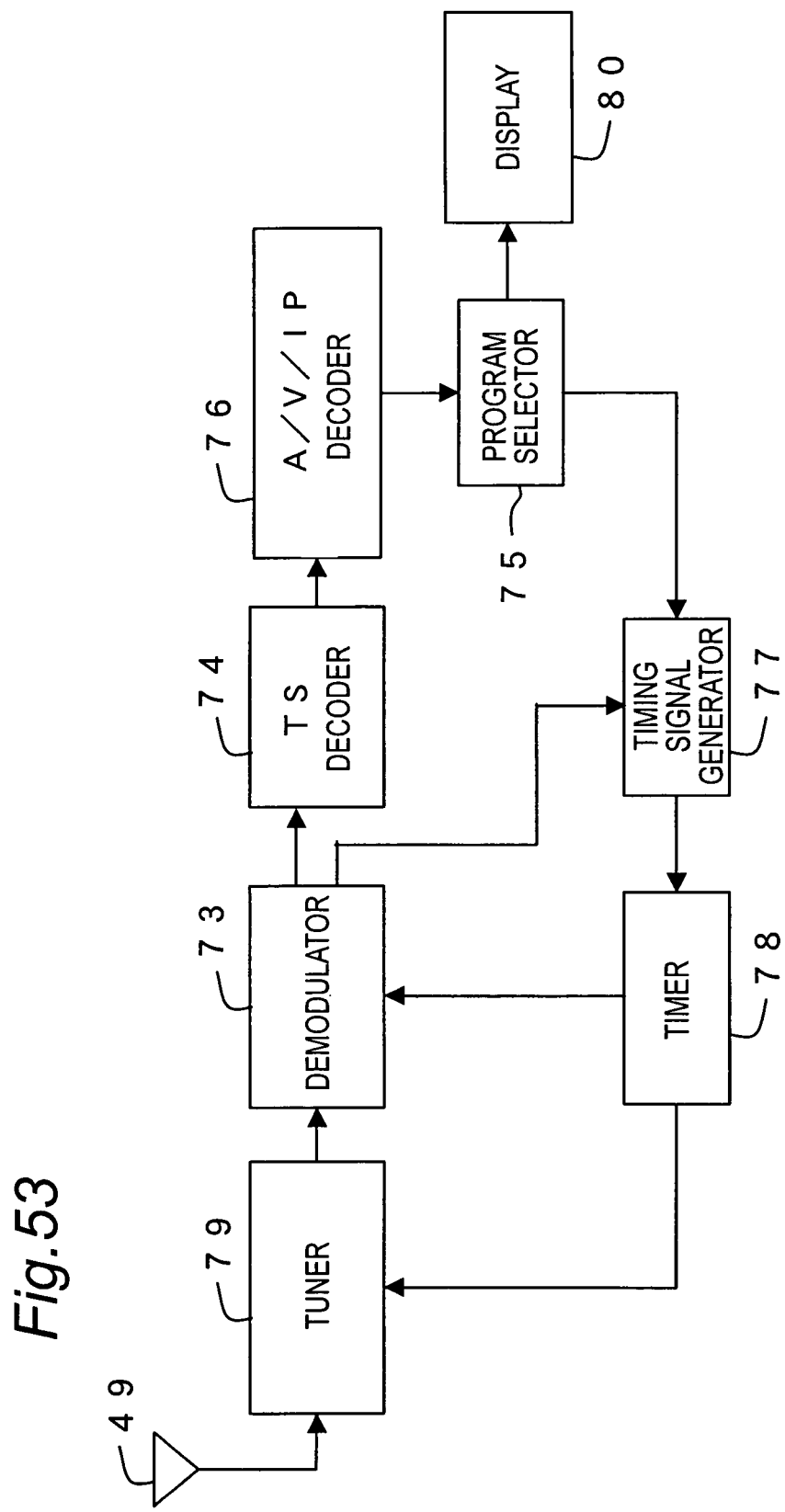
FIG. 53 is a block diagram showing a signal processing method used in a preferred embodiment of the invention.

In FIG. 53 the tuner 79 extracts a specific RF signal from the signal input from the antenna 49, converts the RF signal to a baseband signal, and outputs the baseband signal to the demodulator 73 which performs demodulation. The demodulated data is then output to the TS decoder 74. The TS decoder 74 discards the null packets in the demodulated data and outputs the result to the A/V/IP decoder 76 for decoding. For the decoded data, the program selector 75 then selects the time slice carrying the specified mobile reception service. Time information indicating the time when the specified mobile reception service is transmitted in the TS signal sent from the demodulator 73 is then stored to the timing signal generator 77. The timer 78 turns on or off the tuner 79 and the demodulator 73 at a specific timing according to the time at which the mobile reception service is transmitted. The video data and other information output from the program selector 75 is then presented on the display 80.

In the embodiment, the tuner 79 is powered on approximately 250 ms before the burst data carrying the specific mobile reception service. After the specific burst data is decoded, the tuner 79 and the demodulator 73 is powered off. Because the valid TS packets are carried synchronized to the frames, the power on timing is reset by the timer 78 when the specific frame is received. When a specific period of time passes, the timer 78 powers on the front end, and when a further specific time passes, it powers off.

More specifically, if the operating parameters are 8 k mode and a 1/4 guard interval, 16 superframes are 5.57 seconds, and one time slice is two frames, then the time slice duration is 174 ms. If the tuner 79 and demodulator 73 require 250 ms for initial pull-in after the power-on, the tuner 79 and the demodulator 73 power must be powered on within 5.15 sec after the tuner 79 and the front end is powered off. In this embodiment, the timer 78 is used to power on after 5 seconds. Using receiver error information as in the twenty-second embodiment, the power can be turned on slightly before the specific service is transmitted when reception conditions are poor.

Figure 63:
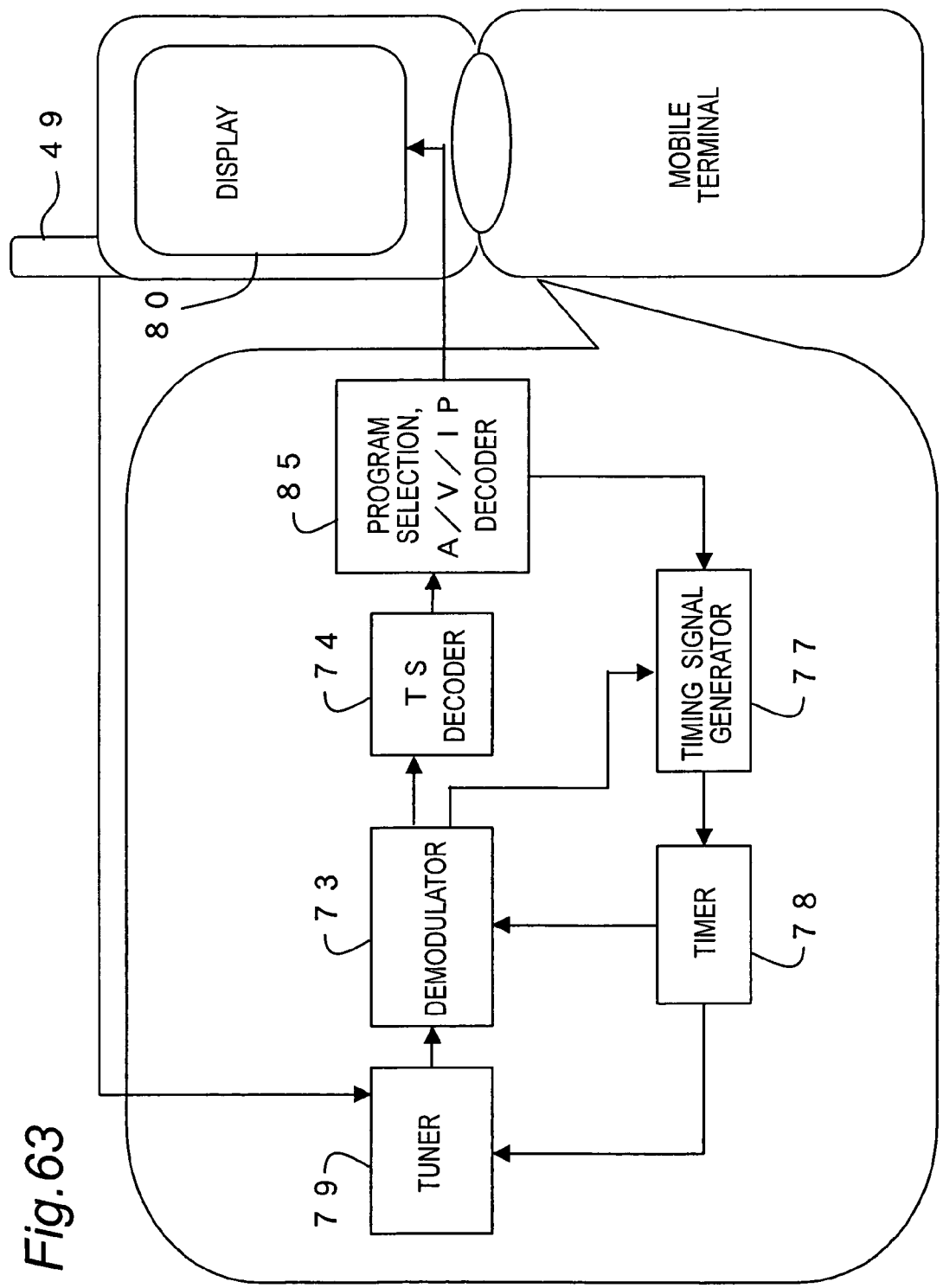
FIG. 63 is a block diagram of a mobile terminal according to the present invention.
Figure 64:
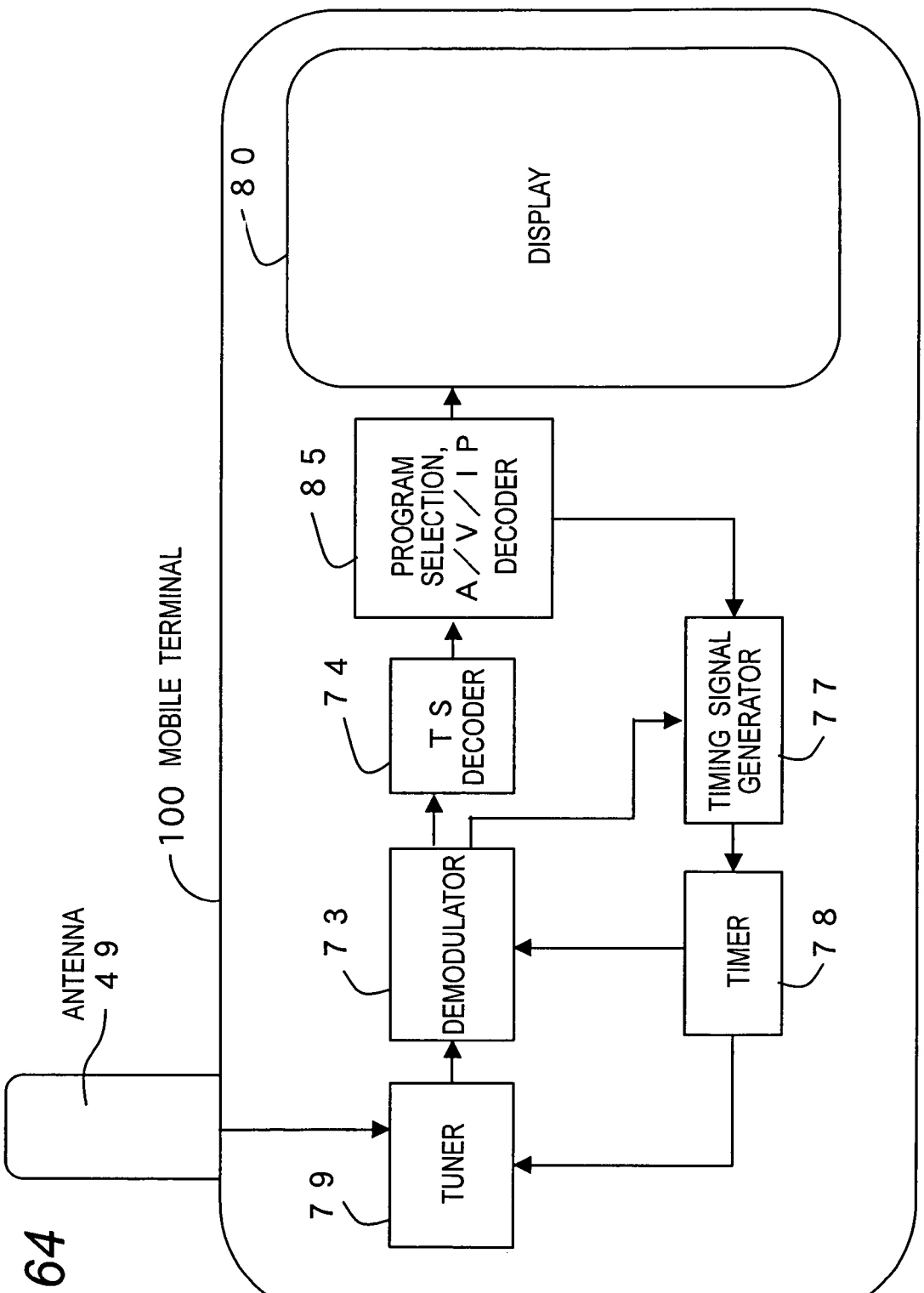
FIG. 64 is a block diagram of a mobile terminal according to the present invention.

An example of a mobile receiver having the function described in this embodiment is shown in FIG. 63 and FIG. 64. Note that the function of this receiver can be provided to a memory card, and the memory card could be installed to the mobile receiver. Alternatively, the function could be built in to the receiver itself.

The A/V/IP decoder 85 shown in FIG. 63 and FIG. 64 extracts IP packets from the output of TS decoder 74 and then applies A/V decoding to the extracted packets. Program selection chooses the same service at the TS level and IP level.

Embodiment 30

This embodiment describes transmission of the control signal, that is, TPS signal, which is transmitted simultaneously to the digital broadcast transmitted by the method described in any of the foregoing twenty-third to twenty-eighth embodiments.

In the DVB-T standard the cell indicator is allocated to 8 bits from s40 to s47 in TPS bits. Whether a cell indicator is allocated can be determined from the length indicator (s17 to s22). If the cell indicator is supported, s17 to s22 are set to "011111". If the cell indicator is not supported, s17 to s22 are set to "010111".

By setting s17 to s22 to a value other than "011111", the TPS bits used for the cell indicator can be used for some other purpose, such as signalling for a mobile reception service.

An example of this embodiment is shown in FIG. 54. Bits s40 to s42 show the repeat interval in which burst data is transmitted. This repeat interval is set by a megaframe unit. Bits s43 to s44 show the burst interval in frame units. Bits s45 and s46 show the transmission period in slot units (1 slot=1/4 frame), and the actual transmission period is a total for all slots. The number of transmitted mobile reception services is declared in bits s47 to s50. This parameters are described in detail in FIG. 55 to FIG. 58.

As described in this embodiment, the bits assigned to the cell indicator can also be used by manipulating the TPS content, and the information required for a mobile reception service can be transmitted in one frame.

Embodiment 31

Figure 59:
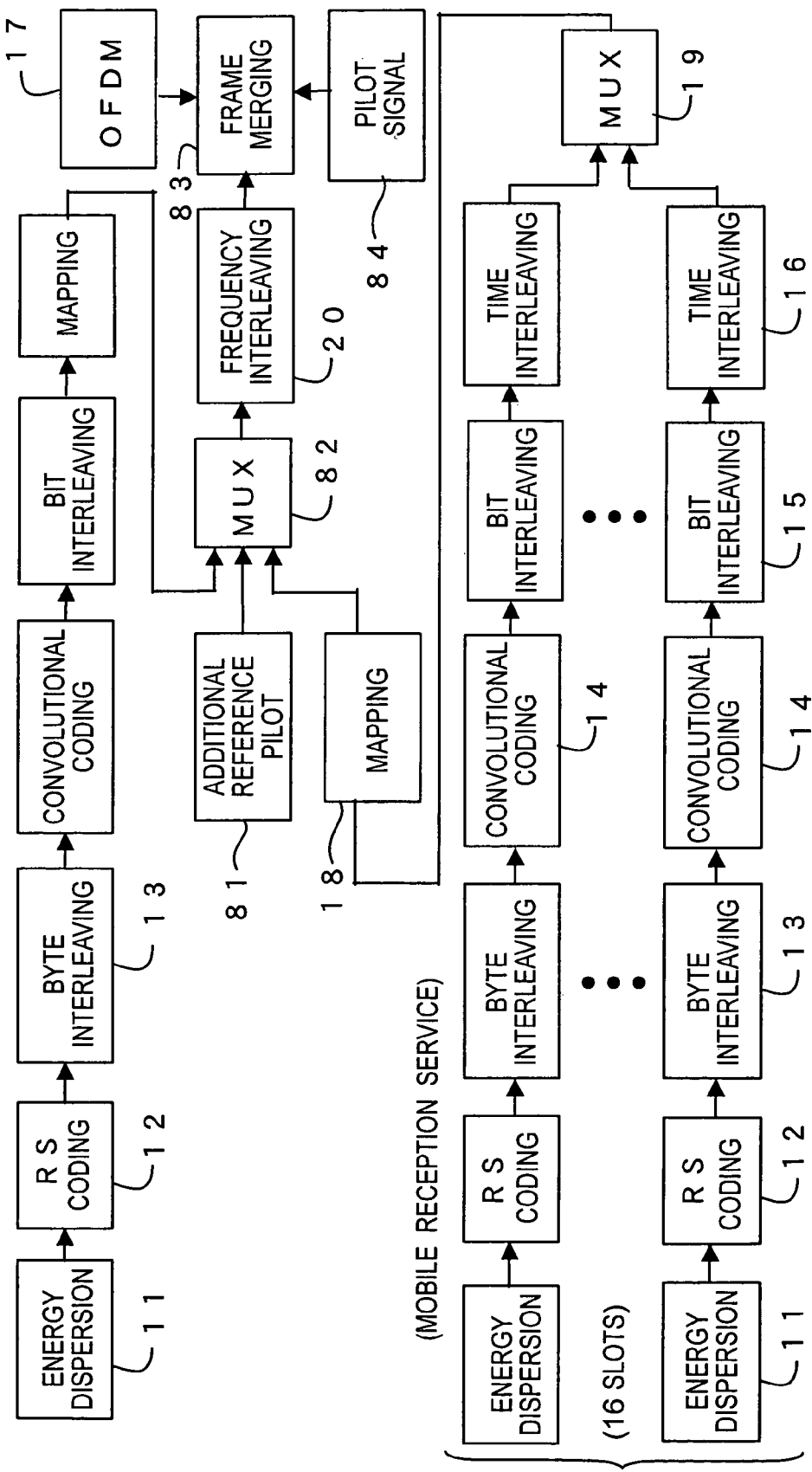
FIG. 59 is a block diagram showing a signal processing method used in a preferred embodiment of the invention.

This embodiment of the invention describes the process on the transmission side when the reference pilot signal output frequency is increased in the foregoing twentieth embodiment of the invention. The arrangement of this embodiment is shown in FIG. 59. In this embodiment the reference pilot signals are not inserted once every six carriers as in the twentieth embodiment, but a large number of carriers are inserted randomly.

In this embodiment, the additional reference pilot block 81 inserts an indicator denoting the position of the additional reference pilot signal. MUX 82 switches between the additional reference pilot signal with the inserted indicator, the fixed reception service and the mobile reception service, after mapping. The mapping to the additional reference pilot signal occurs simultaneously the frame merging block 83 modulating the DVB-T pilot signal by the PRBS sequence identified by the carrier position.

FIG. 60 to FIG. 62 show examples of the carrier location in this embodiment. The carrier location includes the number of the valid carrier before pilot signal transmission. Parameters used for DVB-T in this embodiment include 8 k mode, 16 QAM, and 2/3 code rate. As described in the nineteenth embodiment, the insertion position of the mobile reception service is determined not by the parameters of the mobile reception service but by the parameters for the fixed reception service.

FIG. 62 show dispersion by bit interleaving of synchronization bytes of the fixed reception service and several bytes thereafter. It is assumed to use Viterbi decoding with a constraint length of 144 on the receiver side. To enable the first three bytes in each packet to be decoded on the receiver side, FIG. 62 shows the positions of the first three bytes in each packet, and the preceding 144 bits from 20 bits before the first three bytes or the three bytes (24 bits), as the input to the convolutional coder, which are dispersed by bit interleaving.

FIG. 60 shows the carrier allocation used to transmit the mobile reception service. The carrier location is selected to include half of the valid carriers, that is, 3024 carriers, out of carrier locations not including carriers for decoding the synchronization bytes of the fixed reception service. This carrier location is switched at an integer multiple of 126 to match the 126 carrier block unit used for bit interleaving in order to simplify processing on the receiver side.

The remaining carriers are used to transmit the additional reference signals. The location is shown in FIG. 61.

Note that the symbol numbers shown in the left columns are for four slots. Half the carriers are used for each symbol, and thus one service is transmitted using two slots.

The present invention can be used in communication technology for transmitting a plurality of services by time-division multiplexing. For example, the present invention is effective in broadcast technology for time-division multiplexing and transmitting services for reception by fixed terminals (such as digital broadcasts), and services for reception by mobile terminals.

The invention claimed is:

1. A transmission method of an OFDM signal with a frame structure in which a frame contains an integer number of transport stream packets and each frame contains a specific number of symbols, the transmission method comprising:

dividing, in time base, a frame into slots, each slot including a specific number of symbols;

transmitting a specific service using at least one of the slots;

applying transmission channel coding to each specific service to transmit null packets or Packet Identifier (PID) packets before and after a boundary between slots transmitting different services, each PID packet not being related to the different services;

inputting a frame synchronization signal, a symbol synchronization signal, and a FFT sampling clock from an OFDM modulator;

specifically positioning null packets in a specific slot and before and after the specific slot based on the input frame synchronization signal, symbol synchronization signal and the FFT sampling clock; and dividing and outputting a transport stream according to the number of transmitted services;

wherein a number of null packets or a number of PID packets is equal to or greater than a number of packets in slots used for transmitting services by interleaving, and a plurality of the frames form one superframe and the superframe is divided into slots.

2. A transmission method according to claim 1, wherein a plurality of the frames form one superframe, and the superframe is divided into slots.

3. The transmission method according to claim 1, wherein the number of the null packets or the Packet Identifier (PID) packets is twelve.

4. A transmission apparatus for transmitting an OFDM signal with a frame structure in which a frame contains an integer number of transport stream packets and each frame contains a specification number of symbols, the transmission apparatus comprising a multiplexer for multiplexing a plurality of services, the multiplexer being configured to:

divide, in time base, a frame into slots, each slot including a specific number of symbols; transmit a specific service using at least one of the slots;

apply transmission channel coding to each specific service to transmit null packets or Picket Identifier (PID) packets before and after a boundary between slots transmitting different services, each PID packet not being related to the different services;

input a frame synchronization signal, a symbol synchronization signal, and a FFT sampling clock from an OFDM modulator;

specifically position null packets in a specific slot and before and after the specific slot based on the input frame synchronization signal, symbol synchronization signal and the FFT sampling clock; and dividing and output a transport stream according to the number of transmitted services;

wherein a number of the null packets or a number of the PID packets is equal to or greater than a number of packets in slots used for transmitting services by interleaving, and a plurality of the frames form one superframe and the superframe is divided into slots.

5. The transmission apparatus according to claim 4, wherein the number of the null packets or the Packet Identifier (PID) packets is twelve.

6. The transmission apparatus according to claim 4, wherein a plurality of the frames form one superframe, and the superframe is divided into slots.

7. A transmission apparatus for transmitting an OFDM signal using a transmission method that divides, in time base, a frame into slots, each slot including a specific number of symbols; transmits a specific service using at least one of the slots; and applies transmission channel coding to each specific service to transmit null packets or Packet Identifier (PID) packets before and after a boundary between slots transmitting different services, each PID packet not being related to the different services, the transmission apparatus, comprising:

a first section that inputs a frame synchronization signal, a symbol synchronization signal, and a FFT sampling clock from an OFDM modulator;

a second section that specifically positions null packets in a specific slot and before and after the specific slot based on the input frame synchronization signal, symbol synchronization signal and the FFT sampling clock; and a third section that divides and outputs a transport stream according to the number of transmitted services, wherein a number of null packets or a number of PID packets is equal to or greater than a number of packets in slots used for transmitting services by interleaving, and a plurality of the frames form one superframe and the superframe is divided into slots.

* * * * *